(12) United States Patent
Zuffa et al.

(10) Patent No.: US 8,016,583 B2
(45) Date of Patent: Sep. 13, 2011

(54) APPARATUSES AND METHOD

(75) Inventors: Zeno Zuffa, Borgo Tossignano (IT);
Giambattista Cavina, Faenza (IT);
Fiorenzo Parrinello, Medicina (IT)

(73) Assignee: Sacmi Cooperativa Meccanici Imola Societa' Cooperativa, Imola (BO) (IT)

( * ) Notice: Subject to any disclaimer, the term of this patent is extended or adjusted under 35 U.S.C. 154(b) by 111 days.

(21) Appl. No.: 12/376,624

(22) PCT Filed: Jul. 27, 2007

(86) PCT No.: PCT/IB2007/002196
§ 371 (c)(1),
(2), (4) Date: Apr. 23, 2009

(87) PCT Pub. No.: WO2008/017915
PCT Pub. Date: Feb. 14, 2008

(65) Prior Publication Data
US 2010/0028479 A1   Feb. 4, 2010

(51) Int. Cl.
*B29C 31/00* (2006.01)
*B29C 31/06* (2006.01)
(52) U.S. Cl. .................................... 425/186; 425/348 R
(58) Field of Classification Search ................. 425/182, 425/186, 219, 348 R, 422–438, 453; 141/71
See application file for complete search history.

(56) References Cited

U.S. PATENT DOCUMENTS

| | | | |
|---|---|---|---|
| 2,963,993 A | 12/1960 | Stott | |
| 5,807,592 A * | 9/1998 | Alieri | 425/347 |
| 6,718,606 B2 * | 4/2004 | Bassi | 425/348 R |
| 2006/0034960 A1 * | 2/2006 | Pucci et al. | 425/809 |
| 2007/0196531 A1 * | 8/2007 | Parrinello et al. | 425/348 R |
| 2008/0042325 A1 | 2/2008 | Imatani et al. | |

FOREIGN PATENT DOCUMENTS

| | | |
|---|---|---|
| EP | 1 652 645 | 5/2006 |
| JP | 2005-119208 | 5/2005 |
| WO | WO 2005/102641 | 11/2005 |
| WO | WO 2005/102646 | 11/2005 |

OTHER PUBLICATIONS

International Search Report for PCT/IB2007/002196, mailed Mar. 26, 2008.
English Translation of Taiwanese Office Action for corresponding Taiwan Appln. No. 200780032748.8, mailed Jan. 10, 2011, 7 pages.

\* cited by examiner

*Primary Examiner* — Richard Crispino
*Assistant Examiner* — Thu Khanh T Nguyen
(74) *Attorney, Agent, or Firm* — Nixon & Vanderhye P.C.

(57) ABSTRACT

An apparatus comprises a conveying device provided with seat elements arranged for receiving objects, the seat elements being movable along a curved path, and a further conveying device provided with a transferring arrangement arranged for delivering the objects to, and/or removing the objects from, the conveying device, wherein the transferring arrangement comprises coupling elements arranged for engaging the seat elements in such a way that the seat elements and the transferring arrangement are maintained mutually coupled along a portion of the curved path.

83 Claims, 80 Drawing Sheets

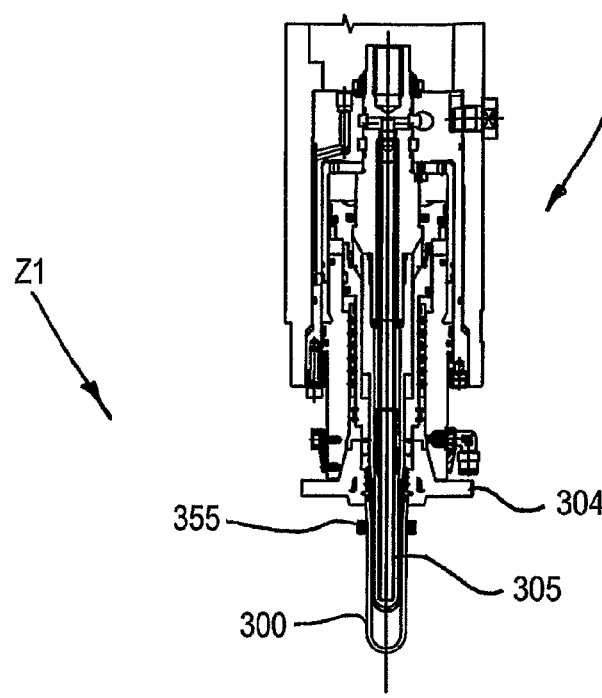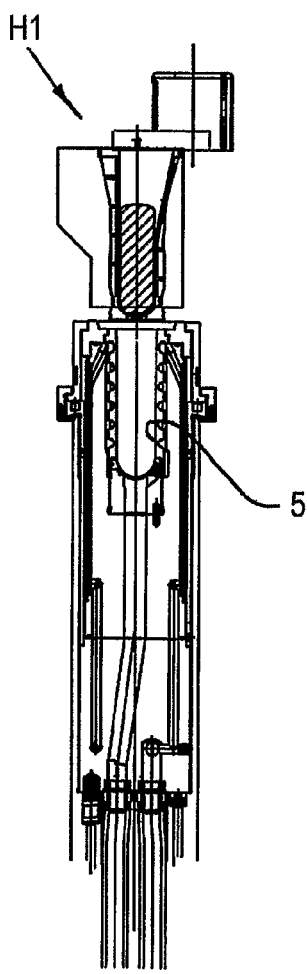
Fig. 76

APPARATUSES AND METHOD

CROSS-REFERENCE TO RELATED APPLICATIONS

This application is the U.S. national phase of International Application No. PCT/IB2007/002196, filed 27 Jul. 2007, which designated the U.S. and claims priority to Italy Application No. MO2006A000256, filed 7 Aug. 2006; and Italy Application No. MO2007A000128, filed 6 Apr. 2007, the entire contents of each application is hereby incorporated by reference.

DESCRIPTION

The invention relates to apparatuses for moving objects, particularly doses of plastics, and for compression-moulding doses of plastics. The invention further relates to a method for transferring doses of plastics Apparatuses are known for compression-moulding doses of plastics comprising a moulding carousel with a peripheral region of which forming moulds are associated, the forming moulds comprising a moulding cavity—i.e. a female half mould—and a punch—i.e. a male half mould—that are reciprocally movable.

Each moulding cavity is arranged for receiving a dose of plastics in a pasty state, when the moulding cavity is spaced apart from the punch. Subsequently, the moulding cavity and the punch are moved closer, in such a way that the punch penetrates the moulding cavity and interacts with the dose of plastics in order to form the aforesaid dose.

Apparatuses are also known that supply the moulding cavity with doses of plastics in a pasty state.

The aforesaid apparatuses comprise cutting devices that cut the plastics exiting from a distributing nozzle of an extruder in order to give rise to the doses. The cutting devices may comprise one or more cutting elements, and one or more contrasting elements acting as abutting elements for the plastics and preventing a cutting element, after having separated a dose from the plastics exiting the distributing nozzle, from moving the same dose away from a delivery zone.

These apparatuses comprise a first carousel supporting a plurality of removing elements that remove the doses that the cutting devices have separated from the dispensing nozzle and a second carousel supporting a plurality of distributing elements that receive the doses of plastics from the aforesaid removing elements and deliver the doses to the moulding cavities.

The first carousel and the second carousel have coextensive axes of rotation and are arranged in such a way that the removing elements are positioned at a vertical height greater than the delivering elements and that the delivering elements are positioned at a vertical height greater than the moulding cavities. The removing elements are fixed to a peripheral zone of the first carousel and move along a circular path.

The distributing elements are supported by movable arms associated with a second carousel and move along a closed loop path, the closed loop path comprising a portion coincident with a portion of the aforesaid circular path, a further portion coincident with a part of the trajectory—which is also circular—defined by the moulding cavities during rotation, and two joining sections interposed between the aforesaid portion and the aforesaid further portion.

During operation, a removing element removes a dose of plastics from the extruder and, subsequently, delivers the dose to a corresponding distributing element while the removing element and the distributing element are mutually placed above and move along coextensive portions of a circular trajectory.

Still subsequently, while the removing element continues to cover a circular trajectory, a movable arm moves the distributing element away from the removing element and makes the removing element interact with a moulding cavity.

The distributing element delivers the dose of plastics to the moulding cavity while the distributing element is placed above the moulding cavity and moves along a portion of circular trajectory defined by the moulding cavities.

The movable arm enables the distributing element and the moulding cavity to interact for a longer time than the aforesaid distributing element and the moulding cavity would interact if the distributing element were fixed to a peripheral region of the second carousel. This enables an interval of time of significant magnitude to be provided, during which interval of time the dose can pass from the distributing element to the moulding cavity.

In the apparatuses previously disclosed, the movable arms are driven by cams.

A drawback of the apparatuses disclosed above lies in the fact that the dose of plastics is sheared by the corresponding movement of the distributing element and the removing element if the aforesaid dose has not been yet transferred by the removing element to the distributing element when the moving arm moves the distributing element away from the removing element in order to make the distributing element interact with the moulding cavity.

Portions of the sheared dose are spread on the apparatus. Consequently, the components of the apparatus (for example the tracks of the aforesaid cams, the moving arms, etc.) are dirtied by the plastics. Further, the plastics deposited on the aforesaid components, when the aforesaid plastics have become solid, produce stress on the components, altering the precision thereof.

A further drawback of the apparatuses disclosed above consists of the fact that the aforesaid apparatuses are remarkably complicated to manufacture and commission.

Actually, the aforesaid cams must be produced with very reduced dimensional tolerances since a small dimensional error of the cams results in a significant—and thus unacceptable—positional error of the distributing element with respect to the moulding cavity.

In particular, the movable arms act as levers that entail an amplification effect that transforms a small dimensional error of the cams into a major positioning error of the distributing elements.

In the event of a dimensional error of the cams and/or in front of an inaccurate angular step thereof, the distributing element is not aligned with the moulding cavity and, consequently, in the event of inaccuracies of a certain amount, the dose cannot be transferred.

Additionally, the wear and the deterioration of the components and the devices amplify the aforesaid inaccuracies.

Further, since the number of moulding cavities is greater than the number of distributing elements, each distributing element must supply, during operation, a plurality of moulding cavities.

A drawback of the apparatuses disclosed above consists of the fact that a proper positioning of the distributing element is very difficult to obtain with respect to all the moulding cavities of the plurality of moulding cavities that the aforesaid distributing element is designed to supply.

Positioning errors—although of limited amount—of a moulding cavity with respect to the forming carousel mean that the distributing element is not able to deposit the dose, entirely or partially, into the aforesaid moulding cavity, even though the distributing element is able to deposit the doses into the other moulding cavities of the aforesaid plurality of moulding cavities.

In addition, during the cam design step, it is very difficult to predict the values of the centrifugal and centripetal force to which the doses will be subjected during operation of the apparatuses.

As the doses have a smaller diameter than the diameter of the distributing element, through the action of the forces mentioned above the doses tend to rest on a portion of wall inside the distributing element and to be separate from a further inner wall portion of the distributing element. Thus if the distributing element is coaxial with the moulding cavities, a longitudinal axis of the dose does not substantially coincide with an axis of the moulding cavity, which makes it more difficult to transfer the dose.

This drawback could be obviated by designing the cams in such a way that the dose, and not the distributing element, is coaxial with the moulding cavity.

In this case, to move from the transfer of doses having a set diameter—and therefore intended to form preforms having a certain dimension—to the transfer of doses having a different diameter—and thus intended to form preforms having another dimension—it would be necessary to replace the cams, which makes the disclosed solution actually impracticable.

In the apparatuses previously disclosed, each distributing element comprises a tubular casing that has an upper opening, through which a dose coming from a removing element enters inside the tubular casing and a lower opening through which the dose passes from the tubular casing to a moulding cavity. Each distributing element comprises a first closing element and a second closing element that are hinged on a support for the tubular casing and are movable between an opening position, in which the passage of the dose through the lower opening is permitted, and a closing position, in which they prevent the passage of the dose through the lower opening.

The first closing element and the second closing element pass from the closing position to the opening position, and vice versa, describing arched trajectories.

An actuating device is further provided that is provided with a rod that directly drives the first closing element.

The second closing element is driven by the first closing element by means of a lever having an end hinged on the first closing element and a further end hinged on the second closing element.

A drawback of the apparatuses disclosed above consists of the fact that the first closing element and the second closing element pass from the closing position to the opening position, and vice versa, with different modes (i.e. with different motion laws) with respect to one another.

Anticipated or differed movements of one or two of the closing elements, the internal surface of which is in contact with a lower end of the dose—which may be more or less adherent to the aforesaid surface—entail stressing or twisting the dose, in particular the lower end of the dose with respect to a body of the dose. This means that the dose is subjected to stress that tends to deform the aforesaid upper end thereof, i.e. a tip zone of the dose. As a result, inserting the deformed dose inside the moulding cavity may be difficult or even impossible.

The arched trajectories of the first closing element and of the second closing element constitute a design limit inasmuch as not all the internal shapes of the first closing element and of the second closing element, which could be technologically appropriate for a good product, can be implemented, as some of these shapes do not allow, or make it extremely difficult, to extract the lower end of the dose from the first closing element and from the second closing element.

An object of the invention is to improve the apparatuses for moving objects, particularly doses of plastics.

Another object is to improve apparatuses for compression-moulding doses of plastics.

A further object is to obtain an apparatus for moving objects, in particular doses of plastics, that is provided with good accuracy and great repeatability.

Still a further object is to obtain an apparatus for supplying doses of plastics to a compression-moulding device in which the risk is eliminated that the doses are sheared as they are transferred.

A still further object is to obtain an apparatus for supplying doses of plastics to a compression-moulding device that does not deform the doses, in particular at tip zones thereof.

In a first aspect of the invention, an apparatus is provided comprising a conveying device provided with seat elements arranged for receiving objects, said seat elements being movable along a curved path, and a further conveying device provided with a transferring arrangement arranged for delivering said objects to, and/or removing said objects from, said conveying device, wherein said transferring arrangement comprises coupling elements arranged for engaging said seat elements in such a way that said seat elements and said transferring arrangement are maintained mutually coupled along a portion of said curved path.

In an embodiment, the apparatus further comprises connecting elements so shaped as to mutually connect the transferring arrangement and the seat elements along a portion of the aforesaid curved path and to release the transferring arrangement and the seat elements after the transferring arrangement and the seat elements have jointly traveled along the aforesaid portion.

In a second aspect of the invention, an apparatus is provided comprising a conveying device provided with seat elements arranged for receiving objects, said seat elements being movable along a curved path, and a further conveying device provided with a transferring arrangement arranged for delivering said objects to, and/or removing said objects from, said conveying device, wherein said apparatus further comprises connecting elements so shaped as to mutually connect said transferring arrangement and said seat elements along a portion of said curved path and to release said transferring arrangement and said seat elements after said transferring arrangement and said seat elements have jointly traveled along said portion.

Owing to these aspects of the invention, it is possible to obtain an apparatus which with great accuracy inserts objects into, or removes objects from, the seat elements. The seat elements, in fact, by interacting with the coupling elements and/or with the connecting elements, induce the transferring arrangement to move together with the seat elements, along a portion of the curved path defined by the seat elements. Whilst the transferring arrangement and the seat elements cover the aforesaid portion, the objects can be transferred from the transferring arrangement to the seat elements, or vice versa.

Further, in order to drive the transferring arrangement, it is not necessary to employ one or more cams, as in the apparatuses according to the prior art.

This enables the problems of loss of accuracy in the paths of the transferring arrangement due to the dimensional tolerances of the cams, to the wear of these latter and to the loss of precision of the devices with articulated arms of the apparatuses according to the prior art to be prevented.

The connecting elements force the transferring arrangement to move together with the seat elements, along the aforesaid portion of curved path. The aforesaid portion of curved path may thus have a very great extent, as the transferring arrangement and the seat elements cannot separate from one another until they are released by the connecting elements.

In an embodiment, the conveying device comprises a compression-moulding device and the seat elements comprise moulding cavities of forming moulds supported by the compression-moulding device.

In this case, it is possible to obtain an apparatus in which the transferring arrangement comes directly into contact with the moulding cavities—or with abutting elements associated therewith—during transferring of the doses.

During transferring of the doses, in fact, the coupling elements and/or the connecting elements interacts with the moulding cavities in such a way that the moulding cavities are reference and centring elements for the transferring arrangement.

That does not occur in the apparatuses according to the prior art in which reference elements for the distributing elements are totally absent, the distributing elements being actually positioned above the moulding cavities, without, however, ever coming into contact with the latter.

Additionally, the moulding cavities, by interacting with the coupling elements, function as driving elements of the transferring arrangement, assuring that the transferring arrangement and the moulding cavities travel along a common portion of trajectory in an interval of time during which the dose is transferred from the transferring arrangement to the moulding cavities.

That does not occur in the apparatuses of the prior art, in which the distributing elements are actuated by cams, which entails positioning errors of the distributing elements, to which errors also possible positioning errors are added arising from a non-optimal kinematic synchronisation of the different devices (for example mechanical problems in transmitting the movements of the carousel devices).

In a third aspect of the invention, an apparatus is provided, comprising a transferring arrangement arranged for delivering doses of plastics to a compression-moulding device, said transferring arrangement comprising receiving elements arranged for removing said doses from an extruding device and delivering elements arranged for receiving said doses from said receiving elements and delivering said doses to said compression-moulding device, wherein said receiving elements and said delivering elements are mutually fixed. Owing to this aspect of the invention, an apparatus can be obtained, in which, unlike what occurs in the apparatuses according to the prior art, the doses are not sheared when the receiving elements and the delivering elements move with respect to each other.

In a fourth aspect of the invention, an apparatus is provided, comprising a transferring arrangement arranged for delivering doses of plastics to a compression-moulding device, wherein said apparatus further comprises a first closing element cooperating with a second closing element for closing and/or opening an opening of said transferring arrangement that is traversable by said doses and a driving device arranged for moving said first closing element and said second closing element maintaining said first closing element and said second closing element parallel to one another on a plane arranged substantially parallel to said opening.

Owing to this aspect of the invention, it is possible to obtain an apparatus in which, unlike what occurs in the apparatuses according to the prior art, the first closing element and the second closing element do not exert stresses on the doses that could distort said doses, in particular tip zones of the doses.

This enables the doses to be transferred more easily to the compression-moulding device and to be inserted with greater precision into moulding cavities of forming moulds supported by the compression-moulding device.

In a fifth aspect of the invention, an apparatus is provided, comprising a transferring arrangement arranged for delivering doses of plastics to a compression-moulding device, said transferring arrangement comprising receiving elements arranged for removing said doses coming from an extruding device, wherein said receiving elements are so shaped as to remove from said compression-moulding device objects obtained from said doses.

In a sixth aspect of the invention an apparatus is provided, comprising a compression-moulding device provided with a mould arrangement arranged for compression-moulding doses of plastics to obtain container preforms and a movement device provided with a transferring arrangement arranged for supplying said mould arrangement with said doses and for removing from said mould arrangement said preforms.

In a seventh aspect of the invention, an apparatus is provided comprising a compression-moulding device provided with a mould arrangement arranged for compression-moulding doses of plastics to obtain container preforms and a movement device provided with a transferring arrangement arranged for supplying said mould arrangement with said doses and with a removing arrangement arranged for removing said preforms from said mould arrangement.

Owing to these aspects of the invention, it is possible to obtain a very compact apparatus in which a single movement device delivers the doses of plastics to the mould arrangement and removes from the mould arrangement the objects obtained by forming the doses.

In particular, as a dose and a preform have a certain degree of similarity—i.e. both have a lengthened shape—the receiving elements can be adapted in such a way that said receiving elements, during a step of the operating cycle, removes a dose from the extruding device (or from a cutting device that separates the dose from the extruding device) and, during a subsequent step of the operating cycle, removes a preform from the mould arrangement.

In the apparatuses according to the prior art, on the contrary, a supplying device is provided for supplying the doses to a compression-moulding carousel and a removing device is provided for removing the preforms from the forming carousel. The removing device and the supplying device are positioned alongside one other, the removing device being arranged upstream of the supplying device with respect to a rotation direction of the forming carousel.

Owing to these aspects of the invention, an apparatus can be obtained in which the preforms can be held inside the compression-moulding device for a longer time than the apparatuses according to the prior art. This enables better cooling of the preforms on the forming device to be obtained.

Owing to these aspects of the invention, in fact, as a single movement device is provided that delivers the doses and removes the preforms, a dose, and the preform obtained therefrom, remains substantially on the compression-moulding device for a complete revolution of the compression-moulding device.

On the other hand, in known apparatuses, the preform is removed from a mould before a dose—designed for forming a further preform—is introduced into the mould.

Therefore, each dose, and the preform obtained therefrom, remain aboard the compression-moulding carousel for less than a complete revolution of the compression-moulding carousel.

Further, owing to these aspects of the invention, since a single movement device is provided for delivering the doses and removing the preforms, the overall volumes are reduced and the extruder can be positioned with respect to the movement device in such a way that the doses remain on the movement device for a shorter time than in the supplying devices according to the prior art.

That reduces the risks of adhesion of the doses to the transferring arrangement of the movement device.

Further, that makes a reduced thermoregulation of said transferring arrangement sufficient.

In an eighth aspect of the invention, an apparatus is provided comprising a transferring arrangement arranged for delivering doses of plastics to a compression-moulding device, said transferring arrangement comprising containing elements arranged for receiving said doses, wherein said transferring arrangement comprises movement promoting elements received into said containing elements and movable with respect to said containing elements for delivering said doses to said compression-moulding device.

Owing to this aspect of the invention, it is possible to obtain an apparatus in which the doses are accompanied by the transferring arrangement up to the interior of moulding cavities of the compression-moulding device, which enables the transferring of the doses to be simplified and the positioning of said doses in the moulding cavities to be improved.

In a ninth aspect of the invention, an apparatus is provided, comprising a transferring arrangement arranged for delivering doses of plastics to a compression-moulding device, said transferring arrangement comprising receiving elements arranged for removing said doses coming from an extruding device and delivering elements arranged for receiving said doses from said receiving elements and delivering said doses to said compression-moulding device, wherein said receiving elements are supported by said delivering elements and are movable with respect to said delivering elements.

The receiving elements are movable between a first operating position, in which the receiving elements and the delivering elements are substantially coaxial, and a second operating position, in which the receiving elements are in a more advanced position with respect to the delivering elements in a movement direction of the transferring arrangement.

Owing to this aspect of the invention, it is possible to obtain an apparatus in which, when the receiving elements are in the first operating position, the passage of a dose from the receiving elements to the delivering elements is promoted, and, when the receiving elements are in the second operating position, removing an object formed from one of the aforesaid doses from the compression-moulding device is promoted.

Further, as the receiving elements move from the first operating position to the second operating position possible residual plastics are removed from a face of the delivering elements.

In a tenth aspect of the invention, a method is provided, comprising receiving a dose of plastics in a transferring arrangement suitable for transferring said dose to a compression-moulding device, dispensing into said transferring arrangement a first flow of fluid having a preset pressure for generating a cushion of fluid that surrounds at least partially said dose and further dispensing into said transferring arrangement a second flow of fluid having further preset pressure to eject said dose from said transferring arrangement, said further preset pressure being greater than said preset pressure.

Owing to this aspect of the invention it is possible to eject very effectively the dose of plastics from the transferring arrangement.

The first flow of fluid (i.e. the jet of high-pressure fluid), does not in fact act directly on the dose, but on the cushion of fluid that at least partially envelops the dose. In this way, the dose is subjected to more uniform stress than is the case if it is hit directly by the jet of high-pressure fluid.

The dose does not therefore undergo stress that tends to deviate the dose and make the dose interact with, and become attached to, the walls of the transferring arrangement, which would compromise correct transferring of the dose from the transferring arrangement to the compression-moulding device.

The invention can be better understood and carried out with reference to the accompanying drawings, that illustrate some exemplifying and non-restrictive embodiments thereof, wherein:

FIGS. 66 to 69 are perspective side views of the upper part of the movement device;

FIG. 76 is a section like the one in FIG. 74 showing the conveying element in a further operating configuration;

Figure 1:
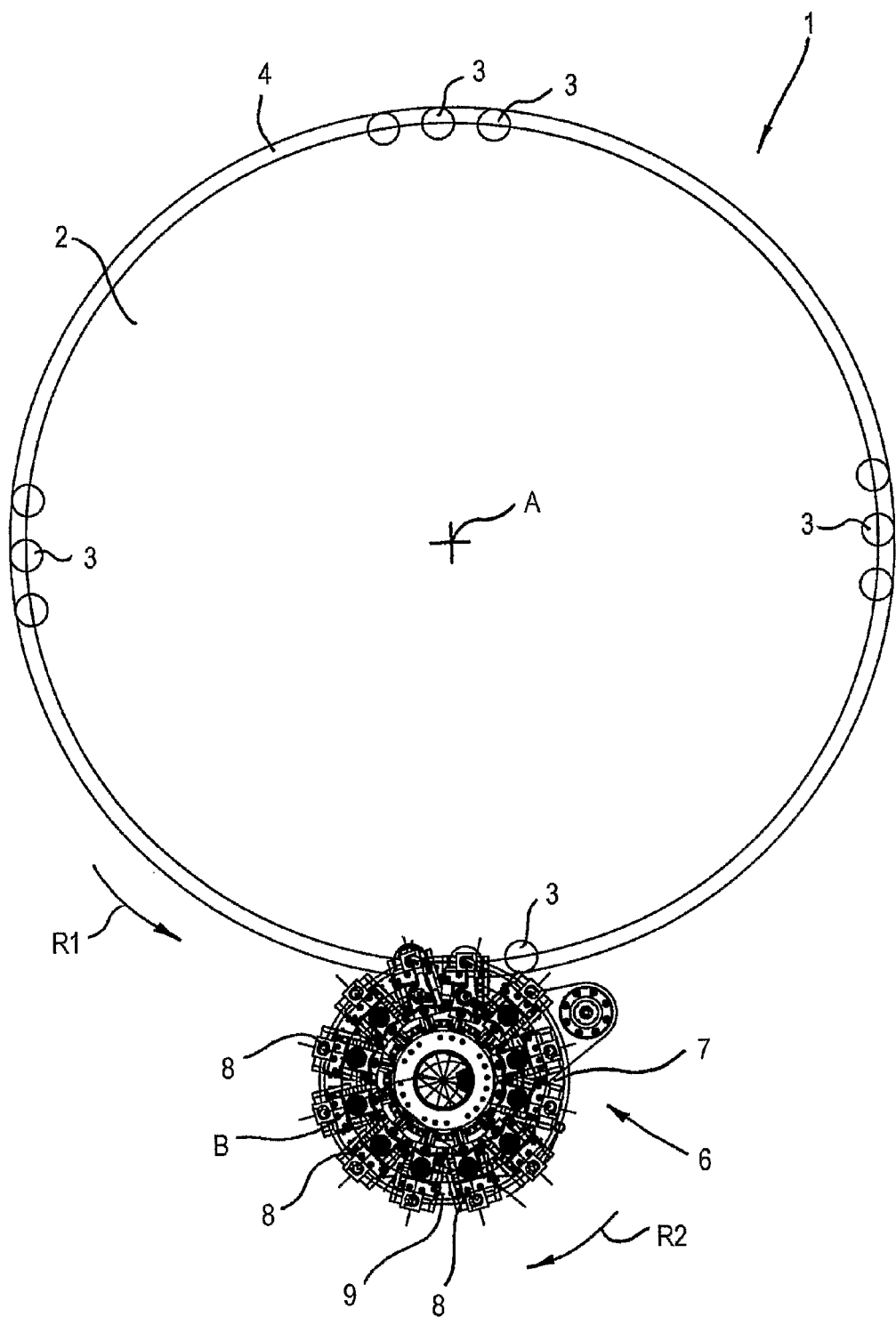
FIG. 1 is a plan view of an apparatus comprising a compression-moulding device and a conveying device.
Figure 2:
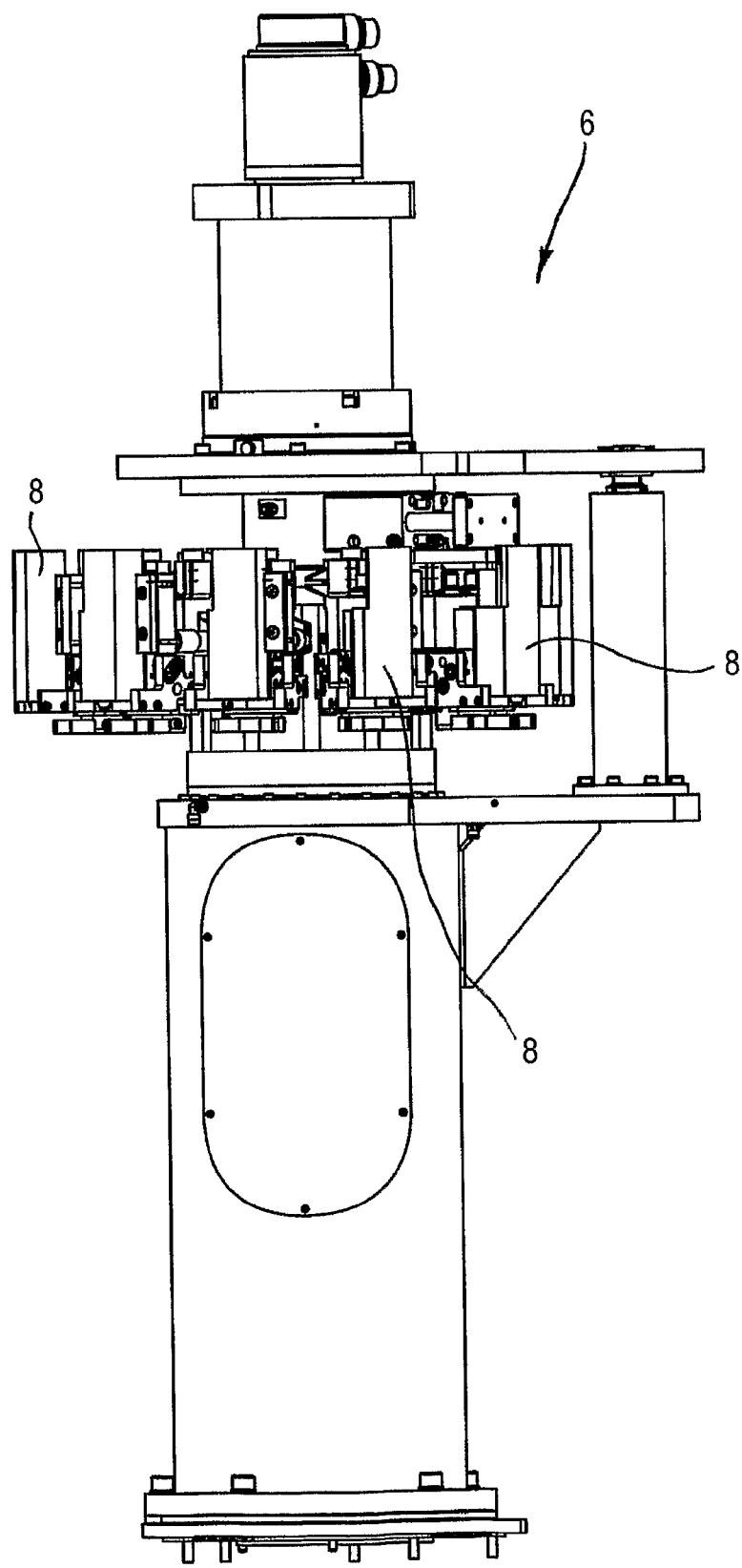
FIG. 2 is a side view of the conveying device in FIG. 1.
Figure 3:
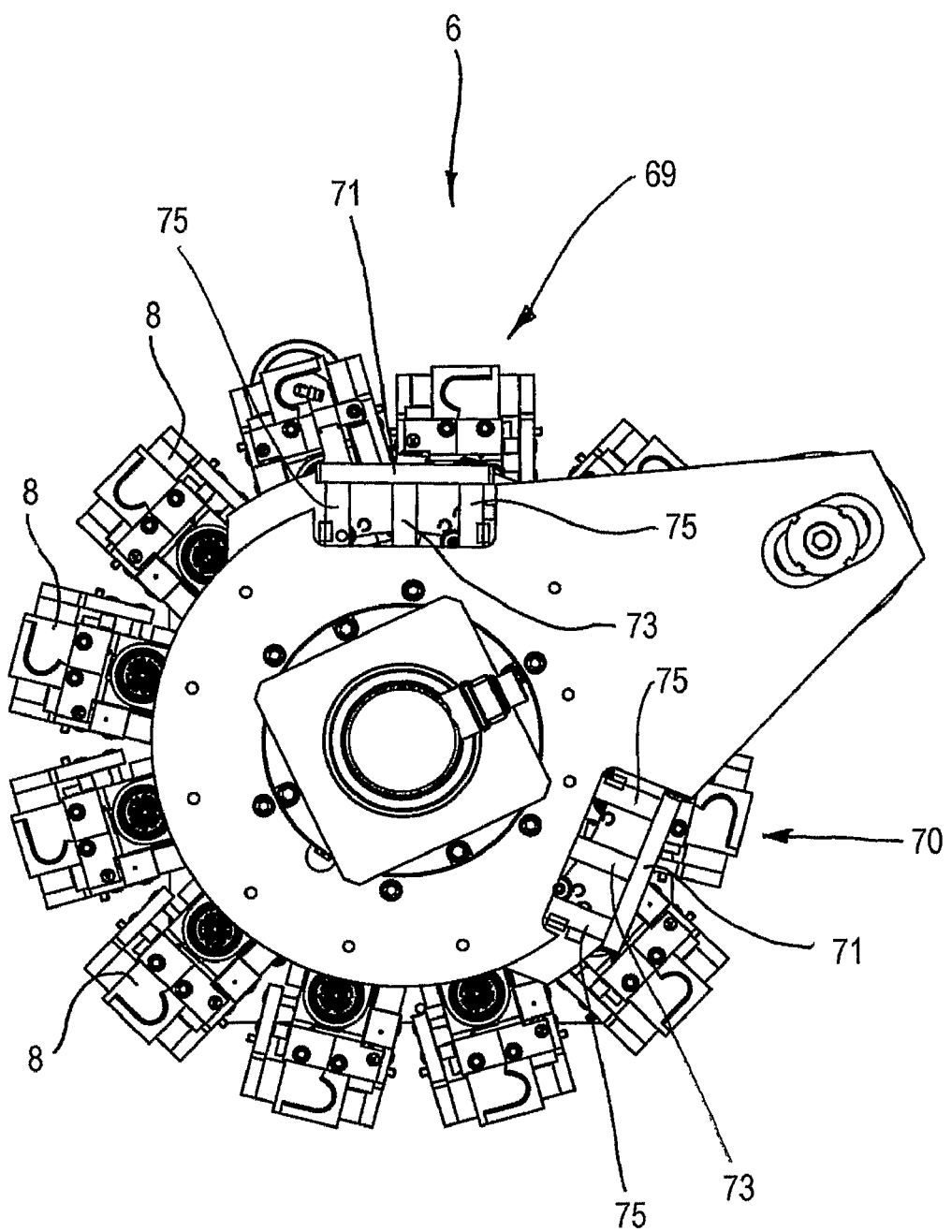
FIG. 3 is a plan view of the conveying device in FIG. 1.

With reference to FIGS. 1 to 18, there is shown a forming device 1 for compression-moulding doses of plastics comprising a carousel 2 that is rotatable around an axis A, in a direction R1, and supporting a plurality of forming moulds 3. The forming moulds 3 are positioned in a peripheral zone 4 of the carousel 2 and are arranged so as to be substantially uniformly angularly spaced apart. For the sake of simplicity, only a few of the forming moulds 3 are shown in FIG. 1.

Each forming mould 3 comprises a moulding cavity 5 and a punch—not shown—that are reciprocally movable. The forming mould 3 may assume an open configuration, in which the moulding cavity 5 and the punch are spaced apart from one another in such a way that a dose 80 (FIG. 21) of plastics is inserted into the moulding cavity 5 and a formed object, for example a container preform, is removed from the forming mould 3, and a closed configuration, wherein the punch penetrates the moulding cavity 5 to shape the dose 80.

In an embodiment that is not shown, the forming device 1 comprises, in place of the carousel 2, a moving and supporting element of the forming moulds 3, provided with a flexible element, for example a belt or chain element, that is movable along a closed loop path.

Cutting devices are further provided, which are not shown, that cut the plastics exiting a distributing nozzle of an extruder in order to give rise to the doses 80. The cutting devices may comprise one or more cutting elements, and one or more contrasting elements acting as abutting elements for the plastics and preventing a cutting element, after a dose was separated from the plastics exiting the distributing nozzle, from moving the same dose away from a delivery zone. A conveying device 6 is further provided that receives the doses 80, separated by said cutting devices from the distributing nozzle, and delivers the doses 80 to the forming device 1.

In an embodiment that is not shown, instead of the forming device 1, a rotating operating device is provided, on the periphery of which a plurality of seats are provided.

In that case, the conveying device 6 can deliver objects to said seats, or can remove objects from said seats.

The conveying device 6 comprises a further carousel 7, rotating around a further axis B along a further direction R2, and supporting a plurality of conveying elements 8, positioned in a further peripheral zone 9 of the further carousel 7 and arranged so as to be substantially uniformly angularly spaced apart.

The carousel 2 and the further carousel 7 can be rotated by independent and mutually synchronised driving devices—for example electric motors.

In an embodiment that is not shown, instead of the further carousel 7, the conveying device 6 comprises a moving and supporting element of the conveying elements 8, provided with a flexible element, for example a belt or chain element that is movable along a closed loop path.

Each conveying element 8 comprises a pair of guiding rods 10 received in holes 11 of the further carousel 7.

The holes 11 may accommodate recirculating-ball bushings.

Figure 5:
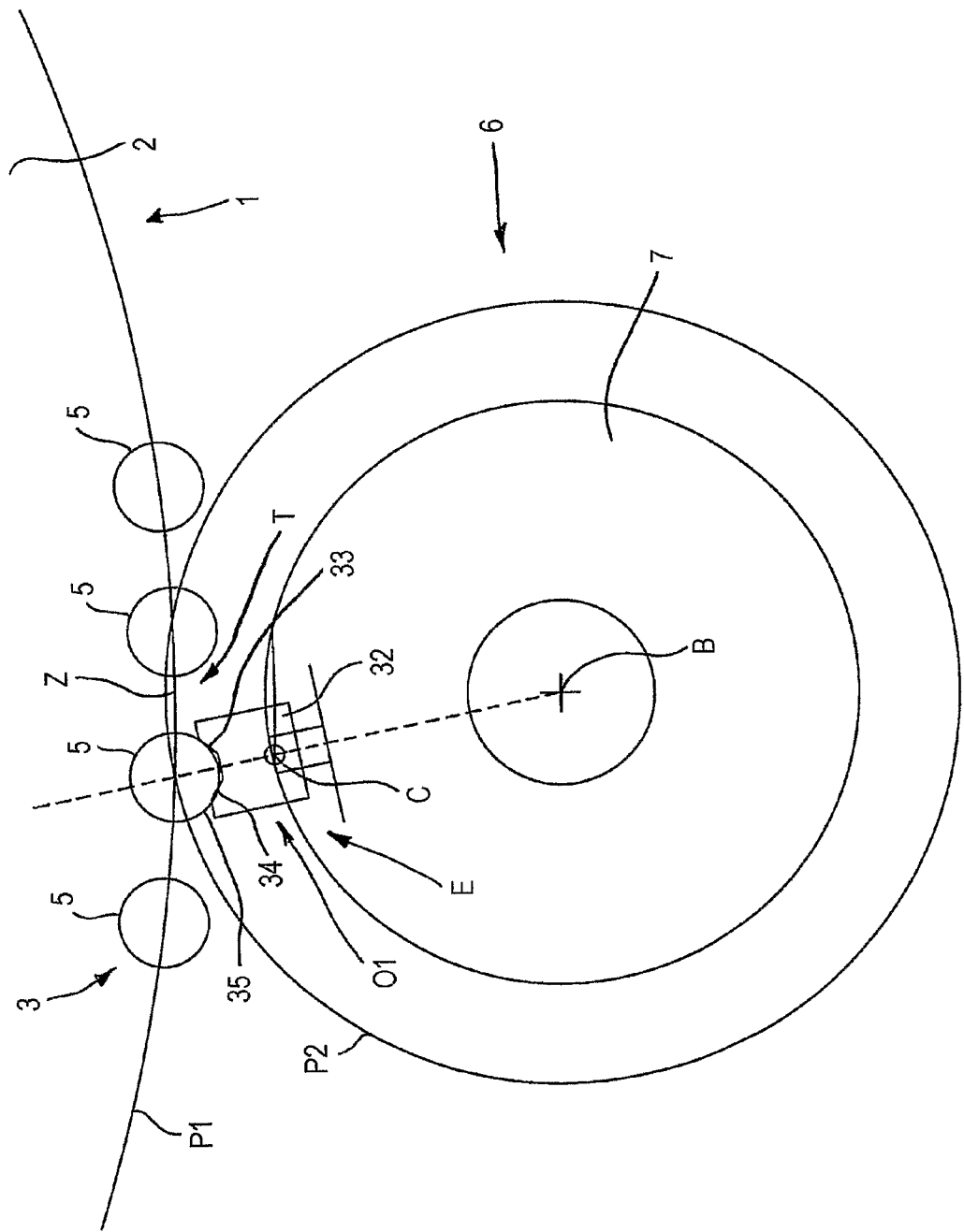
FIG. 5 is a schematic and fragmentary plan view of the apparatus in FIG. 1 showing conveying elements of the conveying device in an operating configuration.

A spring 12 is interposed between the further carousel 7 and the conveying element 8, said spring 12 pulling the conveying element 8 to move away from the further carousel 7 and to remain in a configuration of maximum extent E, shown in FIG. 5, in which the guiding rods 10 protrude by a maximum amount outside the holes 11.

The maximum extent configuration E is established by end stroke elements associated with the guiding rods 10.

The spring 12 is internally led by a column 13 and is accommodated in a protecting case 14 preventing, in the event of failure, portions of the spring 12 from damaging components of the conveying device 6.

The conveying element 8 comprises a supporting body 15 to which the guiding rods 10 are fixed and which supporting body 15 is radially moving with respect to the carousel 2, moving closer to or away from the further axis B.

The conveying element 8 further comprises a further supporting body 16 rotatably supported on the supporting body 15 and oscillating around a still further axis C, arranged substantially parallel to the further axis B.

The supporting body 15 is traversed by a hole 17—arranged substantially parallel to the still further axis C—inside which a shank 18 of the further supporting body 16 is received. Bearings 19 are interposed between the hole 17 and the shank 18, said bearings 19 enabling the further supporting body 16 to oscillate around the further axis C with respect to the supporting body 15.

The further supporting body 16 comprises a handling element 20 provided with a receiving portion 21, arranged for receiving a dose 80 that the aforesaid cutting devices have separated from the dispensing nozzle, a containing portion 22, arranged for containing the dose 80 and giving the dose 80 a desired shape, and a joining portion 23, interposed between the receiving portion 21 and the containing portion 22 and arranged for facilitating transferring of the dose 80 from the receiving portion 21 to the containing portion 22.

The handling element 20 is shaped in such a way that the receiving portion 21, the containing portion 22 and the joining portion 23 are made of a single piece or anyway of several parts that are distinct from one another that, once they are assembled, define continuous internal surfaces for profiles and dimensions. The receiving portion 21 is "C" or "U"-shaped, and is internally provided with a gap 24, open towards the further rotating direction R2, and generally shaped like a reversed truncated cone, i.e. having a decreasing section approaching the joining portion 23.

The containing portion 22 is internally provided with a cavity 25 of substantially cylindrical shape.

The joining portion 23 is internally provided with a further recess 26 shaped like a reversed truncated cone, i.e. having a decreasing section approaching the containing portion 22. In other words, the joining portion 23 has a funnel-like shape for facilitating inserting of the dose 80 into the containing portion 22.

The joining portion 23 is provided with an inlet opening 27 through which the dose 80, removed by the extruder (or by the aforesaid cutting devices that cut the plastics that exit a dispensing nozzle of the extruder to give rise to the doses 80) from the receiving portion 21, penetrates inside the joining portion 23.

The containing portion 22 is provided with an exit opening 28 through which the dose 80 is delivered to a moulding cavity 5.

A thermoregulating arrangement is provided arranged for regulating the temperature of the handling element 20, in order to prevent the plastics from involuntarily adhering to the surfaces designed to come into contact with the doses.

The thermoregulating arrangement may comprise a cooling conduit arrangement obtained in the handling element 20 and supplied with a cooling liquid.

The thermoregulating arrangement may further comprise dispensing devices for dispensing a cooling gas, or other pressurised fluids that when expanding in volume on exiting micropores or holes tend to cool, consequently cooling the surfaces with which said fluids interact.

An internal portion of the handling element 20, intended to interact with the plastics, can be made of material provided with porosity through which the gas cooling gas is dispensed.

The internal portion, both in the case of a thermoregulating arrangement using a cooling liquid and in the case of a thermoregulating arrangement using a cooling gas, may be subjected to surface finishing treatments—that may also provide in some cases the application of coating materials—preventing the plastics from adhering and improving the mutual sliding capability between the plastics and said internal portion.

Figure 21:
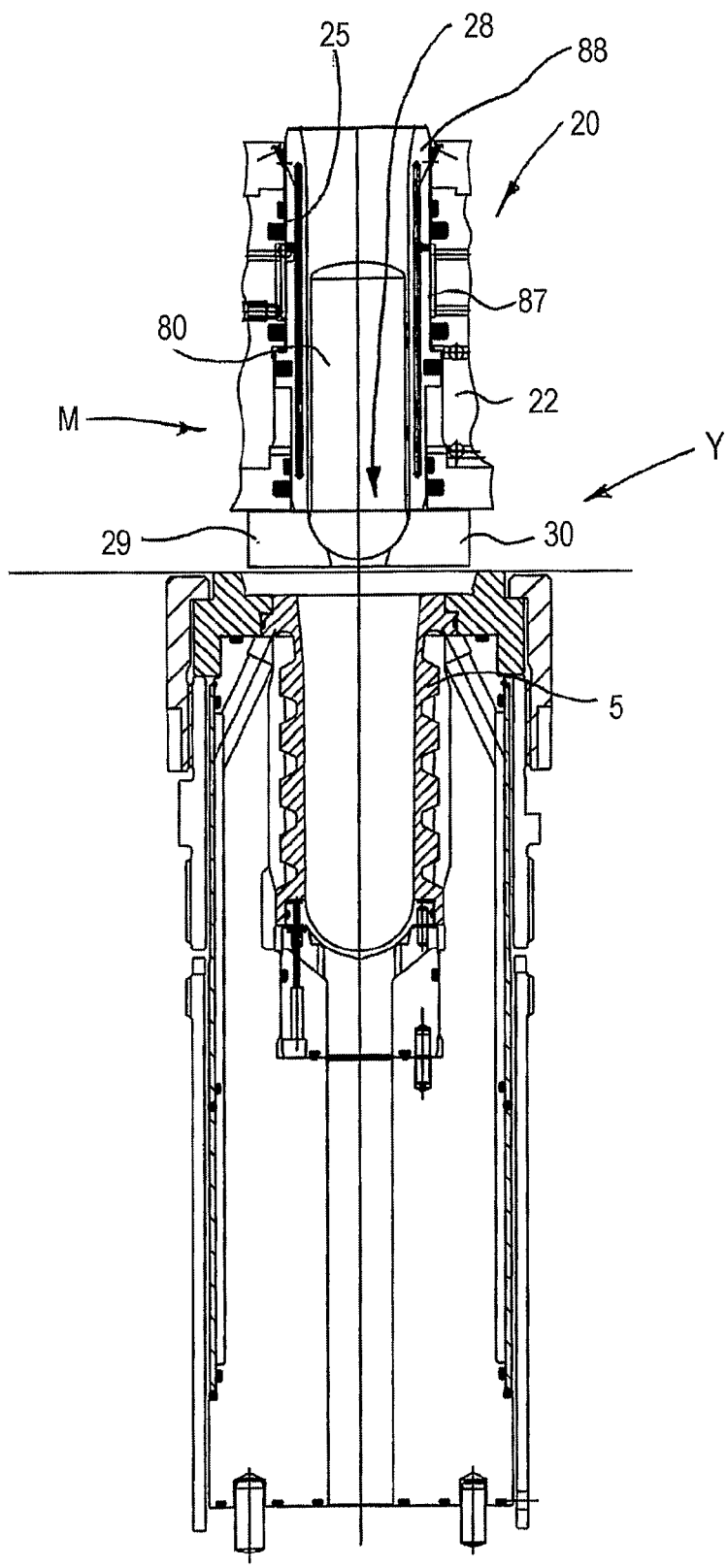
FIG. 21 is a longitudinal section of a moulding cavity of a forming device and of a handling element of a conveying device in an operating configuration.
Figure 22:
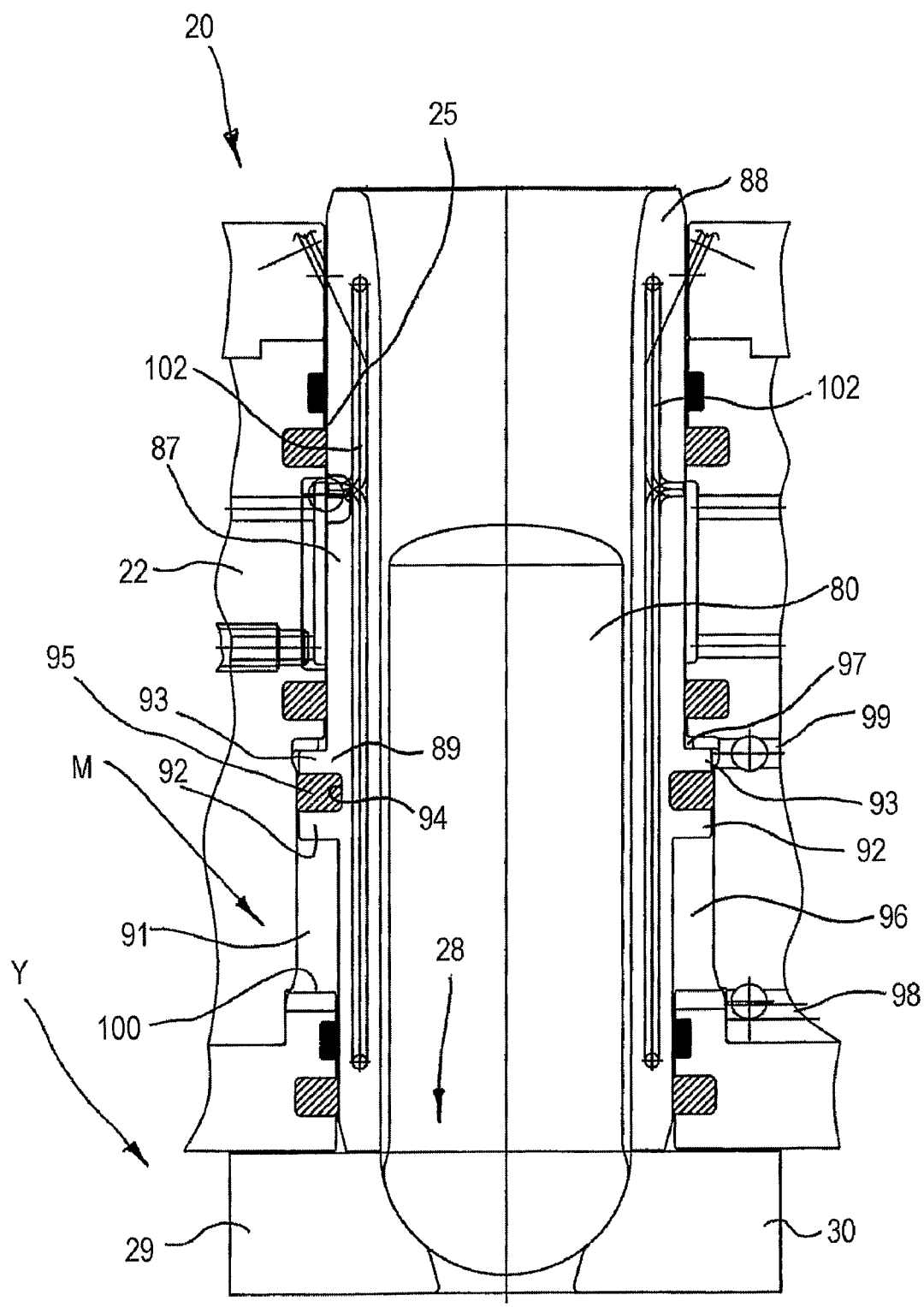
FIG. 22 is an enlarged detail of FIG. 21.

A first closing element 29 and a second closing element 30 are further provided, associated with the exit opening 28 and moving between an open configuration X, shown in FIGS. 4, 15, 16, 23 and 24, wherein the first closing element 29 and the second closing element 30 enable the dose 80 to pass through the exit opening 28, and a closed configuration Y, shown in the FIGS. 21 and 22, wherein the first closing element 29 and the second closing element 30 prevent the dose 80 from passing through the exit opening 28.

The first closing element 29 and the second closing element 30 comprise a profiled portion 31 arranged for giving the tip of the dose 80 a desired shape.

A coupling element 32, arranged for engaging a moulding cavity 5, that will be disclosed in greater detail below, is associated with the further supporting body.

The coupling element 32 comprises a first coupling wall 33 and a second coupling wall 34, mutually sloped to define a "V" shaped seat 36, said first coupling wall 33 and second coupling wall 34 being arranged for interacting with an external surface of a moulding cavity 5, particularly with an external cylindrical surface 35.

During operation, the carousel 2 rotates around the axis A, in such a way that the forming moulds 3, supported by the carousel 2, move forward in the direction R1 along a circular path P1.

The further carousel 7 rotates around the further axis B, in such a way that the transferring elements 8, supported by said further carousel 7—said transferring elements 8 being held in the maximum extent configuration E by the spring 12—move forward in the further direction R2 along a further circular path P2.

Figure 6:
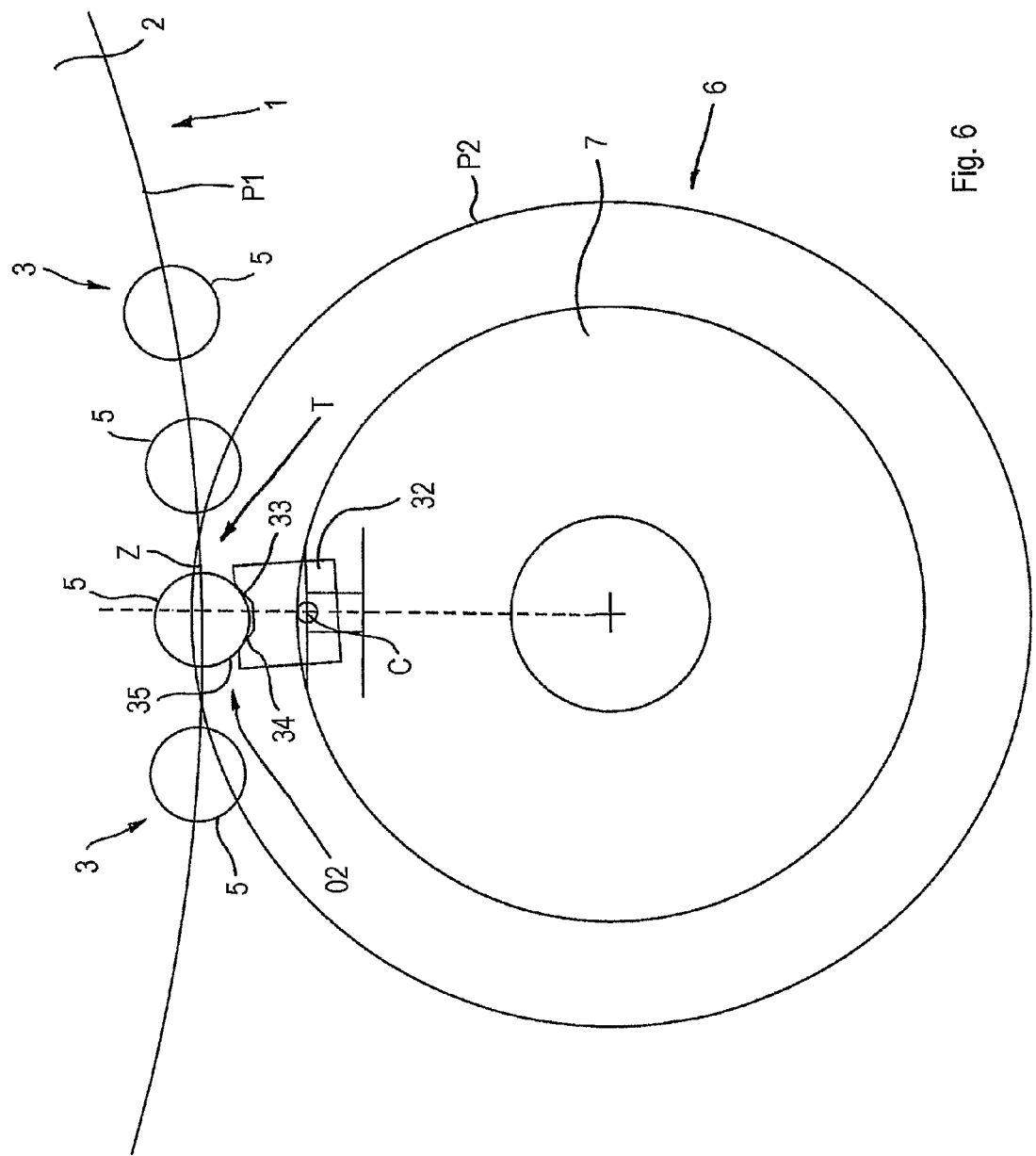
FIG. 6 is a view like the one in FIG. 5 showing conveying elements in a further operating configuration.

The forming device 1 and the conveying device 6 are positioned in such a way that the circular path P1 and the further circular path P2 intersect in a transferring zone T, shown in FIGS. 5 and 6, wherein the doses 80 are transferred from the conveying elements 8 to the moulding cavities 5.

In other words, the axis A and the further axis B are spaced apart by a distance that is less than the sum of the radii of the circular path P1 and the further circular path P2.

During rotation of the carousel 2 and the further carousel 7, a conveying device 8, lying on a starting portion of the transferring zone T, interacts with a corresponding forming mould 3.

The first coupling wall 33 and the second coupling wall 34 engage with the external cylindrical surface 35 of the moulding cavity 5 of the forming mould 3, such moulding cavity 5 being received into the "V" shaped seat 36.

While the carousel 2 and the further carousel 7 continue to rotate, the moulding cavity 5 forces the conveying element 8 to move away from the maximum extent configuration E and to move closer to the further rotation axis B.

The supporting body 15 moves radially with respect to the further carousel 7, while the guiding rods 10 are partially received into the holes 11, the thrust applied on the supporting body 15 by the spring 12 being overcome by the force applied by the moulding cavity 5 on the coupling element 32.

The conveying element 8, during the movement, is maintained in contact with the coupling element 32 by the force applied by the spring 12.

As emerges from a comparison between FIG. 5 and FIG. 6, the further supporting body 16 rotates with respect to the supporting body 15—passing from a first operating configuration O1 shown in FIG. 5 to a further operating configuration O2 shown in FIG. 6—while the first coupling wall 33 and the second coupling wall 34 remain in contact with the external cylindrical surface 35. The conveying element 8, therefore, at the transferring zone T leaves the further circular path P2 and moves along a portion Z of the circular path P1.

Thus, the transferring element 8 and the moulding cavity 5 interact for a significantly long interval of time, during which a dose 80 can be properly transferred from the transferring element 8 to the moulding cavity 5.

Since the first coupling surface 33 and the second coupling surface 34 remain in contact with the external cylindrical surface 35, the containing portion 22 is arranged above, and aligned with, the moulding cavity 5, while the moulding cavity 5 and the handling element 20 together travel along the portion Z.

This enables an optimum transfer of the dose 80 from the containing portion 22 to the moulding cavity 5, since the moulding cavity 5 acts as reference and centring element for the conveying element 8, assuring proper positioning of the handling element 20 with respect to the moulding cavity 5.

In addition, since the further supporting body 16 can rotate with respect to the supporting body 15 and the supporting body 15 can move radially with respect to the further carousel 7, while the spring 12 forces said supporting body 15 to move away from the further axis B, the coupling element 32 can properly engage the moulding cavity 5 even if the position of the coupling element 32 and/or the position of the moulding cavity 5 differ—within certain limits—from those theoretically provided.

What has been explained above, in addition to the shape of the "V" like seat that engages the external cylindrical surface 35 and to the yielding in radial direction—allowed by the spring 12—of the conveying element 8, enables errors of synchronisation to be compensated between the rotation speed of the carousel 2 and the rotation speed of the further carousel 7.

The external cylindrical surface 35 is subjected to mechanical machining operations, for example grinding, that assure such a high dimensional precision thereof that the moulding cavity 5 can optimally perform the function of becoming a reference and centring element for the conveying element 8.

When the coupling element 32 interacts with the external cylindrical surface 35, the forming mould 3 is in the open configuration and the moulding cavity 5 is in the lower dead centre position of the stroke thereof.

The moulding cavity 5 is moved by an actuating device provided with a rod, to one end of which the moulding cavity 5 is fixed.

In the bottom dead point position, a major portion of said rod is accommodated inside a guiding sleeve.

In the bottom dead point position, therefore, the moulding cavity 5 is provided with high stiffness, which enables more accurate positioning of the handling element 20 to be obtained.

The moulding cavity 5, the coupling element 32 and the handling element 20 can be configured in such a way that, when the coupling element 32 interacts with the external cylindrical surface 35, an axis of the containing portion 22 is substantially coextensive with an axis of the moulding cavity 5.

In practice, the dose 80 can exhibit a slightly smaller diameter than the containing portion 22.

In this case, the dose 80 can rest on a portion of internal wall of the containing portion 22 and stay apart from a further portion of internal wall of the containing portion 22, opposite said portion of internal wall.

In other words, the dose 80 arranges itself inside the handling element 20 so as to be asymmetrical with respect to the axis of the containing portion 22.

An adjusting arrangement 37 is provided enabling the coupling element 32 to be moved with respect to the further supporting body 16, in such a way that, when the coupling element 32 interacts with the external cylindrical surface 35, an axis of the dose 80 (but not the axis of the containing portion 22) is substantially coextensive with an axis of the moulding cavity 5.

Figure 33:
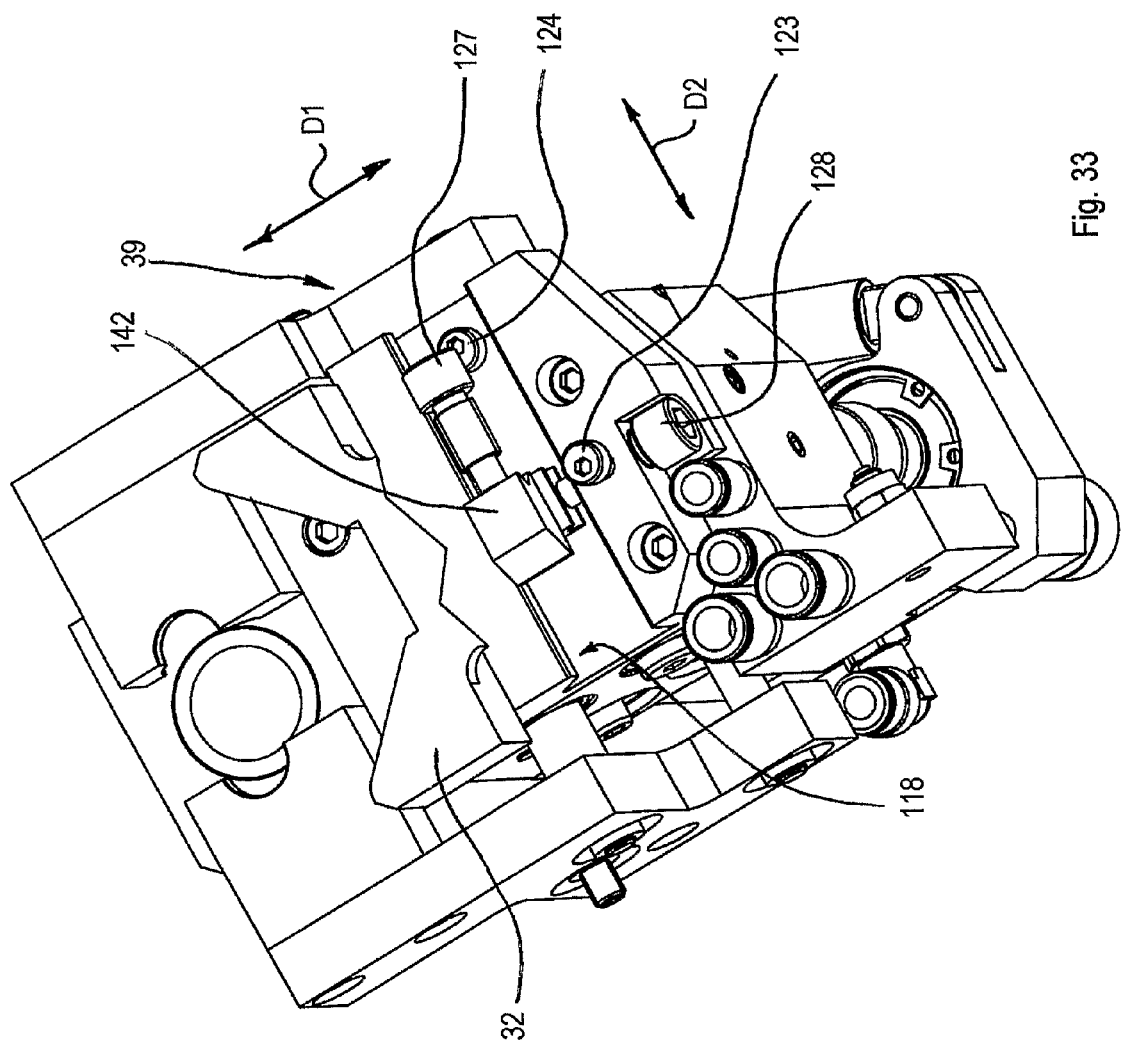
FIG. 33 is a partially schematic perspective view from below of a conveying element.
Figure 34:
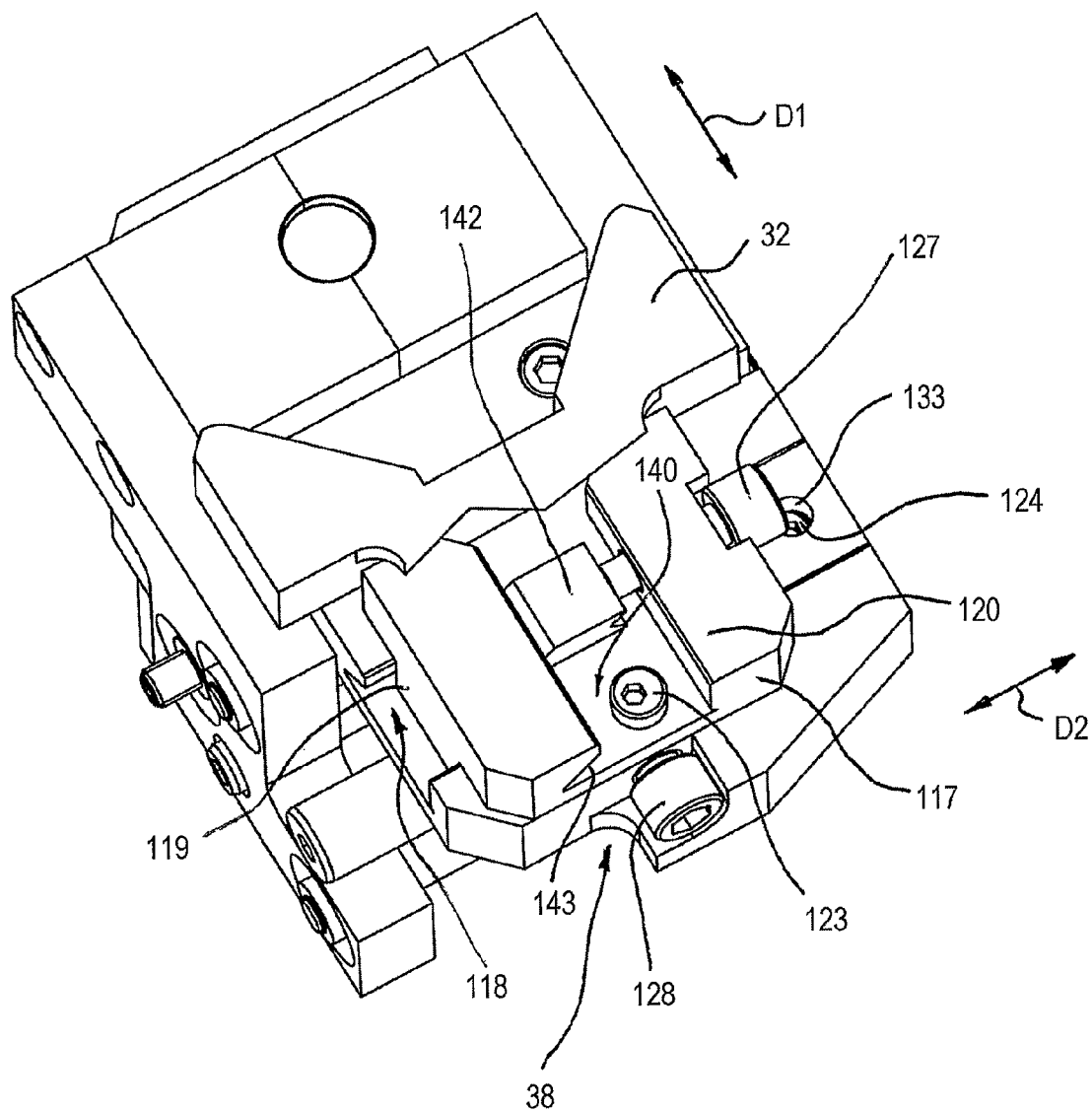
FIG. 34 is a partially schematic perspective view from below of the conveying element in FIG. 33.
Figure 35:
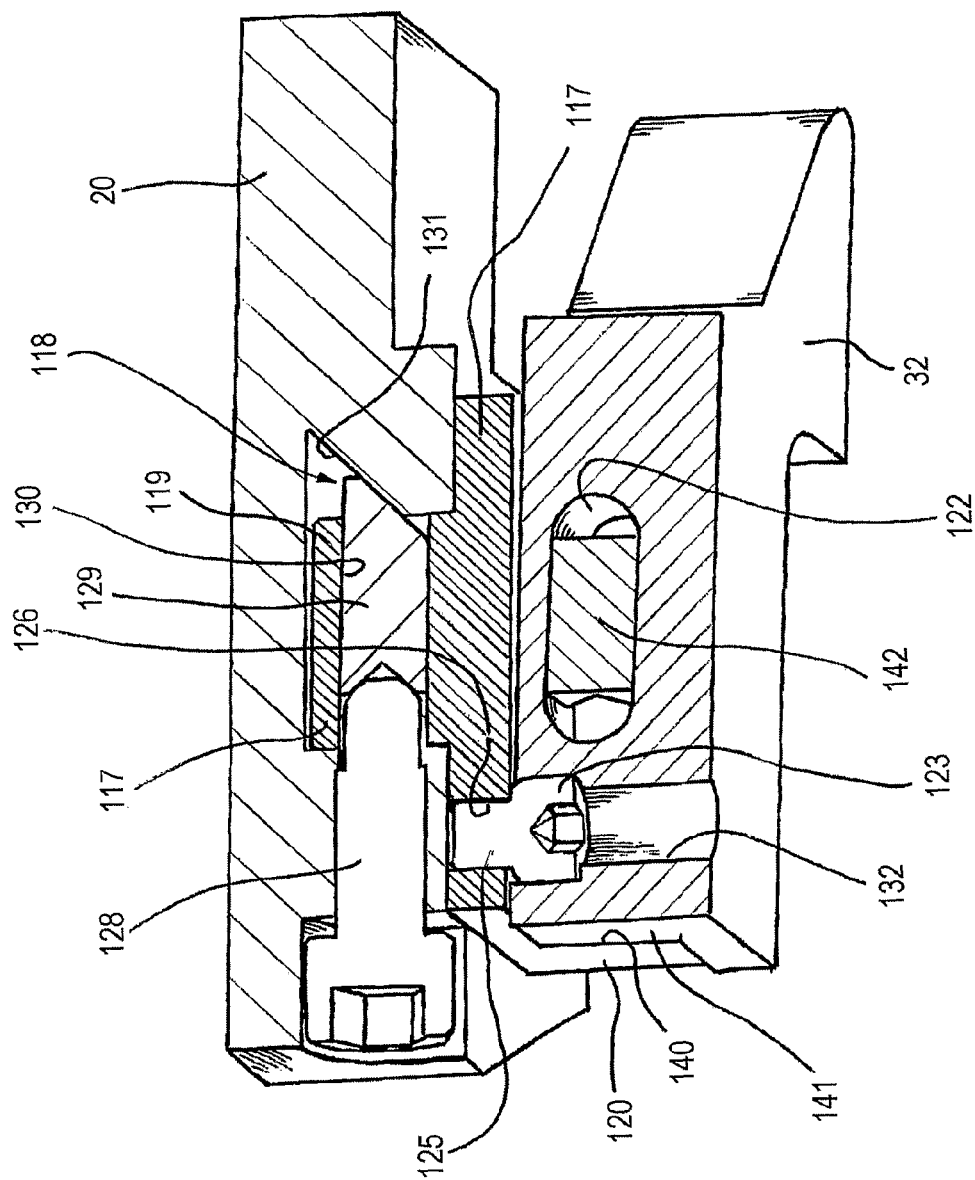
FIG. 35 is a perspective, schematic and sectioned view of the conveying element in FIG. 33.
Figure 36:
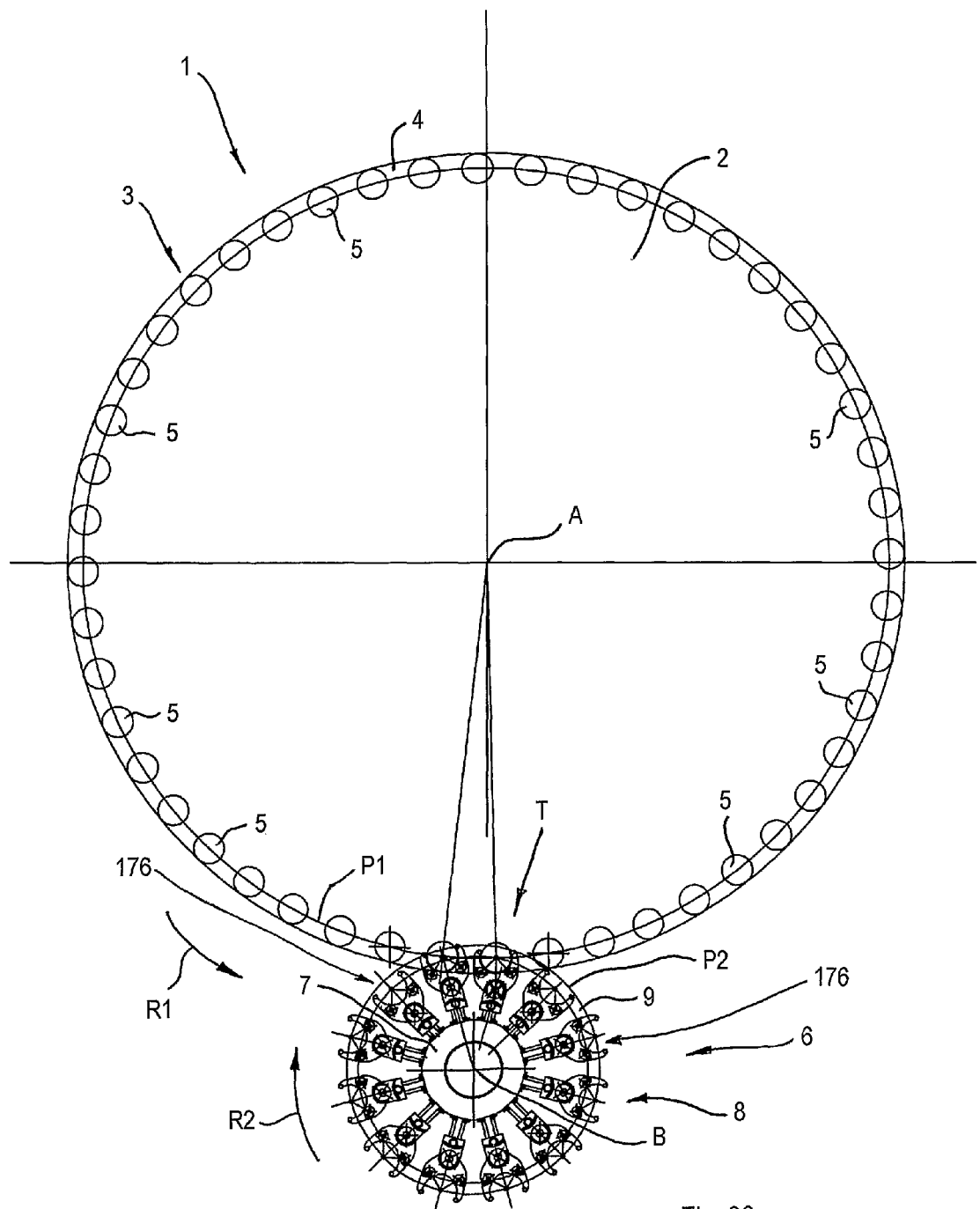
FIG. 36 is a schematic plan view of an apparatus comprising a compression-moulding device and a conveying device.

The adjusting arrangement 37 comprises a first adjusting arrangement 38, arranged for moving the coupling element 32 along an adjusting direction D1, shown in FIGS. 10, 32, 33 and 34, radially arranged with respect to the further carousel 7, and a second adjusting arrangement 39, arranged for moving the coupling element 32 along a further adjusting direction D2, shown in FIGS. 33 and 34, transversally arranged with respect to the further carousel 7.

A slide 117 is provided, having a first portion 119 sliding inside a groove 118 obtained in the handling element 20 and a second portion 120 provided with a further groove 140 inside which an appendage 141 of the coupling element 32 is slidable.

The first adjusting arrangement 38 comprises a first eccentric cam pin 123 having a shank 125 received into a seat 126 obtained inside the slide 117.

The first eccentric cam pin 123 moves the coupling element 32 with respect to the slide 117, along the adjusting direction D1.

The first eccentric cam pin 123 may be rotated by means of a suitable tool insertable into a through hole 132 obtained in the coupling element 32.

The first adjusting arrangement 38 further comprises a first clamping screw 127 locking the coupling element 32 on the slide 117, once the coupling element 32 has been arranged in a desired position with respect to the slide 117.

The first clamping screw 127 operates on a wedge element 142 received into a hole 122 obtained in the coupling element 32, to press the wedge element 142 against a wall 143 of the further groove 140.

The second adjusting arrangement 39 comprises a second eccentric cam pin 124 having a further shank received into a further seat obtained in the handling element 20.

The second eccentric cam pin moves the slide 117 with respect to the handling element 20, along the further adjusting direction D2.

The second eccentric cam pin 124 may be rotated by means of a proper tool insertable into a further through hole 133 obtained in the slide 117.

The second adjusting arrangement 39 further comprises a second clamping screw 128 locking the slide 117 on the handling element 20, once the slide 117 has been arranged in a desired position with respect to the handling element 20. The second clamping screw 128 operates on a further wedge element 129 received into a further hole 130 obtained in the slide 117, for pressing the further wedge element 129 against a further wall 131 of the groove 118.

While the carousel 2 and the further carousel 7 continue to rotate, the conveying element 8 and the moulding cavity 5, held mutually in contact by the spring 12 and the coupling element 32, arrive at an end zone of the portion Z.

At this end zone, the coupling element 32 disengages from the external cylindrical surface 35.

The spring 12 returns the conveying element 8 to the maximum extent configuration E, so that the conveying element 8 leaves the circular path P1 and moves again along the further circular path P2.

Figure 4:
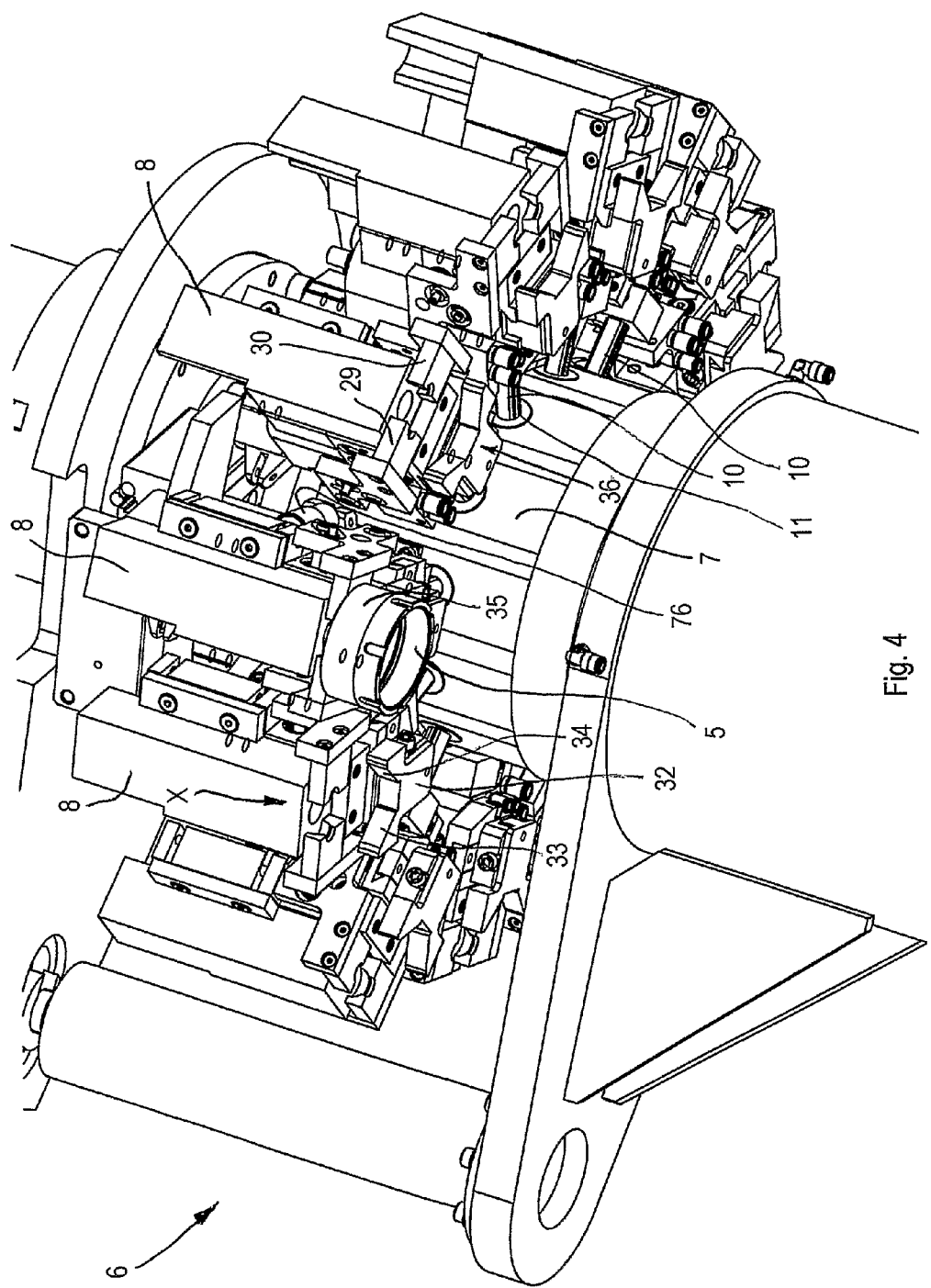
FIG. 4 is a fragmentary perspective side view of the conveying device in FIG. 1.

The conveying element 8 comprises elastic elements—received into a case element 76 shown in FIG. 4—interposed between the supporting body 15 and the further supporting body 16 and arranged for rotating the further supporting body 16 around the further axis C, so as to move the further supporting body 16 from the further operating position O2 to the operating position O1.

Further, the elastic elements hold the further supporting body 16 in the operating position O1.

Figure 15:
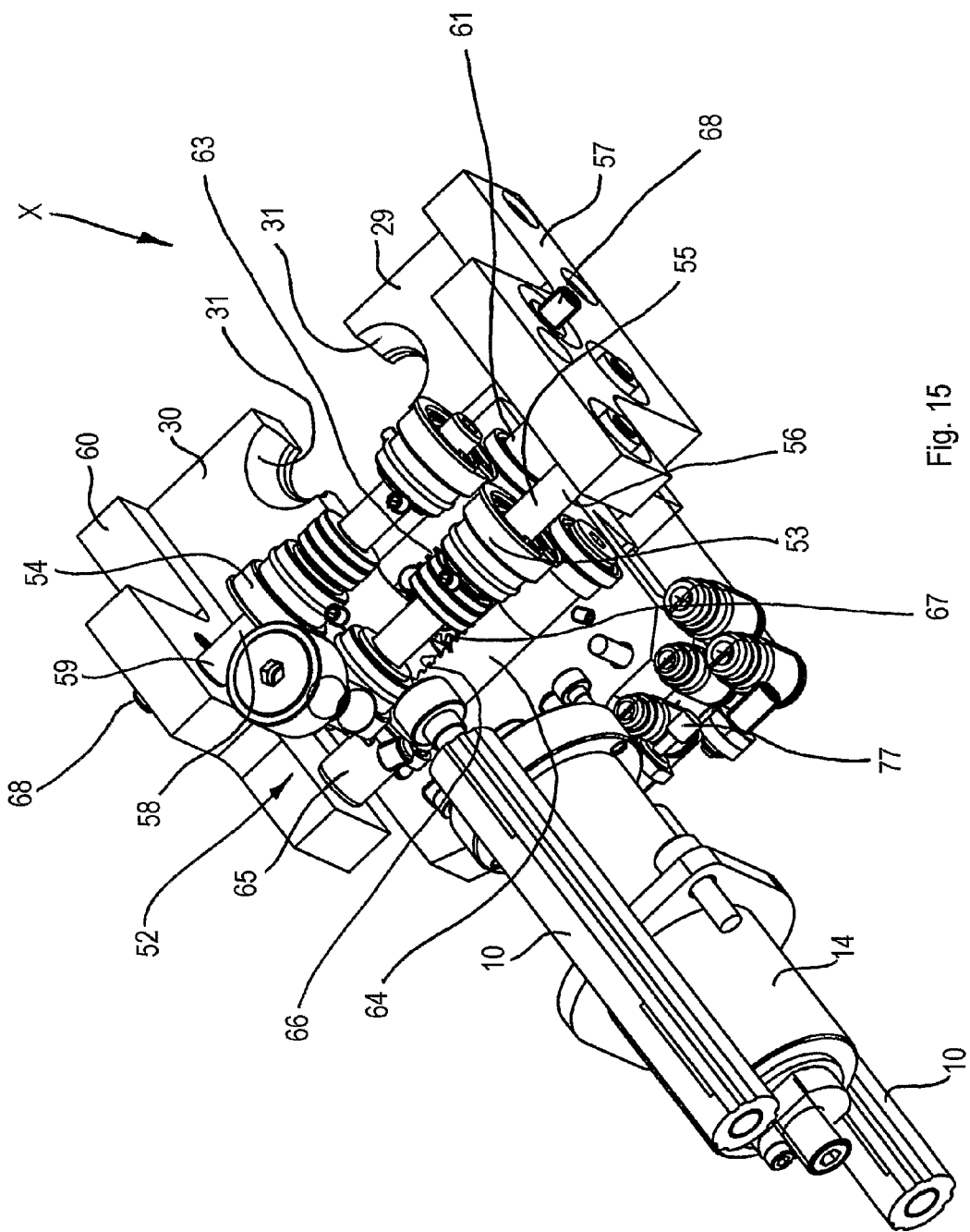
FIG. 15 is a perspective view of a further part of a conveying element.

The conveying element 8 further comprises a damping element 77 shown in FIG. 15—for example a hydraulic damper—arranged for facilitating a proper repositioning of the further supporting body 16 in the operating position O1, preventing the further supporting body 16 from oscillating around the operating position O1.

With reference to FIGS. 36 to 56 there is shown a forming device 1 in which with the further supporting body 16 a connecting element 232 is associated arranged for cooperating with a moulding cavity 5 in order to keep the conveying element 8 and the moulding cavity 5 mutually connected along a portion of the trajectory defined by the moulding cavity 5 during rotation of the carousel 2.

With reference to FIGS. 36 to 44, an embodiment of the connecting element 232 is shown comprising a coupling element 160 fixed to the further supporting body 16.

The coupling element 160 comprises a seat 161 arranged for receiving a portion of the moulding cavity 5.

The coupling element 160 interacts with an external surface of the moulding cavity 5, for example an external cylindrical surface 35.

The coupling element 160 interacts with the external surface of the moulding cavity 5 for example in one, or two, contact points. In the embodiment shown in FIGS. 38 and 40 the aforesaid contact points comprise a first contact point 174 and a second contact point 175. In a further embodiment, which is not shown, the aforesaid contact points can be defined by a revolving arrangement that interacts with the external surface of the moulding cavity 5 when the aforesaid portion is received in the seat 161, in such a way as to enable the connecting element 232 to be correctly positioned with respect to the moulding cavity 5. The revolving arrangement may comprise a revolving element (in the case of a contact point), or a pair of revolving elements (in the case of two contact points), rotatably supported by the coupling element 160 and facing the inside of the seat 161.

Still alternatively, the coupling element 161 may comprise a first coupling wall and a second coupling wall, mutually sloped to give the seat 161 a "V" shape, they being arranged to interact with the external surface of the moulding cavity 5.

In order to limit wear, each forming mould 3 can be provided with a body—for example ring-shaped—arranged for restingly receiving the connecting element 232 and rotatably supported by the respective moulding cavities 5, in such a way that the connecting element 232 does not slide with respect to the aforesaid body during rotation of the carousel 2 and of the further carousel 7. The aforesaid body, in fact rotates together with the connecting element 232 with respect to the moulding cavity 5.

The aforesaid body can be shaped as a shaft, between the shaft and the moulding cavity 5 there being interposed rollers, or bearings, arranged for rolling on an external zone of the moulding cavity 5.

The connecting element 232 further comprises a first movable arm 162 having a first end 166 hinged by a first pin 164 to the coupling element 160 and a second movable arm 163 having a further first end 167 hinged by a second pin 165 to the coupling element 160.

In this way, the first movable arm 162 and the second movable arm 163 oscillate with respect to the coupling element 160.

The first movable arm 162 further comprises a second end 168 opposite the first end 166.

Similarly, the second movable arm 163 further comprises a further second end 169 opposite the further first end 167.

A further revolving arrangement 170 can be further provided that is arranged for interacting with the external surface of the moulding cavity 5.

The further revolving arrangement 170 may comprise a further first revolving element 171 rotatably supported on the second end 168 and a further second revolving element 172 rotatably supported on the further second end 169.

The coupling element 160, the first movable arm 162 and the second movable arm 163 give the connecting element 232 a pincer shape.

The connecting element 232 may assume a locking configuration W1, shown in FIGS. 39, 40, 41 and 42, in which the first movable arm 162 and the second movable arm 163 prevent the conveying element 8 and the moulding cavity 5 moving way from one another whilst the carousel 2 and the further carousel 7 are rotated.

The connecting element 232 may further assume a release configuration W2, shown in FIGS. 37, 38, 43 and 44, in which the first movable arm 162 and the second movable arm 163 enable the moulding cavity 5 to penetrate inside a receiving zone 173 defined by the seat 161, by the first movable arm 162 and by the second movable arm 163, and/or to exit the receiving zone 173, whilst the carousel 2 and the further carousel 7 are rotated.

The receiving zone 173 has an opening portion 176 arranged substantially radially with respect to the further carousel 7 and facing the outside of the further carousel 7.

When the connecting element 232 is in the locking configuration W1, the first movable arm 162 and the second movable arm 163 assume a clamped position K1 in which the second end 168 and the further second end 169 are near one another, in such a way that the first movable arm 162 and the second movable arm 163 partially surround the moulding cavity 5.

When the connecting element 232 is in the release configuration W2, the first movable arm 162 and the second movable arm 163 assume a divaricated position K2 in which the second end 168 and the further second end 169 are further from one another.

Further, a driving device moves the first movable arm 162 and the second movable arm 163 from the clamped position K1 to the divaricated position K2, and vice versa.

In addition, the connecting element 232 may comprise a locking arrangement that maintains the first arm 262 and the second arm 263 in the clamped position K1. In an embodiment which is not shown, the connecting element 232 comprises a movable arm, oscillating with respect to the coupling element 160, and a fixed arm, firmly fixed to the coupling element 160.

With reference to FIGS. 45 to 51, an embodiment of the connecting element 232 is shown, comprising a coupling element 260 fixed to the further supporting body 16.

The coupling element 260 comprises a first arm 262 and a second arm 263 that define a seat 261 arranged for receiving a portion of the moulding cavity 5. The seat 261 is "U"-shaped.

The seat 261 has an opening portion 276 arranged substantially radially with respect to the further carousel 7 and facing the outside of the further carousel 7. The coupling element 260 interacts with an external surface of the moulding cavity 5, for example an external cylindrical surface 35.

The coupling element 260 interacts with the external surface of the moulding cavity 5 for example in one, or two, contact points. In the embodiment shown in detail in FIGS. 47 and 49 a single contact point is provided that is defined by a revolving arrangement 180 that interacts with the external surface of the moulding cavity 5 when the aforesaid portion is received in the seat 261, in such a way as to enable correct positioning of the connecting element 232 with respect to the moulding cavity 5. The revolving arrangement 180 comprises a revolving element 181 rotatably supported by the coupling element 260 and facing inside the seat 261. In a further embodiment, which is not shown, the revolving arrangement 180 comprises a pair of revolving elements.

Still alternatively, the coupling element 260 may comprise a first coupling wall and a second coupling wall, that are mutually sloped to give a zone of the seat 261 nearer the further supporting body 16 a "V" shape, being arranged to interact with the external surface of the moulding cavity 5. In this case, the first arm 262 may project from an end portion of the aforesaid first wall and the second arm 263 may project from an end portion of the aforesaid second wall.

The connecting element 232 comprises a retaining arrangement 184 arranged for interacting with the moulding cavity 5 for maintaining the moulding cavity 5 in the seat 261 or for releasing the moulding cavity 5 from the.

The first arm 262 is provided with a first end zone 182 and the second arm 263 is provided with a second end zone 183.

The retaining arrangement 184 is associated with the first arm 262 and with the second arm 263.

The retaining arrangement 184 comprises a first revolving body 185 rotatably supported by the first end zone 182 and a second revolving body 186 rotatably supported by the second end zone 183, the first revolving body 185 and the second revolving body 186 being arranged for interacting with the external surface of the moulding cavity 5.

Figure 48:
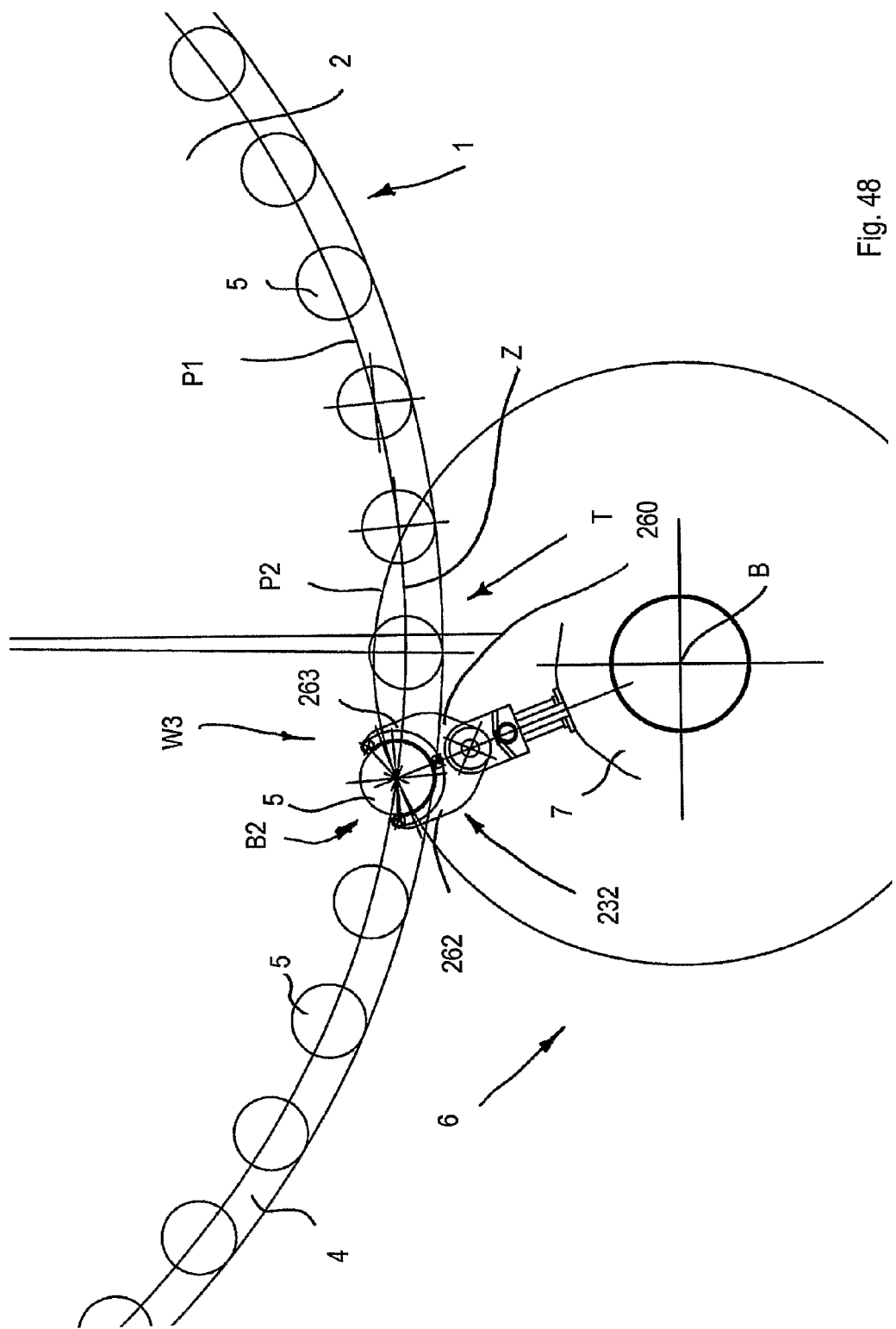
Figure 49:
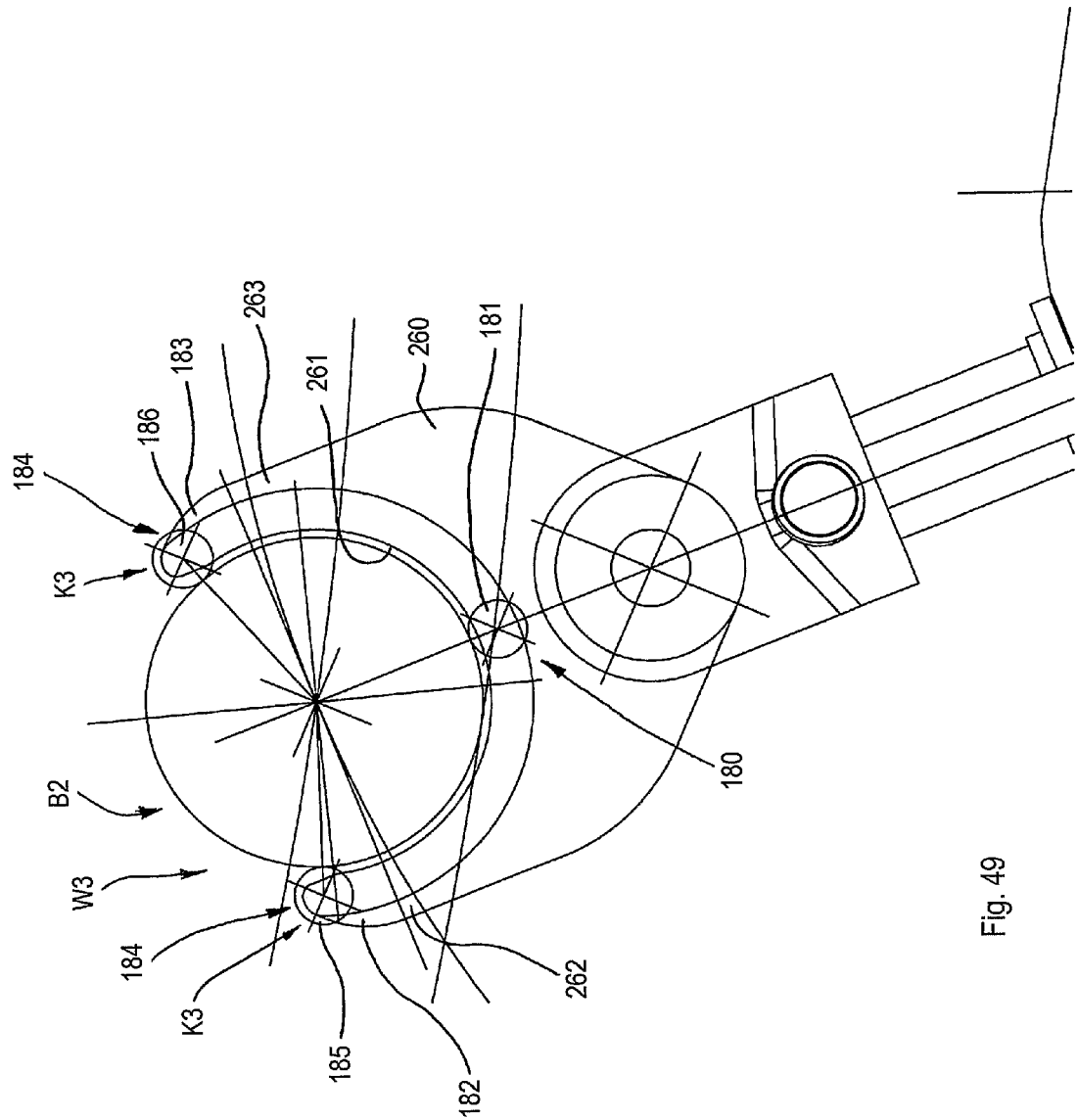
FIG. 49 is an enlarged detail in FIG. 48.
Figure 50:
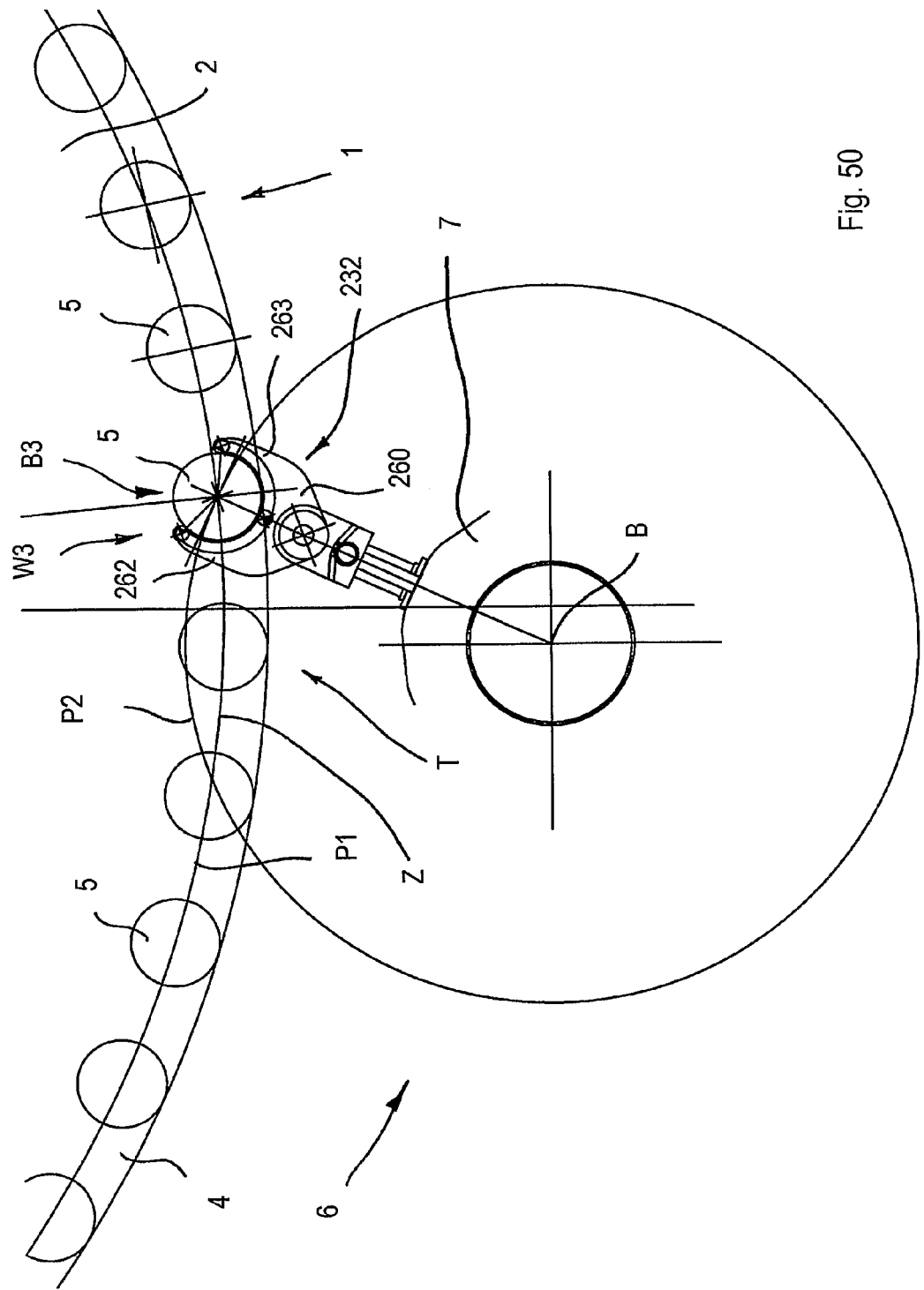

The connecting element 232 may assume a locking configuration W3, shown in FIGS. 48, 49 and 50, in which the retaining arrangement 184 prevents the conveying element 8 and the moulding cavity 5 moving way from one another whilst the carousel 2 and the further carousel 7 are rotated.

Figure 46:
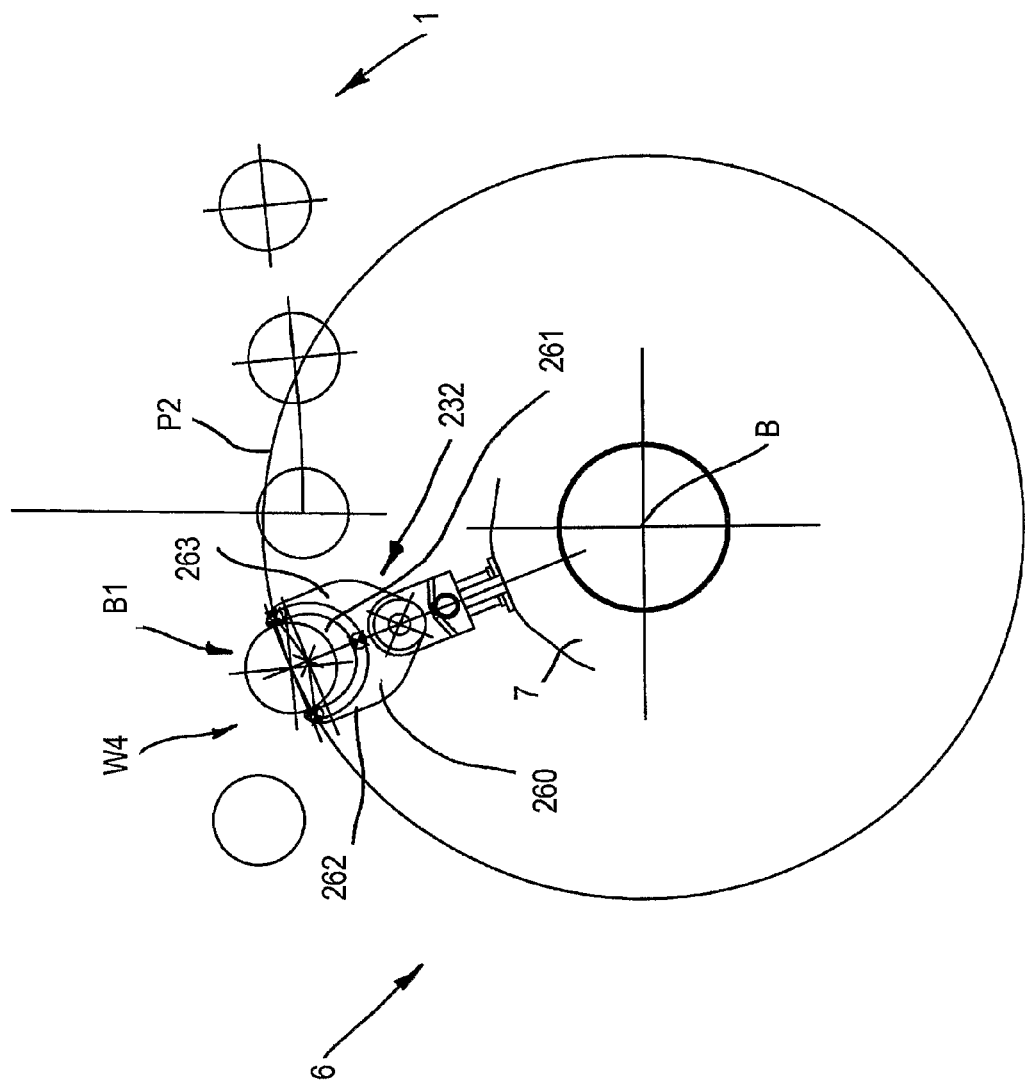
FIGS. 46, 48, 50 and 51 are schematic plan views of the conveying device in FIG. 45, which show connecting elements of the conveying device in a succession of operating configurations.
Figure 47:
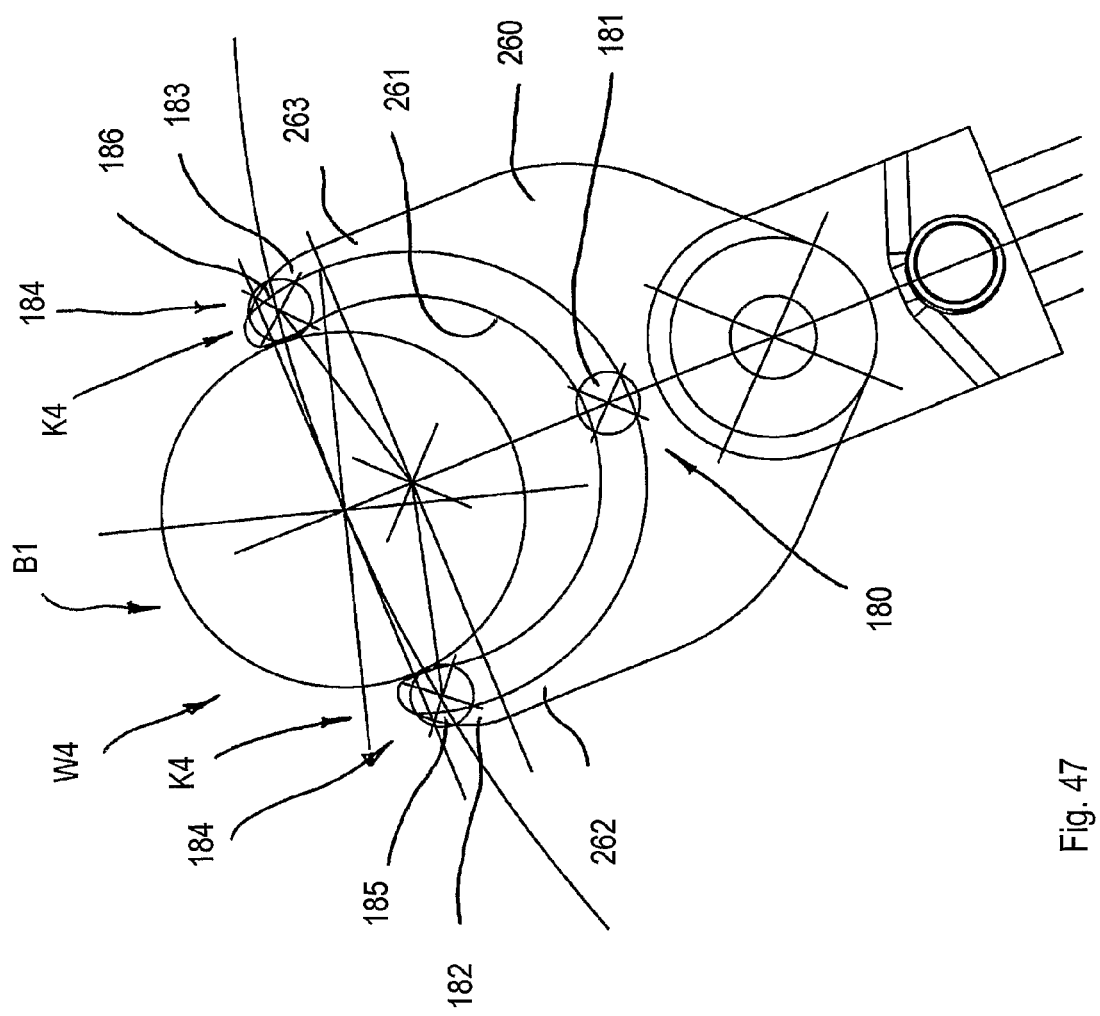
FIG. 47 is an enlarged detail in FIG. 46.
Figure 51:
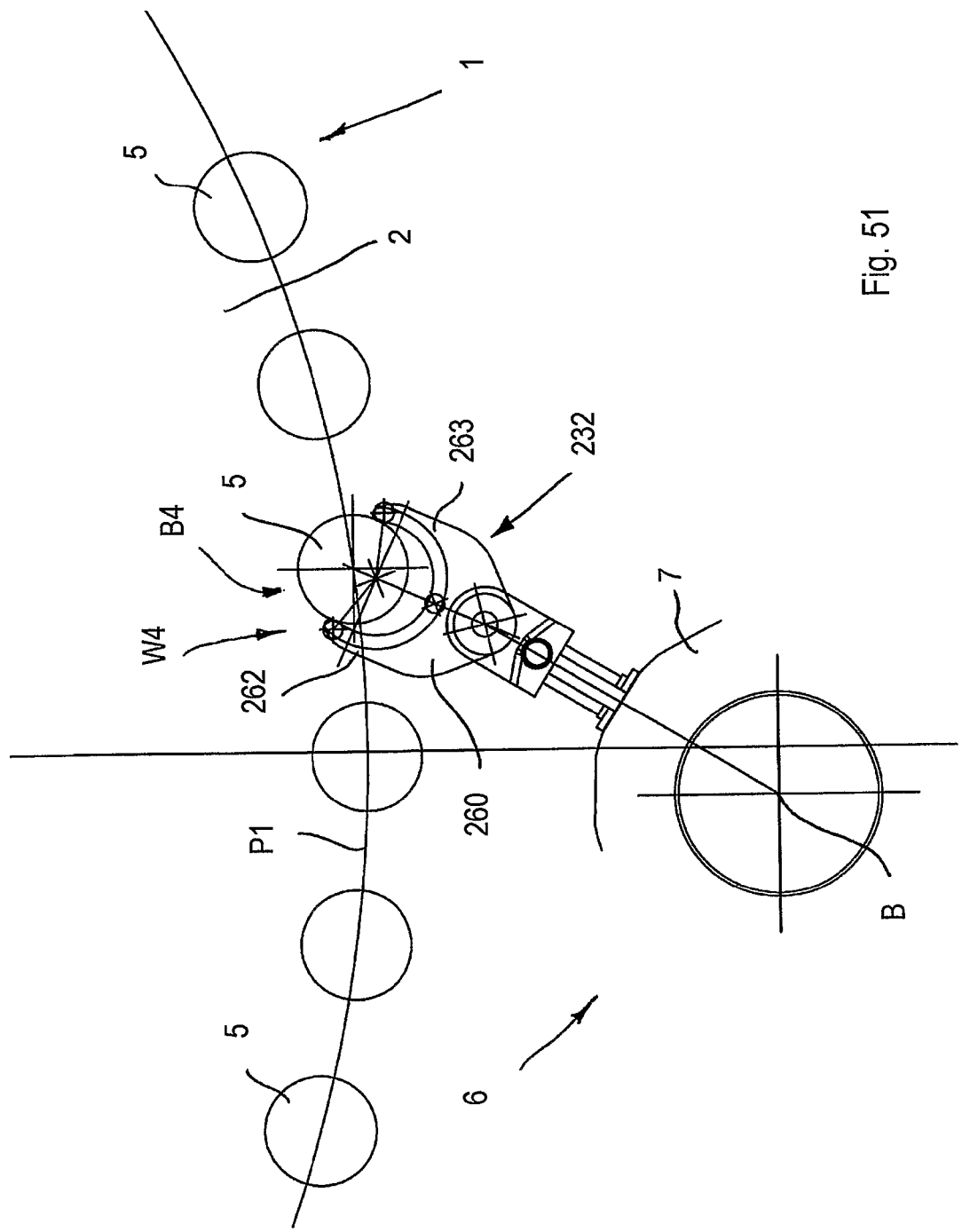

The connecting element 232 may assume further a release configuration W4, shown in FIGS. 46, 47 and 51, in which the retaining elements 184 enable the moulding cavity 5 to penetrate inside the seat 261 and/or to exit the seat 261, whilst the carousel 2 and the further carousel 7 are rotated.

When the connecting element 232 is in the locking configuration W3, the retaining arrangement 184 assumes an extended position K3, in which the first revolving body 185 and the second revolving body 186 project inside the seat 261.

When the connecting element 232 is in the release configuration W4, the retaining arrangement 184 assumes a retracted position K4 in which the first revolving body 185 and the second revolving body 186 are at least partially received in cavities associated with the first arm 262 and with the second arm 263, in such a way that at least a part thereof does not project inside the seat 261.

A driving device is further provided that moves the retaining arrangement 184 from the extended position K3 to the retracted position K4, and vice versa.

In addition, the connecting element 232 may comprise a locking arrangement that maintains the retaining arrangement 184 in the extended position K3.

The driving device may comprise elastic elements that maintains the retaining arrangement 184 in the extended position K3 (for example springs that act on pins by means of which the first revolving body 185 and the second revolving body 186 are hinged on the first end zone 182 and on the second end zone 183, respectively) and actuating devices (for example pneumatic cylinders) that move the retaining arrangement 184, against the actions of the elastic elements, in the retracted position K4.

Alternatively, the driving device may comprise elastic elements that maintain the retaining arrangement 184 in the retracted position K4 and actuating devices (for example pneumatic cylinders) that move the retaining arrangement 184, against the action of the elastic elements, in the extended position K3.

In this case, if an interruption to the power supply to the actuating devices occurs—for example through a suspension in the dispensing of compressed air—the connecting elements 232 release the cavities 5.

In other words, as the connecting elements 232 are normally in the release configuration W4 and assume the locking configuration W3 only when the actuating devices are actuated, the conveying element 8, in the event of an emergency, is able to disengage from the respective moulding cavities 5.

The coupling element 260 may comprise centring promoting elements, for example arranged near the first end zone 182 and the second end zone 183, which elements promote correct positioning of the moulding cavity 5 with respect to the coupling element 260, before the retaining arrangement 184 is arranged in the extended position K3, i.e. before the first revolving body 185 and the second revolving body 186 interact with the moulding cavity 5 to retain the aforesaid moulding cavity 5.

During operation, the carousel 2 rotates around the axis A, in such a way that the forming moulds 3 supported by the carousel 2 advance in the direction R1 along a circular path P1.

The further carousel 7 rotates around the further axis B, in such a way that the conveying elements 8 supported by the further carousel 7 advance in the further direction R2 along a further circular path P2.

The forming device 1 and the conveying device 6 are positioned in such a way that the circular path P1 and the further circular path P2 intersect in a transferring zone T, shown in FIGS. 36, 39, 41, 45, 48 and 50, in which the doses are transferred from the conveying elements 8 to the moulding cavities 5.

In other words, the axis A and the further axis B are separated by a distance that is less than the sum of the radii of the circular path P1 and of the further circular path P2.

During rotation of the carousel 2 and of the further carousel 7, a conveying device 8 that is located at an initial part of the transferring zone T interacts with a corresponding moulding cavity 5.

Figure 37:
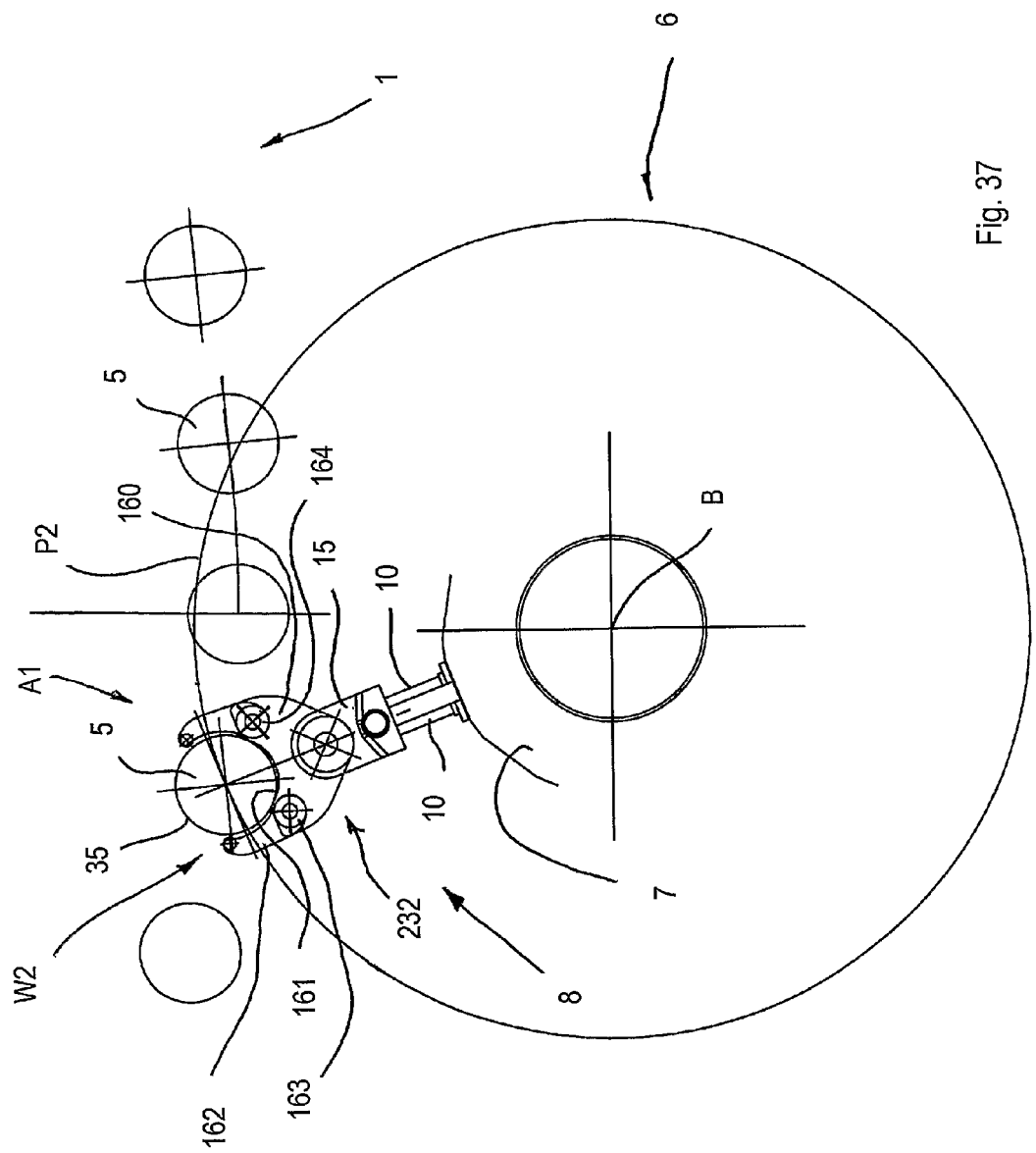
FIGS. 37, 39 and 41 to 44 are schematic plan views of the conveying device in FIG. 36 that show connecting elements of the conveying device in a succession of operating configurations.
Figure 38:
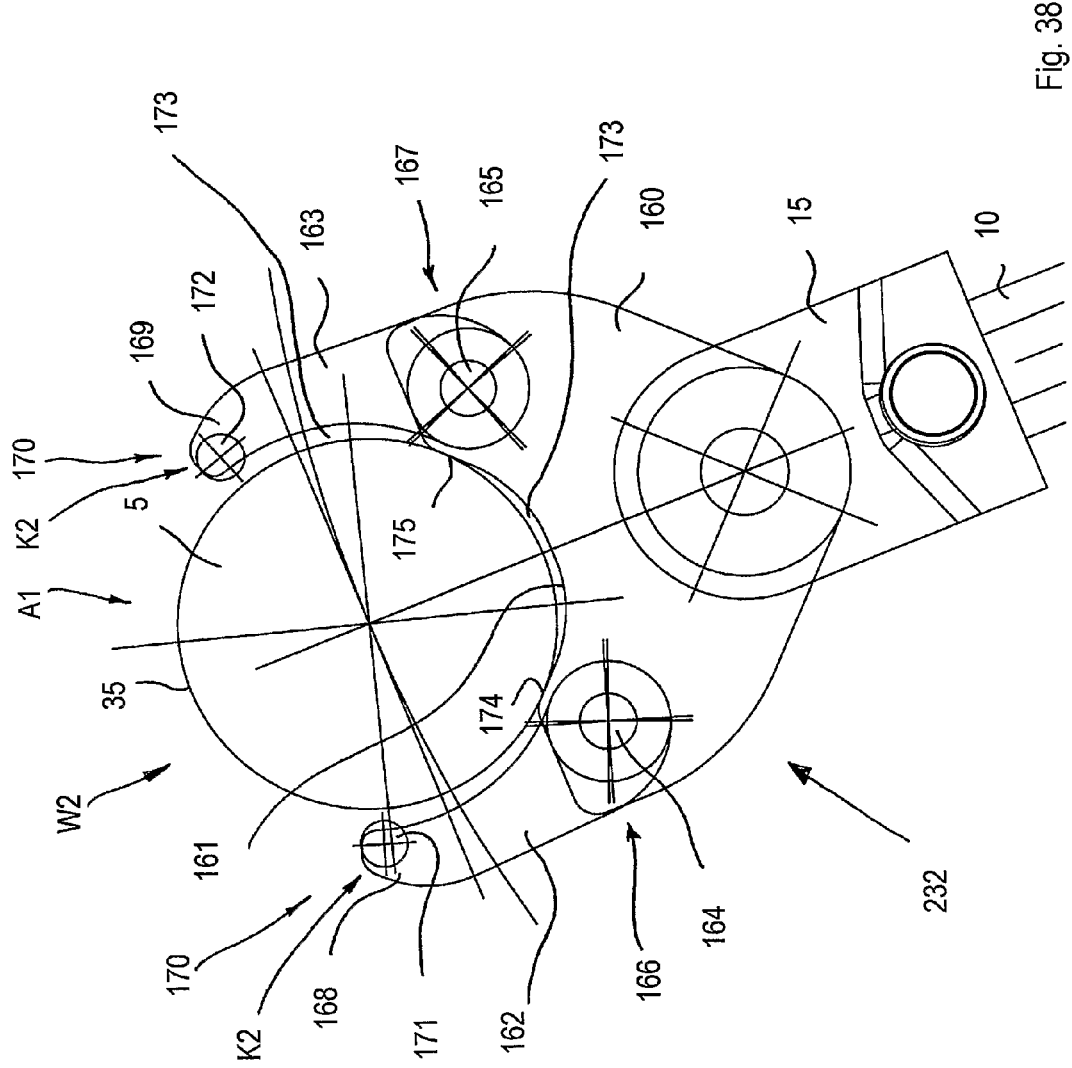
FIG. 38 is an enlarged detail in FIG. 37.

In FIGS. 37 and 38, there is shown a first operating configuration A1 of the embodiment of the conveying device 6 disclosed with reference to FIGS. 37 to 44, in which the supporting body 15 moves towards the further axis B, whilst a moulding cavity 5 is received in the receiving zone 173 of the connecting element 232.

When the conveying device 6 is in the first operating configuration A1, the connecting element 232 is in the release configuration W2. The first movable arm 162 and the second movable arm 163 are in the divaricated position K2, in such a way that the moulding cavity 5 can be received between the first movable arm 162 and the second movable arm 163.

Figure 39:
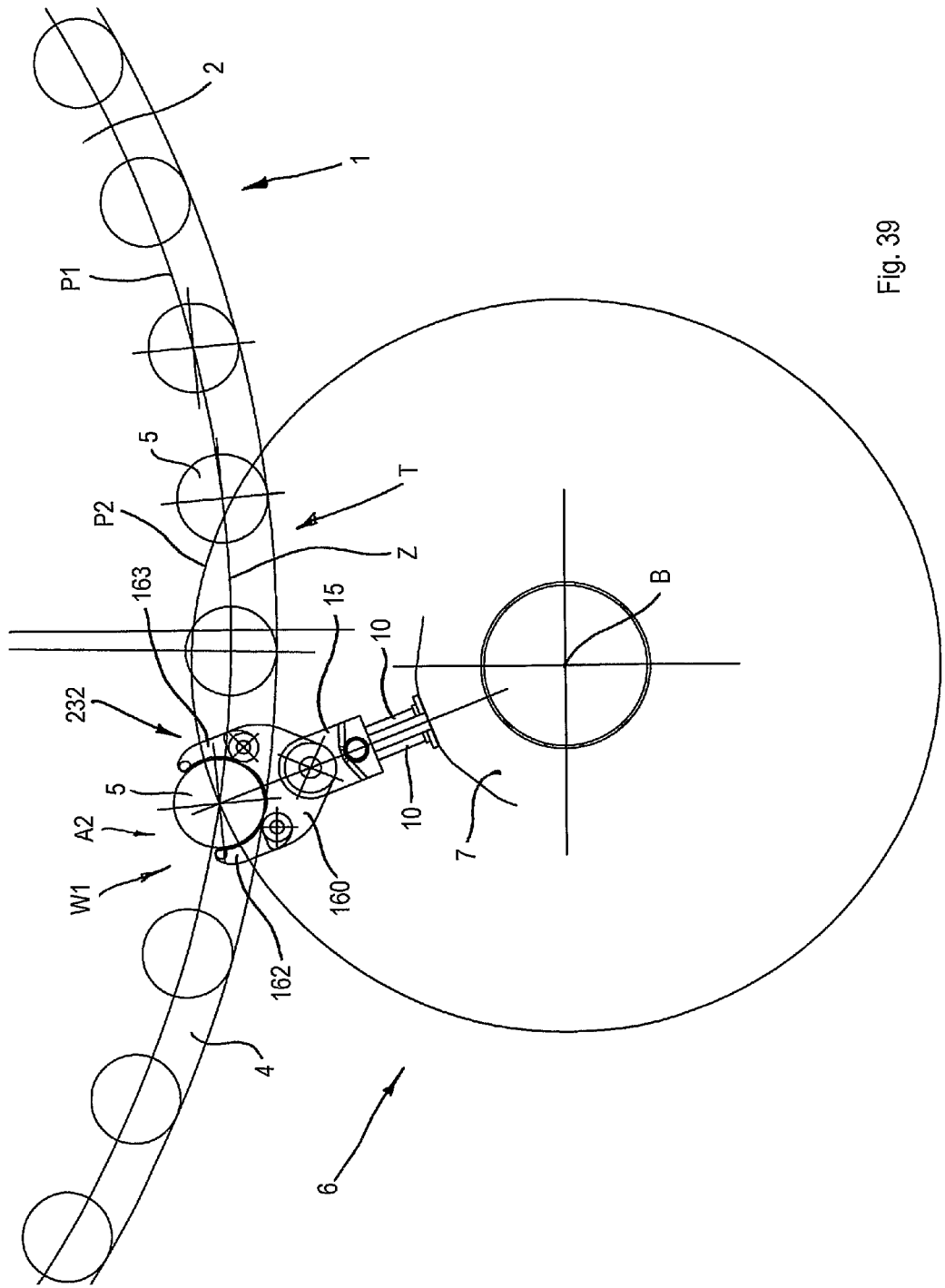
Figure 40:
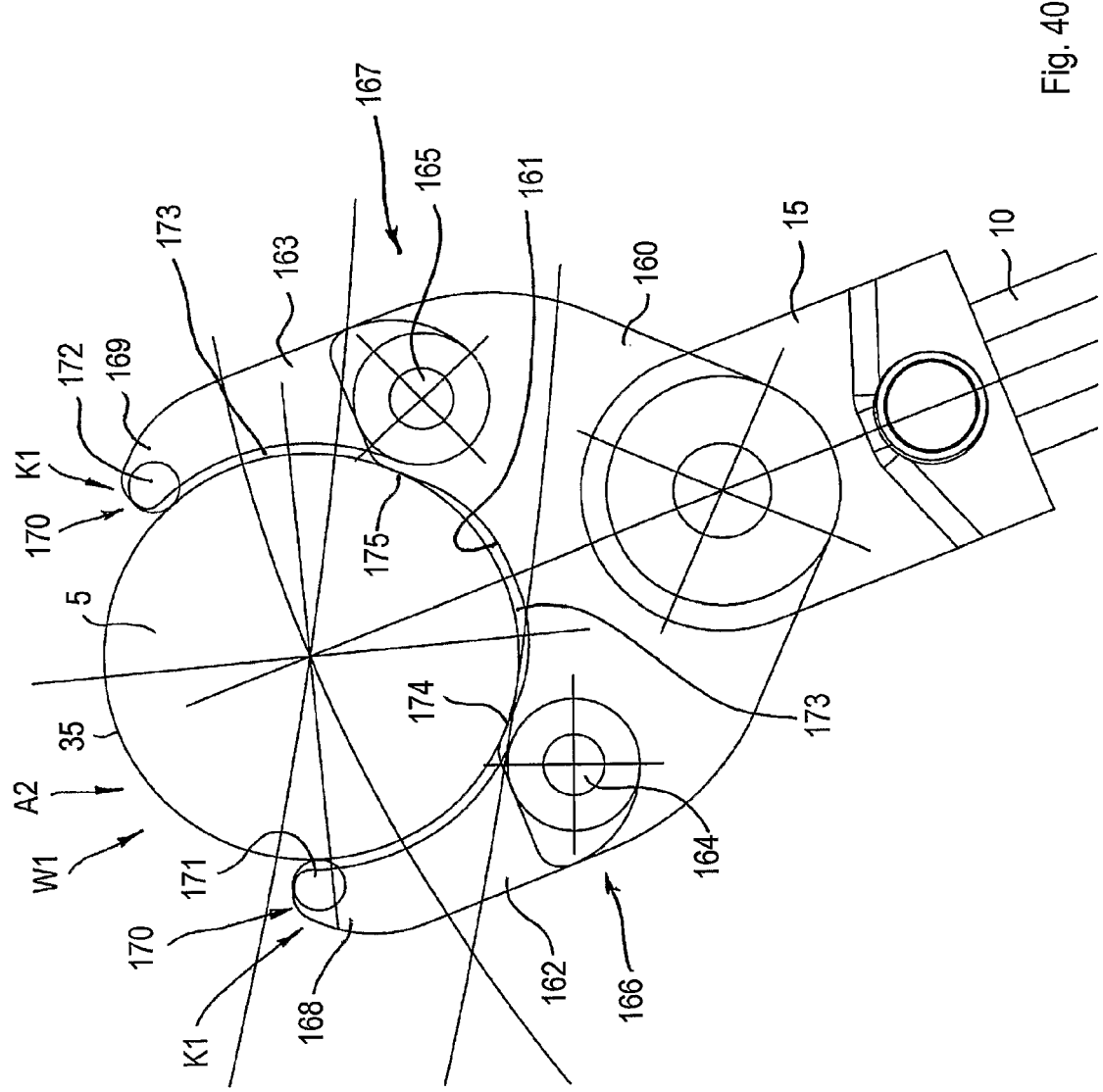
FIG. 40 is an enlarged detail in FIG. 39.

In FIGS. 39 and 40, there is shown a second operating configuration A2 of the conveying device 6, in which the connecting element 232 is in the locking configuration W1. The first movable arm 162 and the second movable arm 163 are in the clamped position K1, in such a way that the moulding cavity 5 is retained in the receiving zone 173.

Figure 41:
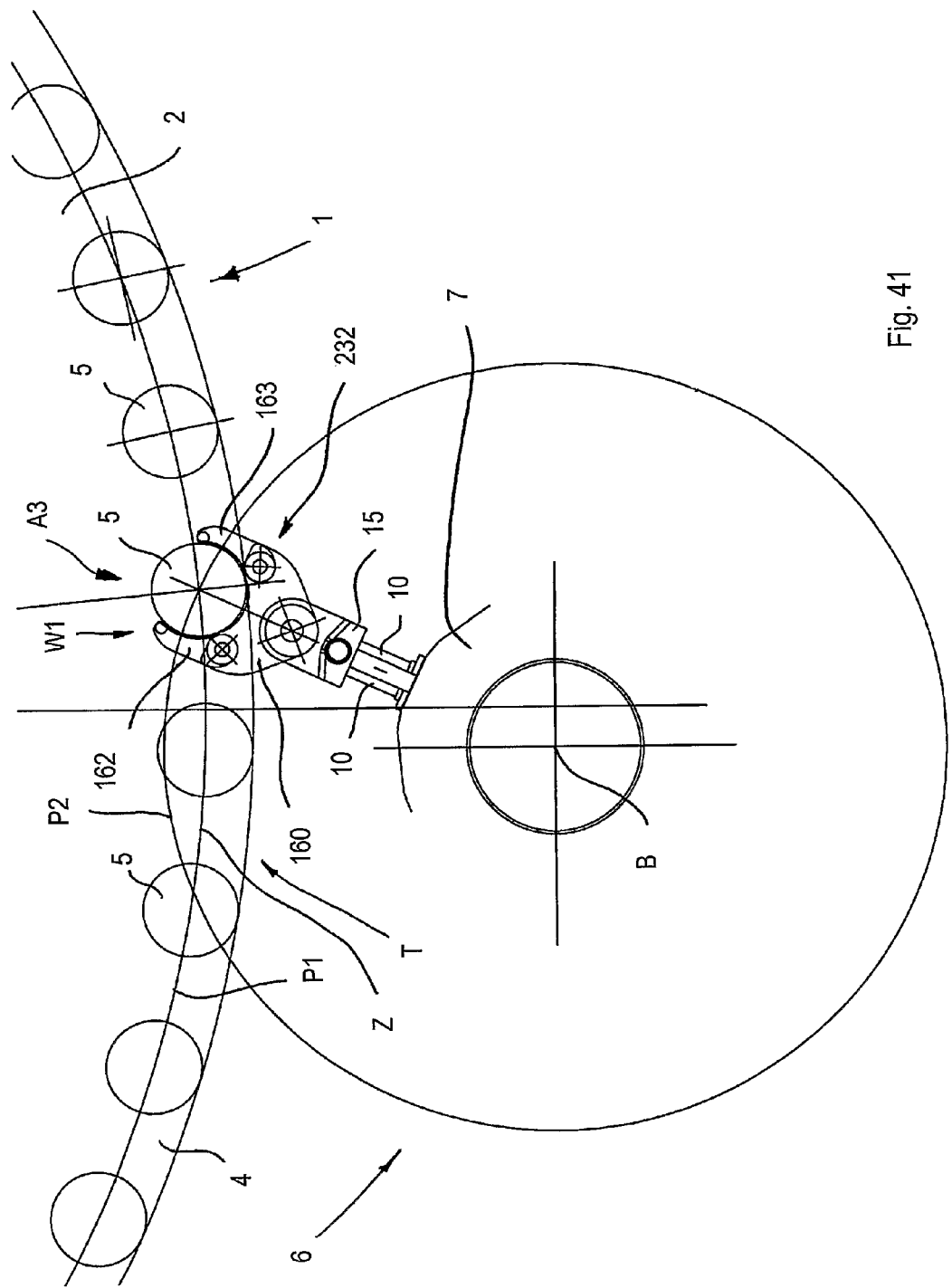
Figure 42:
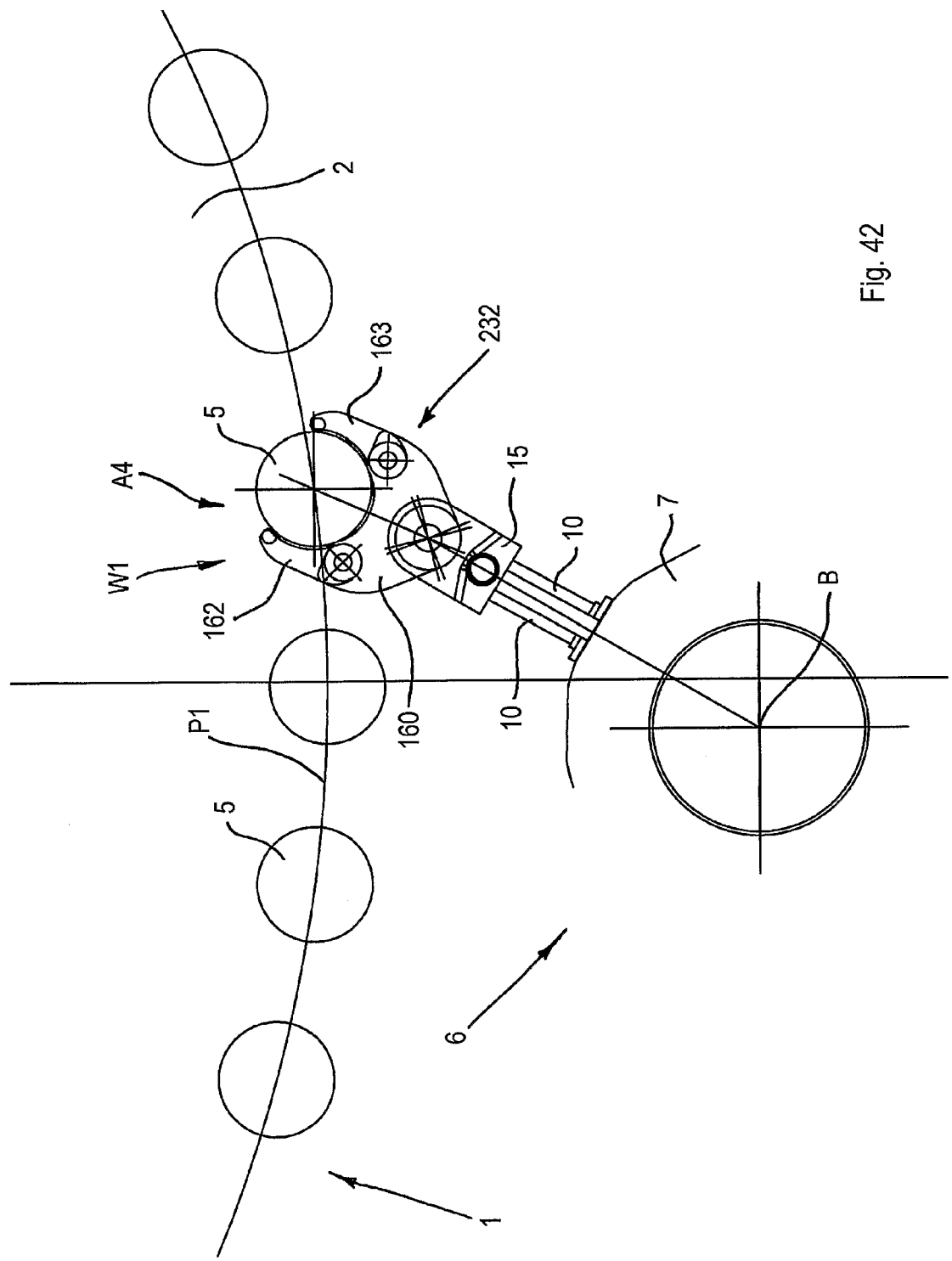

In FIG. 41 and in FIG. 42 there are shown, respectively, a third operating configuration A3 and a fourth operating configuration A4 of the conveying device 6, in which the connecting element 232 is in the locking configuration W1. The first movable arm 162 and the second movable arm 163 are in the clamped position K1, in such a way that the moulding cavity 5 is retained in the receiving zone 173.

Whilst the conveying device 6 moves from the third operating configuration A3 to the fourth operating configuration A4, the moulding cavity 5 controls the movement of the conveying element 8, as the connecting element 232 maintains the moulding cavity 5 and the conveying element 8 mutually hooked.

In particular, the moulding cavity 5 causes sliding (away) of the supporting body 15 with respect to the further carousel 7 and an oscillation of the further supporting body 16 with respect to the supporting body 15, as deducible from the comparison between FIGS. 41 and 42.

Figure 43:
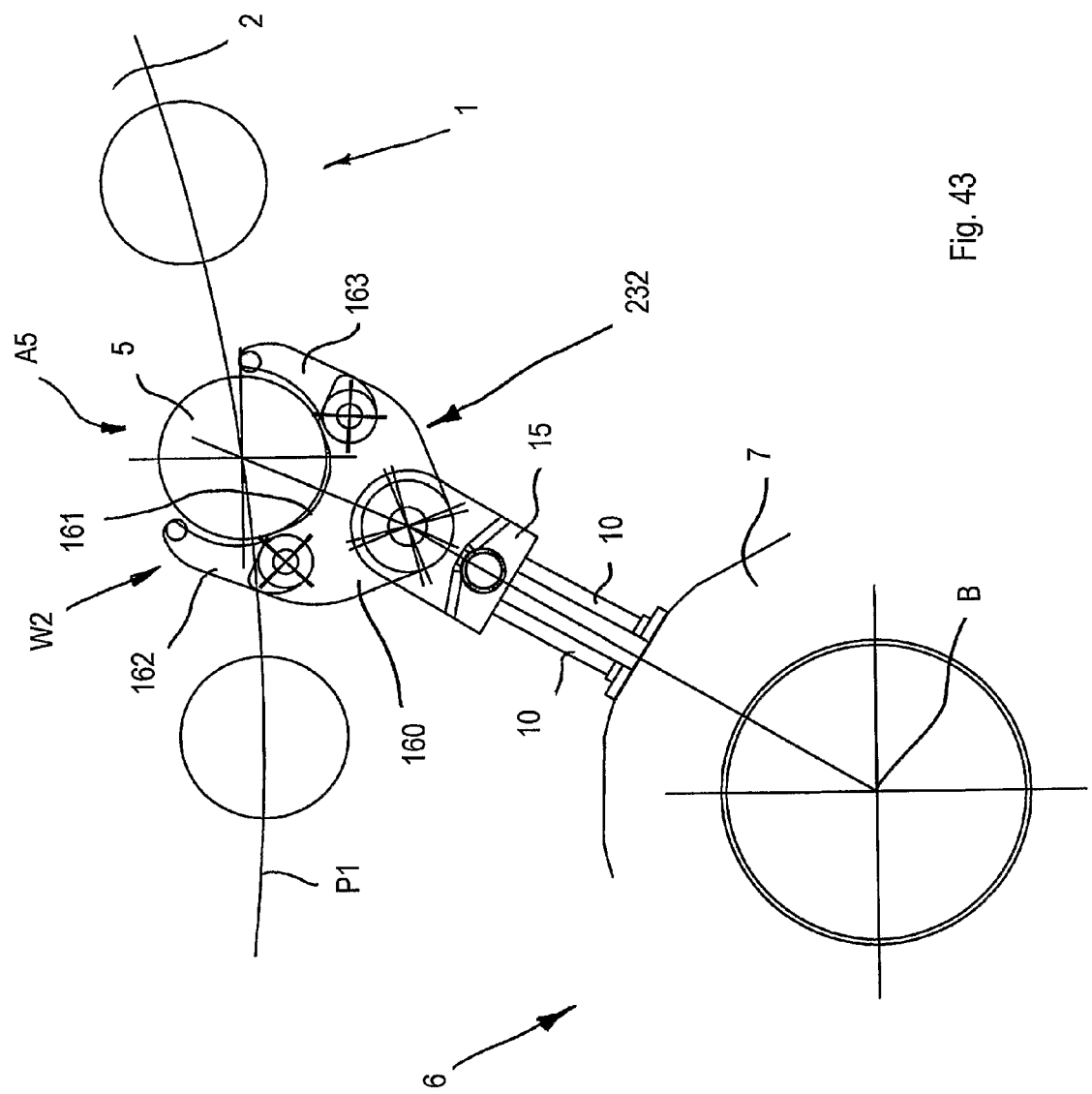

In FIG. 43 there is shown a fifth operating configuration A5 of the conveying device 6, in which the connecting element is in the release configuration W2 and the moulding cavity 5 gets ready to leave the receiving zone 173. The first movable arm 162 and the second movable arm 163 are in the divaricated position K2, in such a way as not to prevent the moulding cavity 5 exiting the receiving zone 173.

Figure 44:
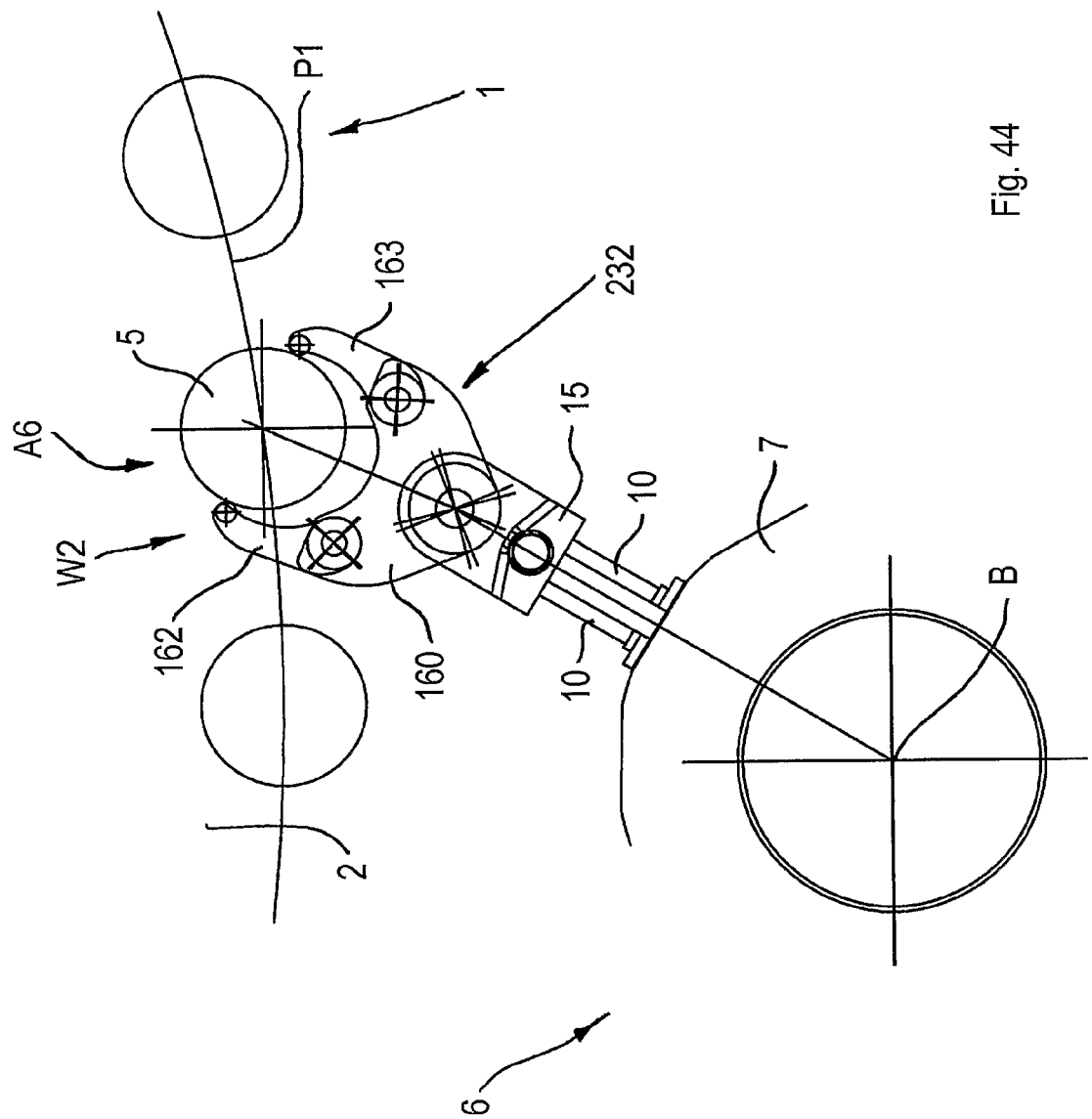
Figure 45:
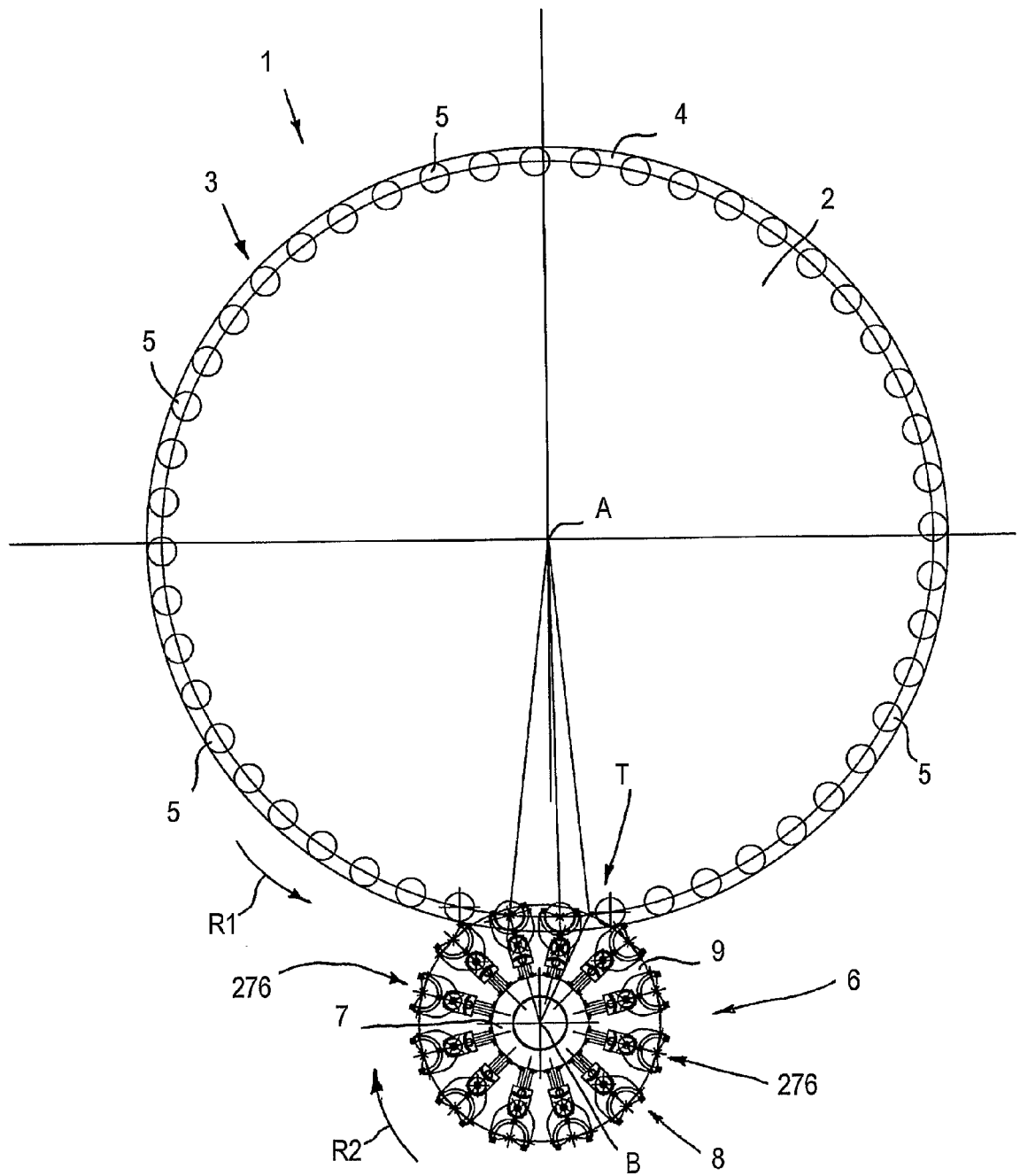
FIG. 45 is a schematic plan view of an apparatus comprising a compression-moulding device and a conveying device made according to a version.

In FIG. 44 there is shown a sixth operating configuration A6 of the conveying device 6, in which the connecting element is in the release configuration W2 and the moulding cavity 5 exits the receiving zone 173. The first movable arm 162 and the second movable arm 163 are in the divaricated position K2.

Whilst the conveying device 6 assumes in succession the first operating configuration A1, the second operating configuration A2, the third operating configuration A3 and the fourth operating configuration A4, the moulding cavity 5, interacting with the conveying element 8, induces the supporting body 15 to move towards and away from the further axis B, and the further supporting body 16 to oscillate with respect to the supporting body 15 to enable the connecting element 232 to maintain the conveying element 8 and the moulding cavity 5 mutually connected.

In this way, the conveying element 8, at the transferring zone T, abandons the further circular path P2 and moves along a portion Z of the circular path P1. Whilst the conveying device 6 assumes in succession the fifth operating configuration A5 and the sixth operating configuration A6, the connecting element 232 releases the moulding cavity 5. The supporting body 15 moves towards the further axis B and the further supporting body 16 oscillates with respect to the supporting body 15 to enable the conveying element 8 to move away from the moulding cavity 5.

The conveying element 8 and the moulding cavity 5 interact for a significantly long interval of time, during which a dose can be correctly transferred from the containing portion 22 of the conveying element 8 with the moulding cavity 5.

During the aforesaid interval of time, further, the receiving portion 21 of the conveying element 8 can remove an object, for example a preform, that has been formed in the moulding cavity 5, as will be disclosed in greater detail below.

As the connecting element 232 retains the moulding cavity 5, the containing portion 22 is arranged above, and aligned with, the moulding cavity 5, whilst the moulding cavity 5 and the handling element 20 run along the portion Z together. This enables the dose to be transferred from the containing portion 22 with the moulding cavity 5, in an optimum manner as the moulding cavity 5 acts as a reference and centring element for the conveying element 8, ensuring correct positioning of the handling element 20 with respect to the moulding cavity 5. Further, as the further supporting body 16 may rotate with respect to the supporting body 15 and the supporting body 15 can move radially with respect to the further carousel 7, the connecting element 232 can engage correctly with the moulding cavity 5 even if the position of the connecting element 232 and/or the position of the moulding cavity 5 differ—within certain limits—from theoretically envisaged positions.

The above description, in addition to the form of the connecting element 232 that engages the external surface of the moulding cavity 5, to the sliding in a radial direction of the supporting body 15 and to the oscillation of the further supporting body 16 with respect to the supporting body 15, enables synchronisation errors between the rotation speed of the carousel 2 and the rotation speed of the further carousel 7 to be avoided.

The external surface of the moulding cavity 5 is subject to machinings, for example grinding, that ensure great dimensional precision, in such a way that the moulding cavity 5 can perform in an optimal manner the function of reference and centring element for the conveying element 8.

When the connecting element 232 interacts with the external surface of the moulding cavity 5, the forming mould 3 is in the open configuration and the moulding cavity 5 is in a lower dead centre position of the stroke thereof.

The moulding cavity 5 is moved by a driving device provided with a stem at an end of which there is fixed the moulding cavity 5.

In the lower dead centre position, a prevalent portion of the aforesaid stem is received inside a guide sleeve.

In the lower dead centre position, therefore, the moulding cavity 5 is provided with great stiffness, which enables more precise positioning of the handling element 20 to be obtained.

The moulding cavity 5, the connecting element 232 and the handling element 20 can be shaped in such a way that, when the connecting element 232 interacts with the external surface of the moulding cavity 5, an axis of the containing portion 22 substantially coincides with an axis of the moulding cavity 5.

In practice, the dose may have a slightly smaller diameter than the diameter of the containing portion 22.

In this case, the dose may rest on a portion of internal wall of the containing portion 22 and be spaced from a further portion of internal wall of the containing portion 22, opposite the aforesaid portion of internal wall.

In other words, the dose is arranged inside the handling element 20 in such a way as to be asymmetrical with respect to the axis of the containing portion 22. An adjusting arrangement is provided, for example of the type disclosed above with reference to FIGS. 32 to 35, that enables the connecting element 232 to be moved with respect to the further supporting body 16, in such a way that, when the connecting element 232 interacts with the external surface of the moulding cavity 5, an axis of the dose (and not the axis of the containing portion 22) substantially coincides with an axis of the moulding cavity 5.

The adjusting arrangement may comprise a first adjusting arrangement arranged for moving the connecting element 232 with respect to the further supporting body 16 along an adjusting direction arranged radially with respect to the further carousel 7, and a second adjusting arrangement arranged for moving the connecting element 232 with respect to the further supporting body 16 in a further adjusting direction arranged transversely to the aforesaid adjusting direction.

In FIGS. 46 and 47, there is shown a first operating configuration B1 of the embodiment of the conveying device 6 disclosed with reference to FIGS. 45 to 51, in which the supporting body 15 moves towards the further axis B, whilst a moulding cavity 5 starts to penetrate the seat 261 of the connecting element 232. When the conveying device 6 is in the first operating configuration B1, the connecting element 232 is in the release configuration W4. The retaining arrangement 184 is in the retracted position K4, in such a way that the moulding cavity 5 can be received between the first arm 262 and the second arm 263.

In FIGS. 48 and 49, there is shown a second operating configuration B2 of the conveying device 6, in which the supporting body 15 moves away from the further axis B in such a way that the moulding cavity 5 is completely received in the seat 261.

When the conveying device 6 is in the operating configuration B2, the connecting element 232 is in the locking configuration W3. The retaining arrangement 184 is in the extended position K3, in such a way that the moulding cavity 5 is retained in the seat 261.

In FIG. 50 there is shown a third operating configuration B3 of the conveying device 6, in which the connecting element 232 is in the locking configuration W3. The retaining arrangement 184 is in the extended position K3, in such a way that the moulding cavity 5 is retained in the seat 261.

In FIG. 51 there is shown a fourth operating configuration B4 of the conveying device 6, in which the connecting element is in the release configuration W4 and the moulding cavity 5 is exiting the seat 261. The retaining arrangement 184 is in the retracted position K4, in such a way as not to prevent the moulding cavity 5 exiting the seat 261.

The conveying device 6 comprises a controlling arrangement arranged for controlling the sliding of the supporting body 15 with respect to the further carousel 7.

The controlling arrangement may comprise elastic elements, for example interposed between the further carousel 7 and the conveying element 8, that tends to move the conveying element 8 away from the further carousel 7—for example when the conveying device 6 assumes the first operating configuration A1, the second operating configuration A2 and the third operating configuration A3, or the first operating configuration B1 and the second operating configuration B2—to enable the connecting element 232 to hook the moulding cavity 5, and subsequently tends to move the conveying element 8 near the further carousel 7—for example when the conveying device 6 assumes the sixth operating configuration A6, or the fourth operating configuration B4—to enable the connecting element 232 to disengage from the moulding cavity 5.

The controlling arrangement may also comprise a locking arrangement arranged for maintaining—if required—the conveying element 8 in intermediate positions with respect to a maximum extent position, in which the conveying element 8 is further from the further carousel 7, and to a minimum extent position, in which the conveying element 8 is nearer the further carousel 7, in particular before the conveying element 8 reaches the transferring zone T.

Alternatively, the controlling arrangement may comprise linear actuating devices. In particular, the linear actuating devices make the conveying element 8 interact with the moulding cavity 5 and not prevent the moulding cavity 5 inducing the conveying element to travel along the portion Z once the connecting element 232 has hooked the moulding cavity 5.

In particular, the linear actuating devices do not prevent the moulding cavity 5 inducing the conveying element 8 to move away from the further carousel 7—for example when the conveying device 6 assumes the fourth operating configuration A4, or the third operating configuration B3—whilst the conveying element 8 is maintained hooked to the moulding cavity by the connecting element 232.

The linear actuating devices can be activated to move the conveying elements 8 towards and away from the further axis B.

In particular, the linear actuating devices can move the conveying elements 8 to the further axis B to prevent the connecting elements 232 interfering with the moulding cavity 5 during a step of mutual moving towards one another, i.e. when the conveying elements start to approach the transferring zone T.

Subsequently, the linear actuating devices can be deactivated in such a way as not to be opposed to the action of the moulding cavity 5 which—hooked to the conveying element 8 by the connecting element 232—commands the movement of the conveying element towards and away from the further axis B. In particular, the linear actuating devices do not prevent the moulding cavity 5 and the conveying element 8 remaining mutually connected whilst they together travel along a very long portion Z.

Still subsequently, after the connecting element 232 has released the moulding cavity 5, the linear actuating devices can be again activated to move the conveying element 8 towards the further axis B.

The linear actuating devices can be of the pneumatic, electric or of another type. The connecting element 232 enables an interval of time to be obtained during which a dose is transferred from the conveying element 8 to the moulding cavity 5, which is greater if the conveying element 8 and the moulding cavity 5 are maintained in reciprocal contact but are not mutually hooked.

In particular, owing to the connecting element 232 it is possible to obtain a more effective conveying device 6 than if the conveying device 6 comprises an actuating element that, by acting on the conveying element 8, maintains the conveying element 8 in contact with the moulding cavity 5 and a coupling element that positions the conveying element 8 with respect to the moulding cavity 5, but does not reciprocally hook the conveying element 8 and the moulding cavity 5.

In an embodiment which is not shown, instead of the connecting element 232 a magnetic connecting element can be provided. The magnetic connecting element can be associated with the conveying element 8, with the moulding cavity 5, or with both.

The embodiments of the connecting element 232 shown in FIGS. 36 to 44 and 45 to 51 are particularly effective inasmuch as the connecting element 232 interacts substantially frontally with the moulding cavity 5 to hook the moulding cavity 5.

This enables the connecting element 232 to be fitted more easily into the moulding cavity 5, and the connecting element 5 to be disconnected more easily from the moulding cavity if an emergency condition arises, for example if there is an interruption to the electricity current that entails a stop of the electric motor that rotates the further carousel 7.

With reference to FIGS. 52 to 56, there is shown a conveying device 6 comprising a plurality of conveying elements 8. In FIGS. 52 to 56 there is shown a single conveying element 8 of the aforesaid plurality of conveying elements. Each conveying element 8 comprises a supporting body element 190 rotatably supported by the further carousel 7 and a further supporting body element 191 that is slidable with respect to the supporting body element 190.

The further supporting body element 191 comprises a guiding rod element 192 slidably received in holes 193 of the supporting body element 190.

The further supporting body element 191 comprises the handling element 20.

With the further supporting body element 191 there is associated the connecting element 232.

The connecting element 232 comprises a coupling element 360 associated with the further supporting body element 190.

The coupling element 360 comprises a seat 361 arranged for receiving a portion of the moulding cavity 5.

The coupling element 360 interacts with an external surface of the moulding cavity 5, for example an external cylindrical surface 35.

The coupling element 360 interacts with the external surface of the moulding cavity 5 for example in one, or two, contact points.

The connecting element 232 comprises a first revolving element 194 that defines a first contact point of the aforesaid contact points and a second revolving element 195 that defines a second contact point of the aforesaid contact points. The first revolving element 194 and the second revolving element 195 are rotatably supported by the coupling element 360 and face one another inside the seat 361.

The first revolving element 194 and the second revolving element 195 interact with the external surface of the moulding cavity 5 when the aforesaid portion is received in the seat 161, in such a way as to enable correct positioning of the connecting element 232 with respect to the moulding cavity 5.

The connecting element 232 further comprises a holding element 196 movable towards and away from the coupling element 360.

The holding element 196 comprises an interaction portion 197 having a curved portion and arranged for partially surrounding the moulding cavity 5.

The holding element 196 cooperates with the coupling element 360 to define a receiving zone 373 arranged for receiving the moulding cavity 5.

The receiving zone 373 has an opening portion 376 arranged substantially circumferentially with respect to the further carousel 7 and open in the further rotation direction R2.

The holding element 196 comprises an end portion 198 on which a revolving element 199 is rotatably supported that interacts with the moulding cavity 5 when the moulding cavity 5 is received in the receiving zone 373.

The connecting element 232 may assume a locking configuration W5, shown in FIGS. 52 to 56, in which the holding element 196 and the coupling element 360 prevent the conveying element 8 and the moulding cavity 5 moving way from one another whilst the carousel 2 and the further carousel 7 are rotated.

The connecting element 232 may assume further a release configuration, which is not shown, in which the holding element 196 and the coupling element 360 enable the moulding cavity 5 to penetrate inside the receiving zone 373 and/or to exit the receiving zone 373, whilst the carousel 2 and the further carousel 7 are rotated.

When the connecting element 232 is in the locking configuration W5, the holding element 196 assumes a closing position K5, in which the end portion 198 of the holding element 196 is nearer the coupling element 360.

When the connecting element 232 is in the release configuration, the holding element 196 assumes an open position, in which the end portion 198 of the holding element 196 is further from the coupling element 360.

Between the holding element 196 and the coupling element 360 an elastic element 200 is interposed. The elastic element 200 can be so shaped as to maintain the holding element in the closing position K5.

A driving device can be further provided that moves the holding element 196 from the closing position K5 to the open position, against the action of the elastic element 200.

Instead of the elastic element 200, a pneumatic element can be provided. Alternatively, the holding element can be moved from the closing position K5 to the open position directly from the moulding cavity 5. In particular, the moulding cavity 5, interacting with the revolving element 199, can move the holding element 196 with respect to the coupling element 360.

In addition, the connecting element 232 may comprise a locking arrangement that maintains the holding element 196 in the closing position K5.

Alternatively, the elastic element can be so shaped as to maintain the holding element 196 in the open position.

In this case driving devices can be provided that moves the holding element from the open position to the closing position K5.

In this embodiment, if an interruption to the supply to the driving devices occurs—for example through a suspension to the dispensing of compressed air or of electric energy—the connecting elements 232 release the cavities 5. This prevents the conveying element 8 remaining connected to the respective moulding cavities 5 more than expected, causing damage to parts of the carousel 2 and/or the further carousel 7 and the devices supported thereby.

In other words, in the event of an emergency, the conveying element 8 is able to disengage from the respective moulding cavities 5.

Figure 52:
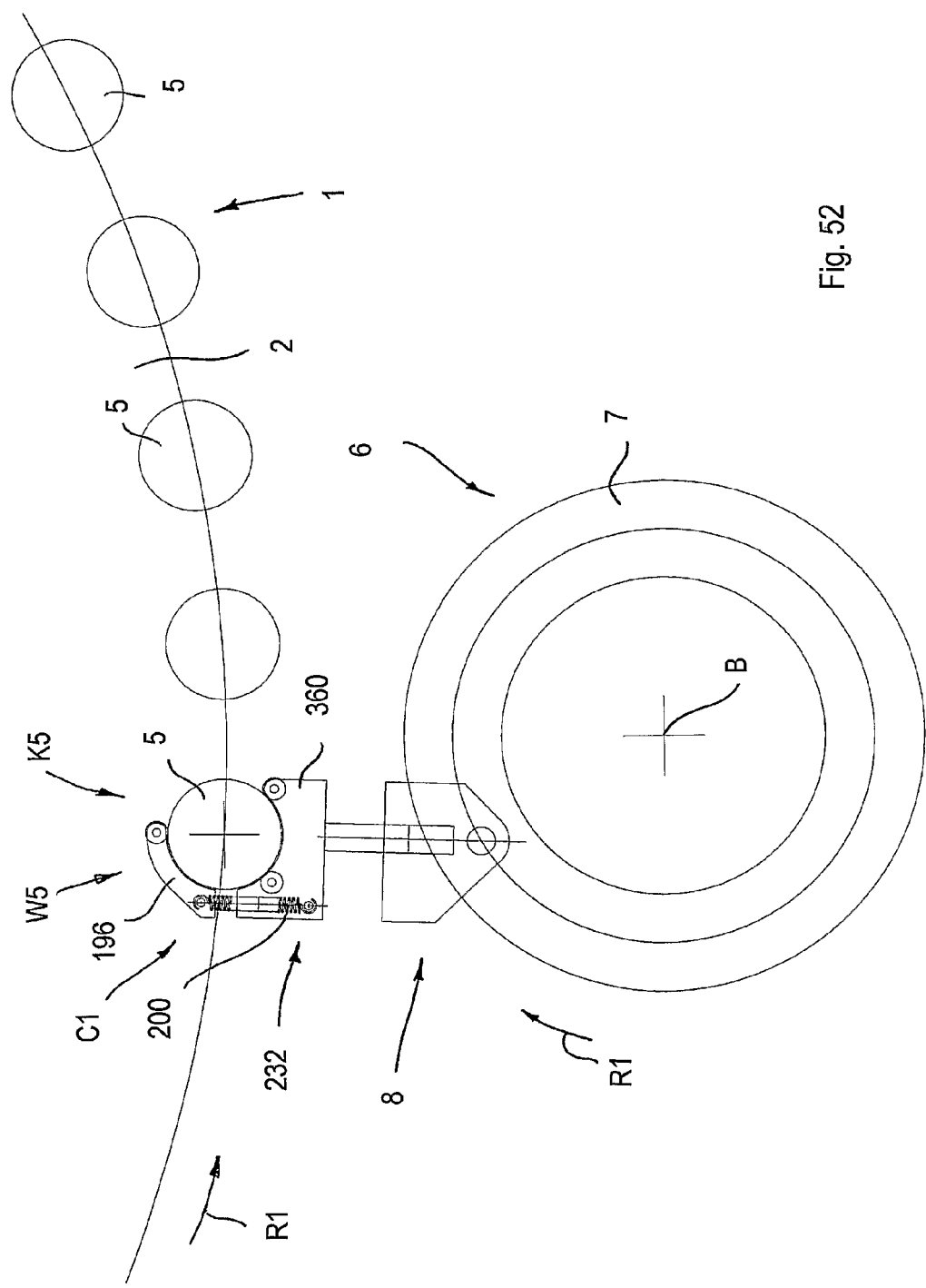
FIG. 52 is a schematic plan view of an apparatus comprising a compression-moulding device and a conveying device, that shows connecting elements of the conveying device in an operating configuration.
Figure 53:
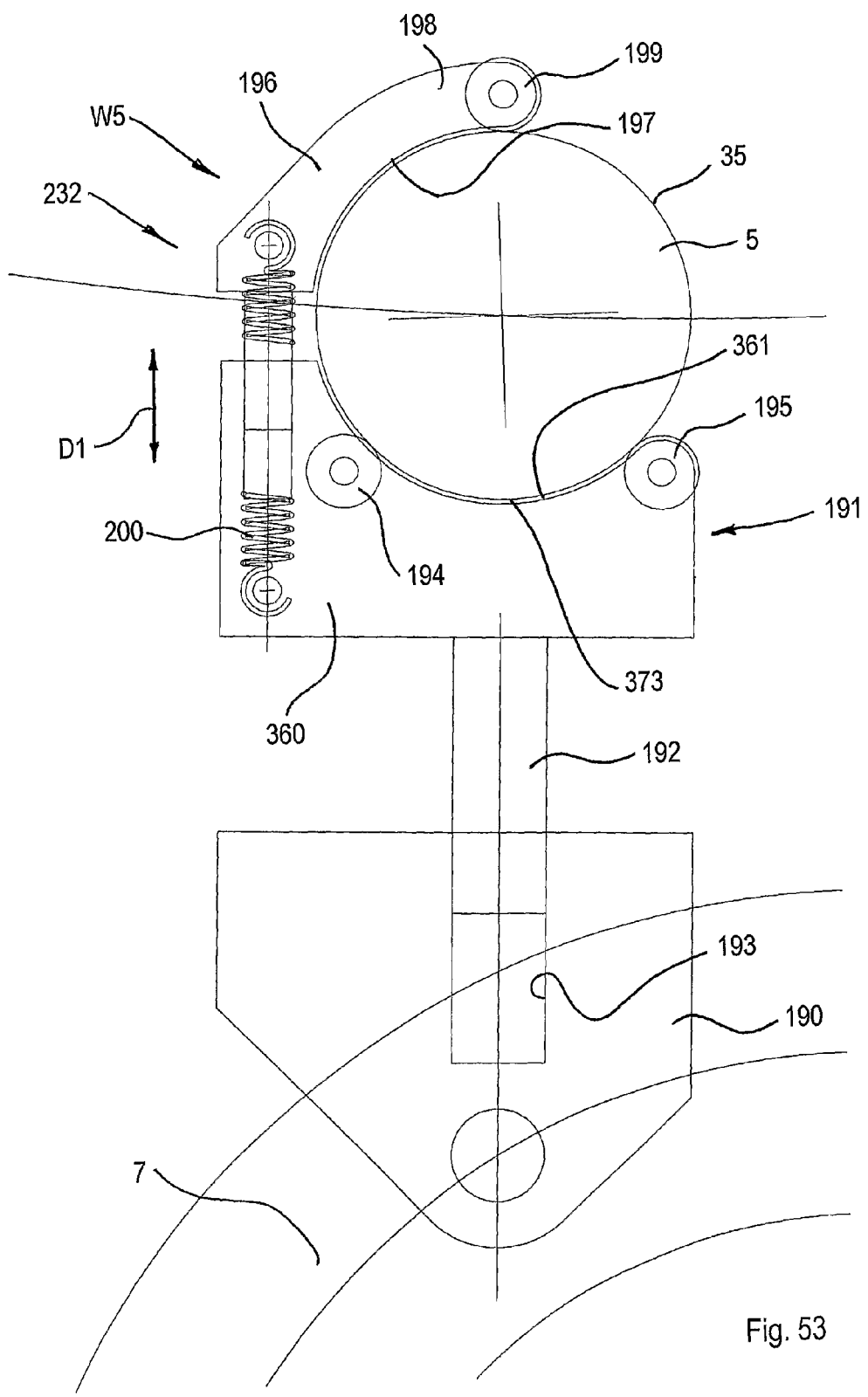
FIG. 53 is an enlarged detail in FIG. 52.

As shown in FIGS. 52 to 55, the holding element 196 is linearly movable with respect to the coupling element 360 along a movement direction D1, shown in FIG. 53.

Guiding elements are provided, which are not shown, that guide the holding element 196 when the holding element 196 moves with respect to the coupling element 360.

Figure 56:
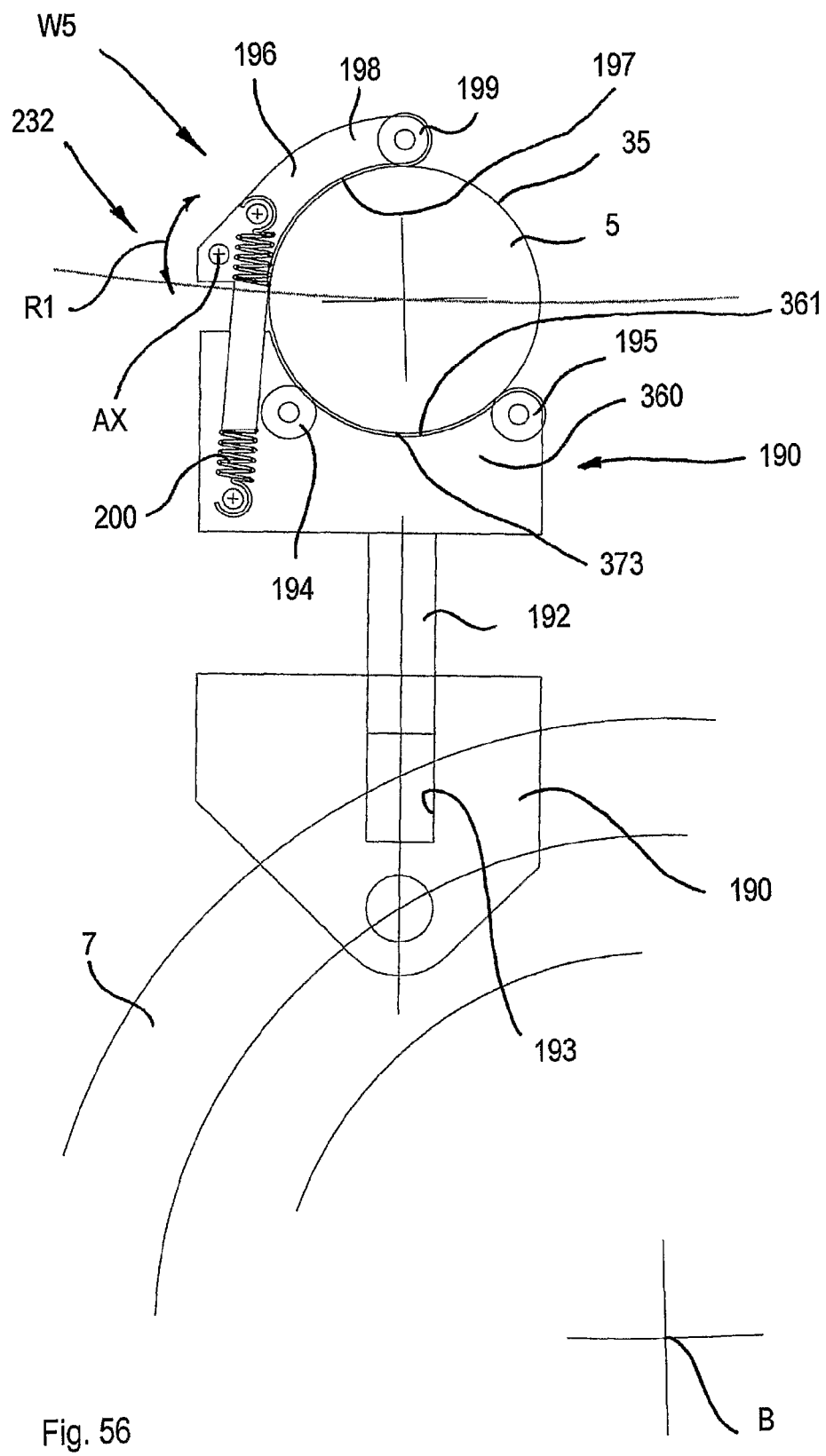
FIG. 56 is a view like the one in FIG. 53 showing connecting elements made according to a version.

As shown in FIG. 56, the holding element 196 oscillates with respect to the coupling element 360. In particular the holding element is rotatable around a rotation axis AX in a rotation direction R1.

Figure 54:
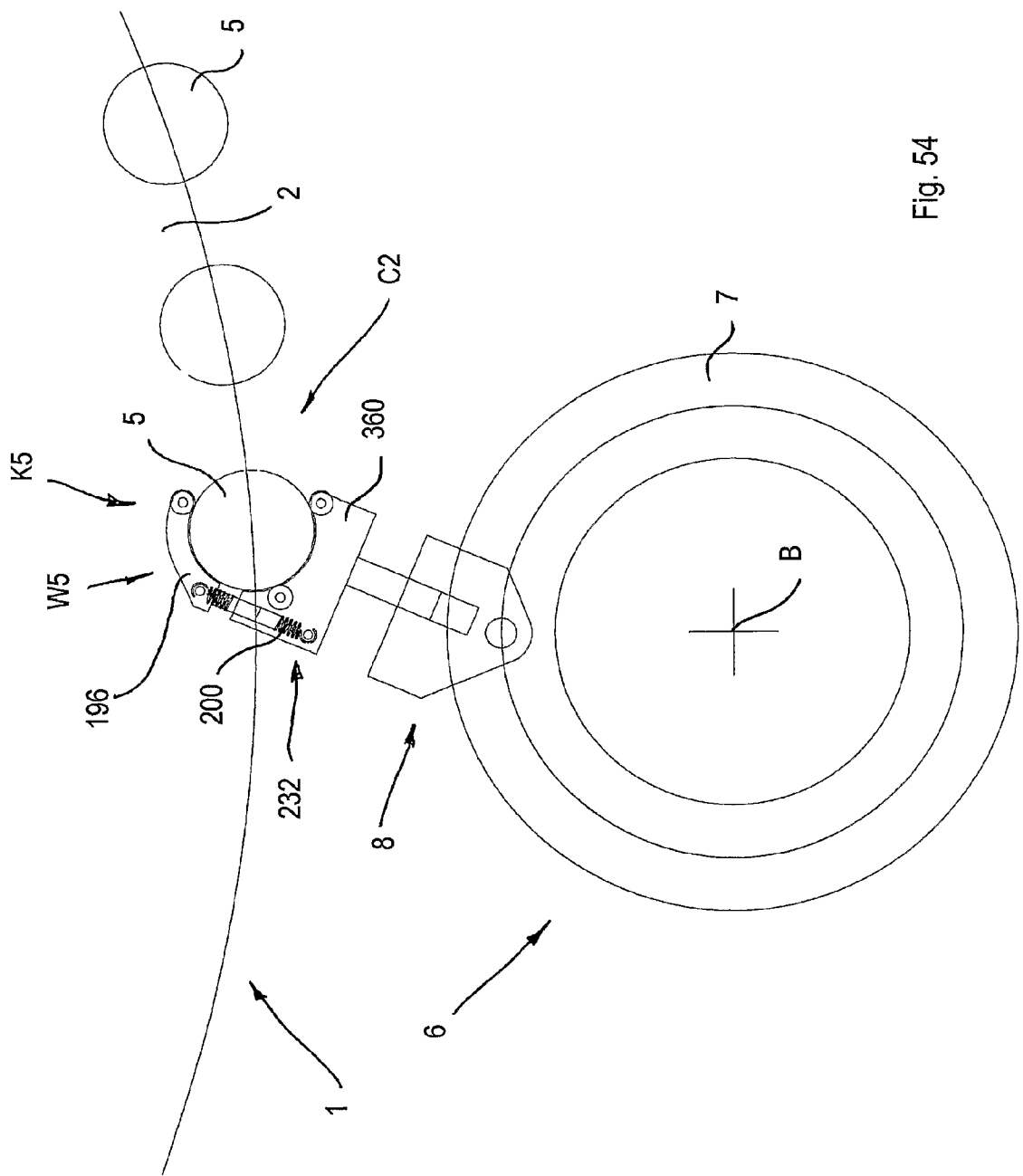
FIG. 54 is a view like the one in FIG. 52, that shows the connecting elements in a further operating configuration.

In FIGS. 52 and 54 there are shown, respectively, a first operating configuration C1 and a second operating configuration C2 of the embodiment of the conveying device 6 disclosed with reference to FIGS. 52 to 55, in which a moulding cavity is retained in the receiving zone 373 of the connecting element 232.

When the conveying device 6 is in the first operating configuration C1 and in the second operating configuration C2, the connecting element 232 is in the locking configuration W5.

Figure 55:
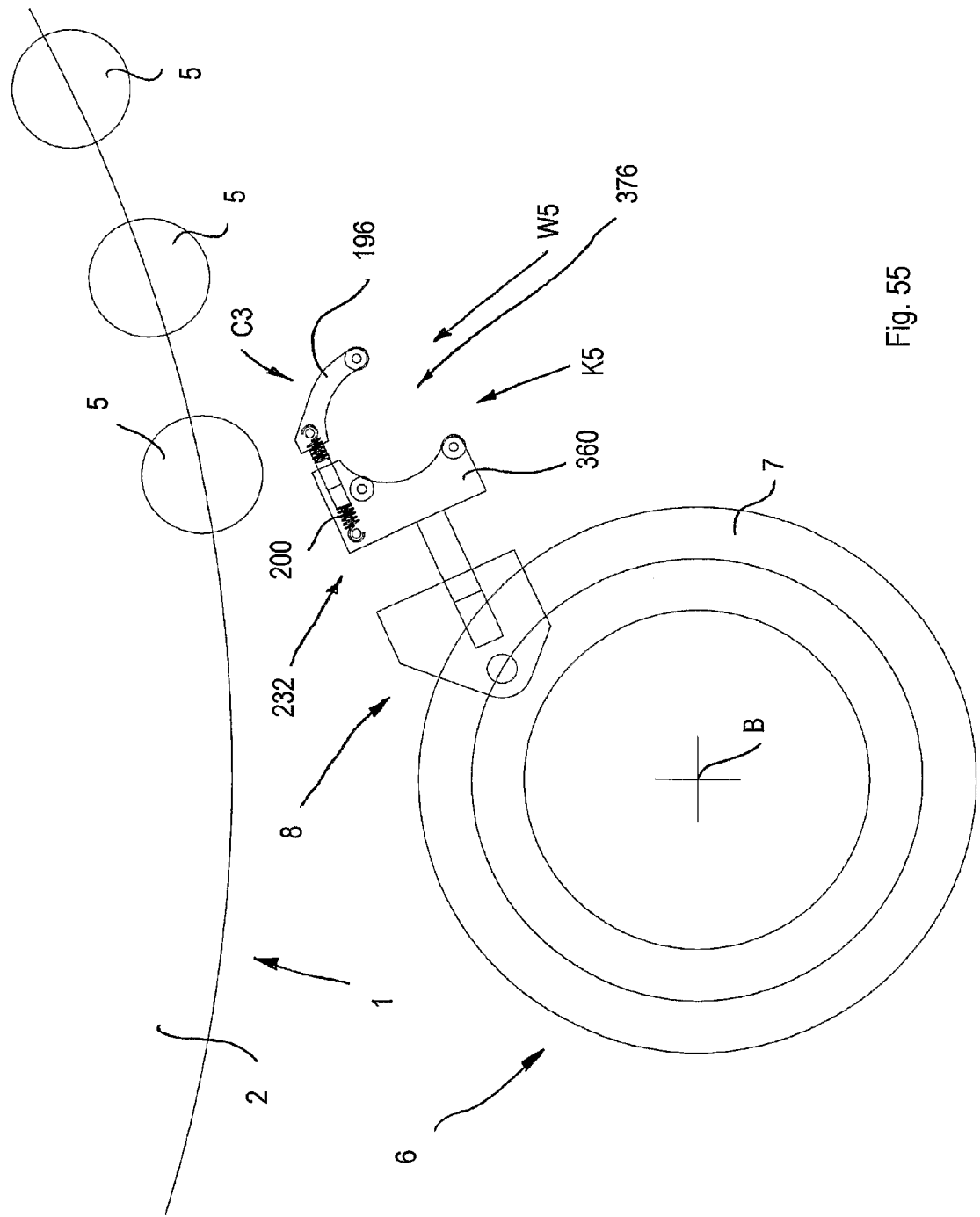
FIG. 55 is a view like the one in FIG. 52, that shows the connecting elements in a still further operating configuration.

In FIG. 55, there is shown a third operating configuration C3 of the conveying device 6, in which the connecting element 232 has disengaged from the moulding cavity 5.

The locking arrangement disclosed with reference to FIGS. 52 to 55 can also be associated with a conveying device 6 disclosed with reference to FIGS. 36 to 51, i.e. with a conveying device 6 comprising a supporting body 15 that is slidable with respect to the further carousel 7 and a further supporting body 16 oscillating with respect to the supporting body 15.

Figure 7:
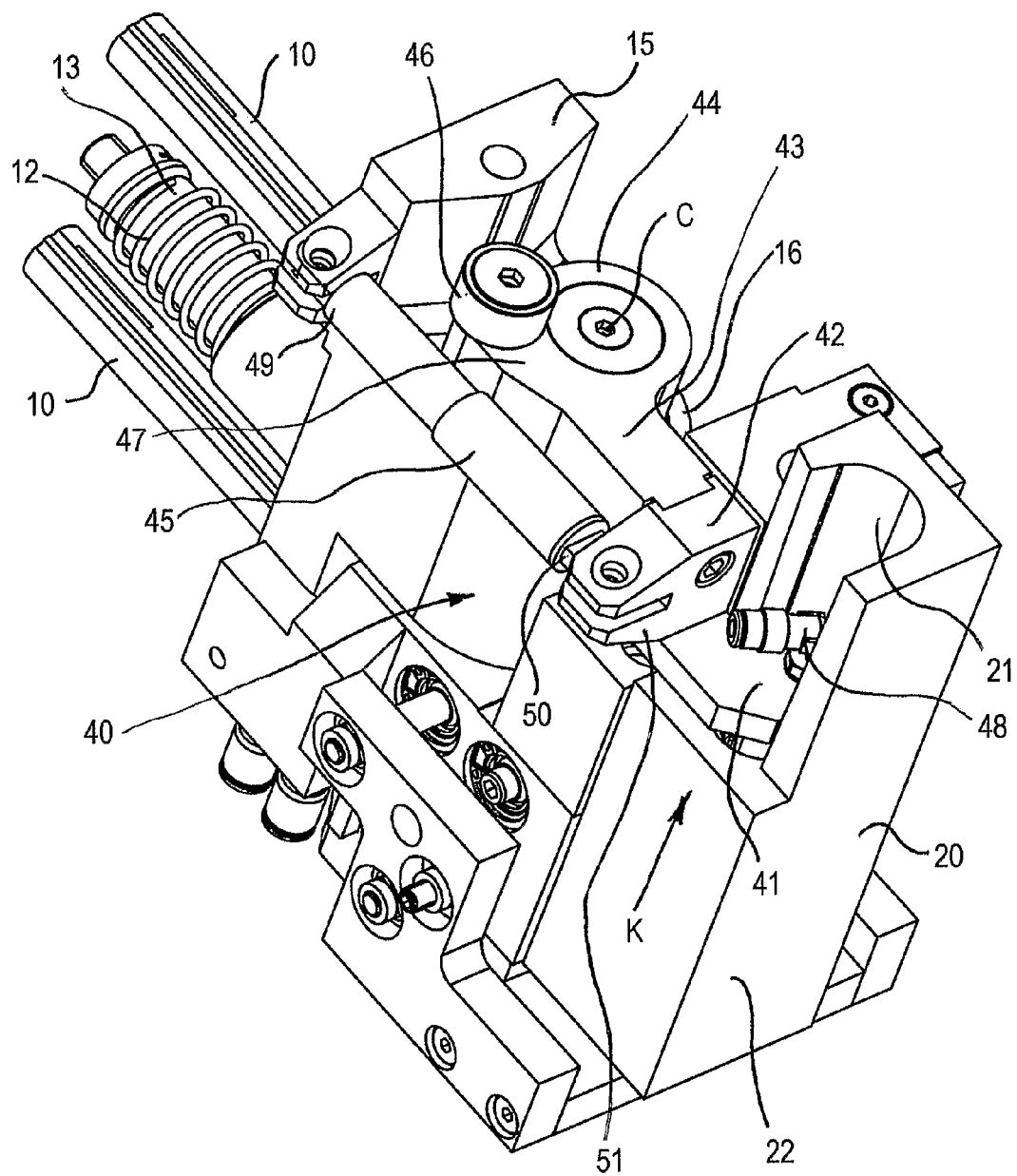
FIG. 7 is a perspective view of a conveying element.
Figure 8:
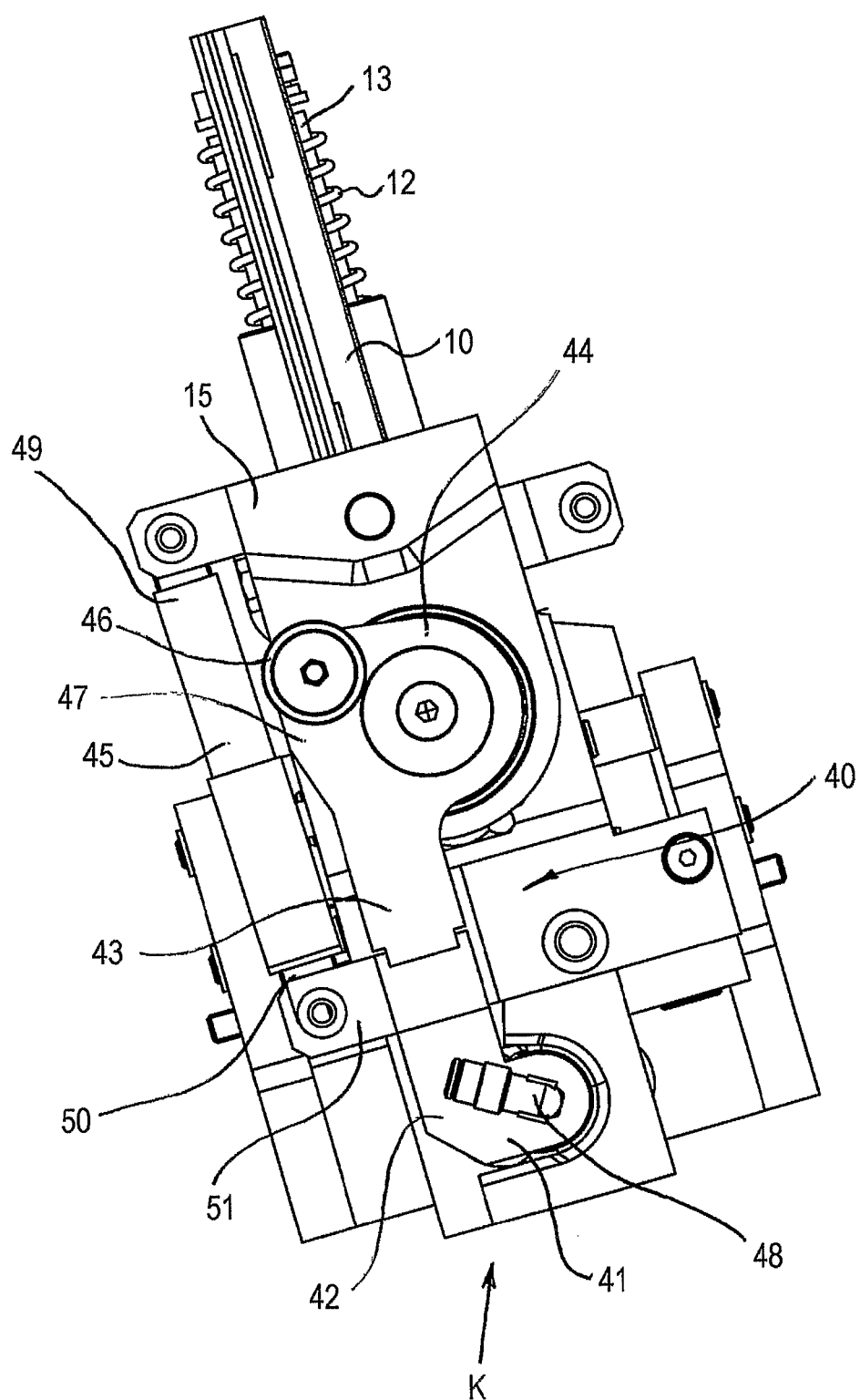
FIG. 8 is a plan view of the conveying element in FIG. 7.
Figure 9:
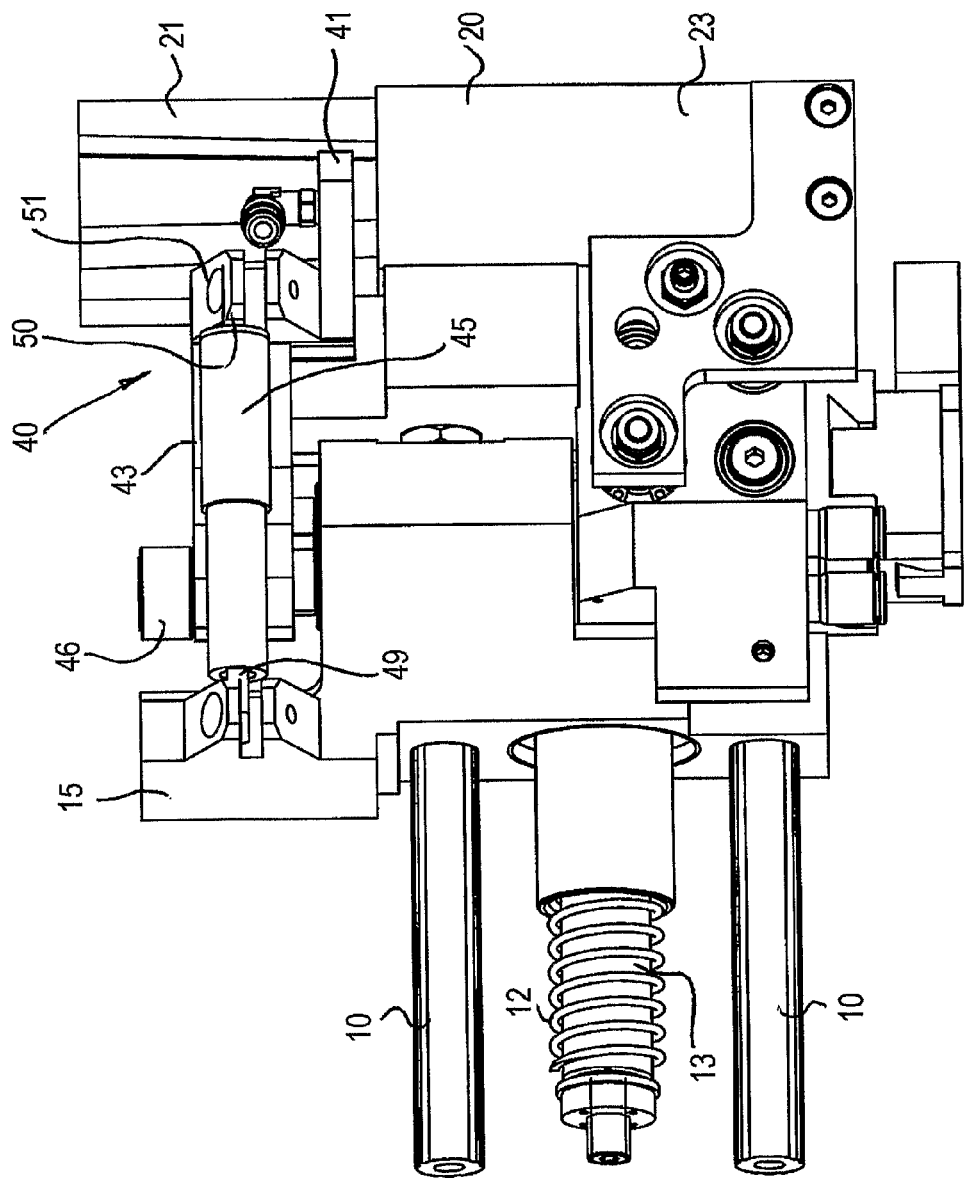
FIG. 9 is a side view of the conveying element in FIG. 7.

As shown in FIGS. 7 to 9, with the further supporting body 16 there is associated a closing device 40 arranged for closing the inlet opening 27 of the joining portion 23.

The closing device 40 comprises a closing element 41 fixed to an end 42 of an arm 43 having a further end 44, opposite the end 42, hinged on the further supporting body 16.

The closing element 41 is movable between a closing position K, shown in FIGS. 7 and 8, in which the closing element 41 closes the inlet opening 27, and an opening position, which is not shown, in which the closing element 41 is far from the inlet opening 27.

In the closing position K, the closing element 41 does not come into contact with the handling element 20 prevent surfaces of the closing element 41 and of the handling element 20, being damaged by interacting mutually.

The closing device 40 further comprises a further elastic element, for example a spring received into a case 45, holding the closing element 41 in the closing position K.

The further elastic element provides a thrust that does not change the amount of the oscillation of the further supporting body 16 with respect to the supporting body 15, during operation.

The case 45 comprises a first end zone 49 hinged on the supporting body 15 and a further end zone 50, opposite the end zone 49, hinged on a portion 51 of the arm 43.

The closing device 40 further comprises a revolving element 46 hinged on an appendage 47 of the arm 43 and cooperating with a cam element, which is not shown, fixed to a frame of the conveying device 6.

The cam element is shaped so as to move the closing element 41 from the closing position K to the opening position, during the rotation of the further carousel 7, without producing modifications of the position of the supporting body 15 and the further supporting body 16.

Alternatively, the further elastic element can be so shaped as to maintain the closing element 41 in the open position.

In this case, the cam element is so shaped as to move the closing element 41 from the open position to the closing position K, during rotation of the further carousel 7.

Sensor devices are provided for verifying whether the dose 80 was entirely received inside the joining portion 23 and the containing portion 22 (i.e., said sensor devices verify whether the entire dose 80 passed through the inlet opening 27) and, if this is the case, enables the closing element 41 to be moved from the open position to the closing position K.

With the closing element 41 a dispensing device 48 is associated for dispensing a fluid, for example compressed air, into the joining portion 23 and the containing portion 22, the dispensing device 48 being supplied by conduits, which are not shown.

When the closing element 41 is in the closing position K, the supplying element 48 introduces the fluid into the containing portion 22, above the dose 80 received therein, to promote the ejecting of the dose 80 from the containing portion 22, through the exit opening 28.

Alternatively, inside the closing element 40 a movable ejecting element can be associated, commanded by the fluid, that acts directly on the dose 80 to eject the dose 80 from the containing portion 22.

The ejecting element may be so shaped as to profile an upper portion of the dose 80 in order to reduce, or even eliminate, the roughness of the upper portion of the dose 80 that has previously come into contact with a cutting knife that separated the dose 80 from the extruder.

The movable ejecting element may be so shaped as to produce, at one end of the dose with which said moving ejecting element interacts, a dip of such a shape as to facilitate a first penetration of the punch, so that the punch can more easily centre itself with respect to the dose.

In other words, the punch, by engaging said dip, can more easily position the dose so that the axis of the dose is aligned with the axis of the moulding cavity. Alternatively, the ejecting element may act on the dose 80 not directly, but indirectly, a fluid cushion being interposed between the ejecting element and the upper portion of the dose 80.

Figure 16:
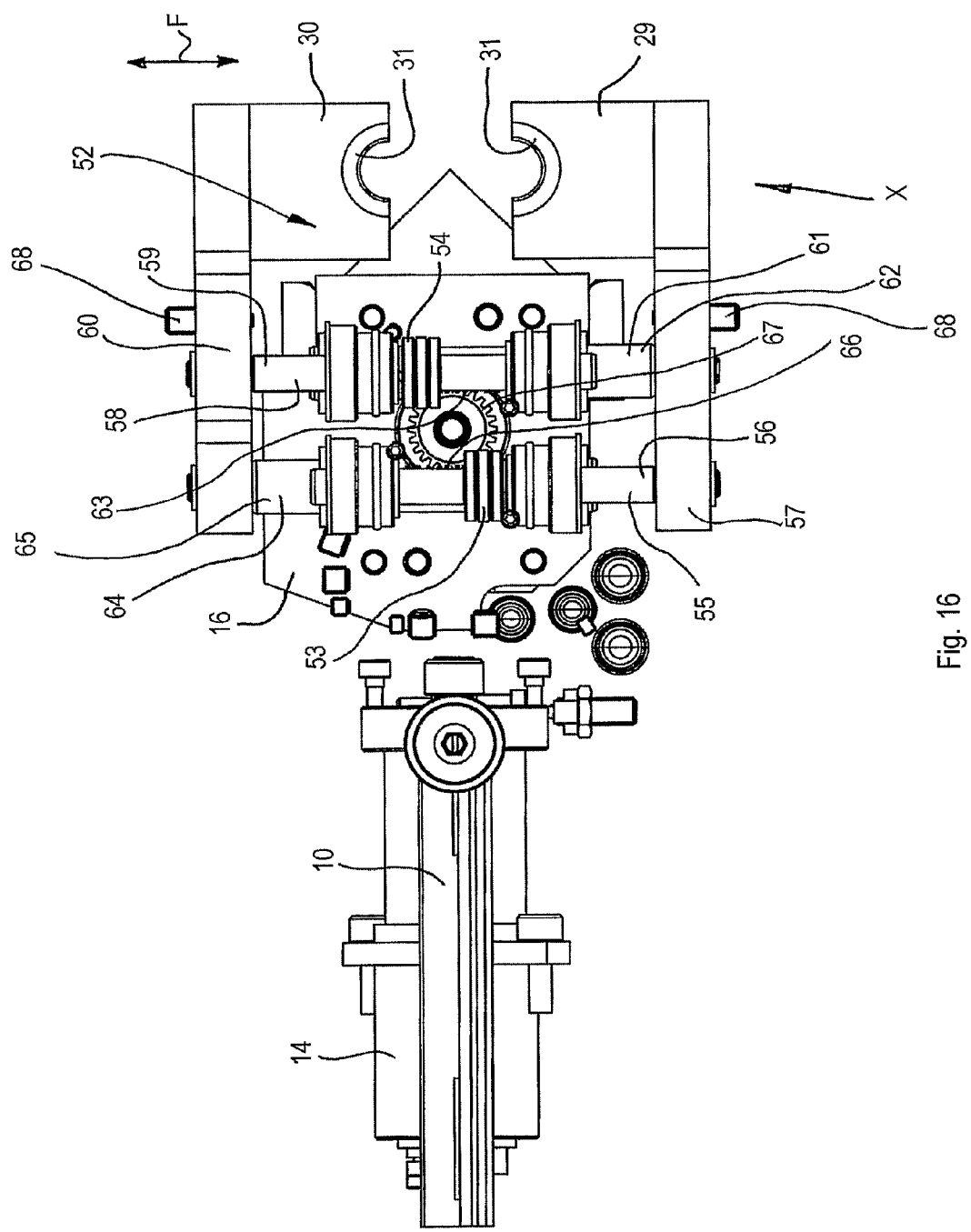
FIG. 16 is a plan view of the further part of a conveying element in FIG. 15.

With reference to FIGS. 15 and 16 there is shown a driving device 52 arranged for driving the first closing element 29 and the second closing element 30 between the open configuration X and the closed configuration Y.

The driving device 52 comprises a first actuator 53, for example a pneumatic actuator, and a second actuator 54, for example a further pneumatic actuator, fixed to the further supporting body 16.

The first actuator 53 comprises a first stem 55, having one free end 56 fixed to a first supporting element 57 to which the first closing element 29 is connected.

The second actuator 54 comprises a second stem 58, having a further free end 59 fixed to a second supporting element 60 to which the second closing element 30 is connected.

The first actuator 53 and the second actuator 54 move the first closing element 29 and the second closing element 30 from the open position X to the closed position Y, and vice versa.

The first actuator 53 and the second actuator 54 may be of the double-acting type.

The actuating device 52 comprises a bar 61 provided with a rack portion 63 and having an end zone 62 connected to the first supporting element 57.

The driving device 52 further comprises a further bar 64 provided with a further rack portion 66 and having a further end zone 65 connected with the second supporting element 60.

The actuating device 52 further comprises a gear wheel 67 rotationally supported in idling manner by the further supporting body 16.

The bar 61 and the further bar 64 are arranged so that the rack portion 63 and the further rack portion 66 are mutually faced and simultaneously engage the gear wheel 67.

The first stem 55 is arranged substantially parallel to the further bar 64 and above the latter.

The second stem 58 is arranged substantially parallel to the bar 61 and above the latter.

The driving device 52 moves the first closing element 29 and the second closing element 30 mutually away and towards one another by linearly translating moves the first closing element 29 and the second closing element 30 along a movement direction F.

The driving device 52 mutually moves the first closing element 29 and the second closing element 30 towards and away from one another on a plane substantially parallel to a further plane defined by the exit opening 28.

The driving device 52 moves the first closing element 29 and the second closing element 30, maintaining them mutually parallel.

In this way, the tip of the dose 80 is detached evenly from the first closing element 29 and from the second closing element 30.

The first closing element 29 and the second closing element 30, do not therefore exert on the dose 80—in particular on the tip of the dose 80—stress that tends to deform the dose.

The first closing element 29 and the second closing element 30 move along the moving direction F in a simultaneous manner and covering a same distance, owing to the rack portion 63, the further rack portion 66 and the gear wheel 67, all acting as synchronising elements.

An adjusting arrangement 68 is further provided for adjusting the position of the first closing element 29 and the second closing element 30.

The adjusting arrangement 68 prevents the first closing element 29 and the second closing element 30 from colliding with each other, which could cause damage.

The adjusting arrangement 68 comprises mechanical stroke limiting elements, each of which is provided with an adjusting screw and one or more stop elements suitable for being positioned in a desired operating configuration by means of the adjusting screw.

Figure 17:
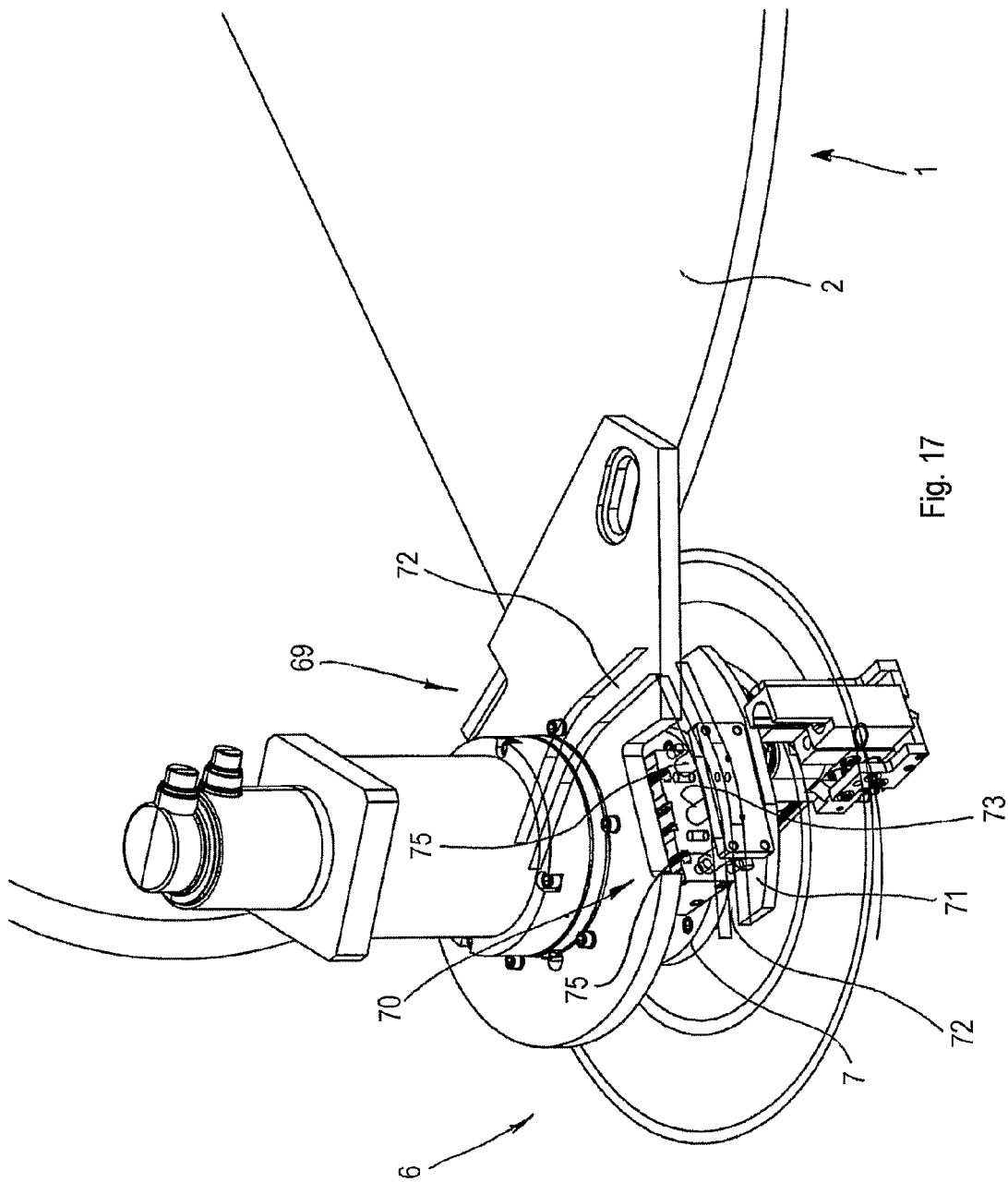
FIG. 17 is a schematic and fragmentary perspective view of the apparatus in FIG. 1.
Figure 18:
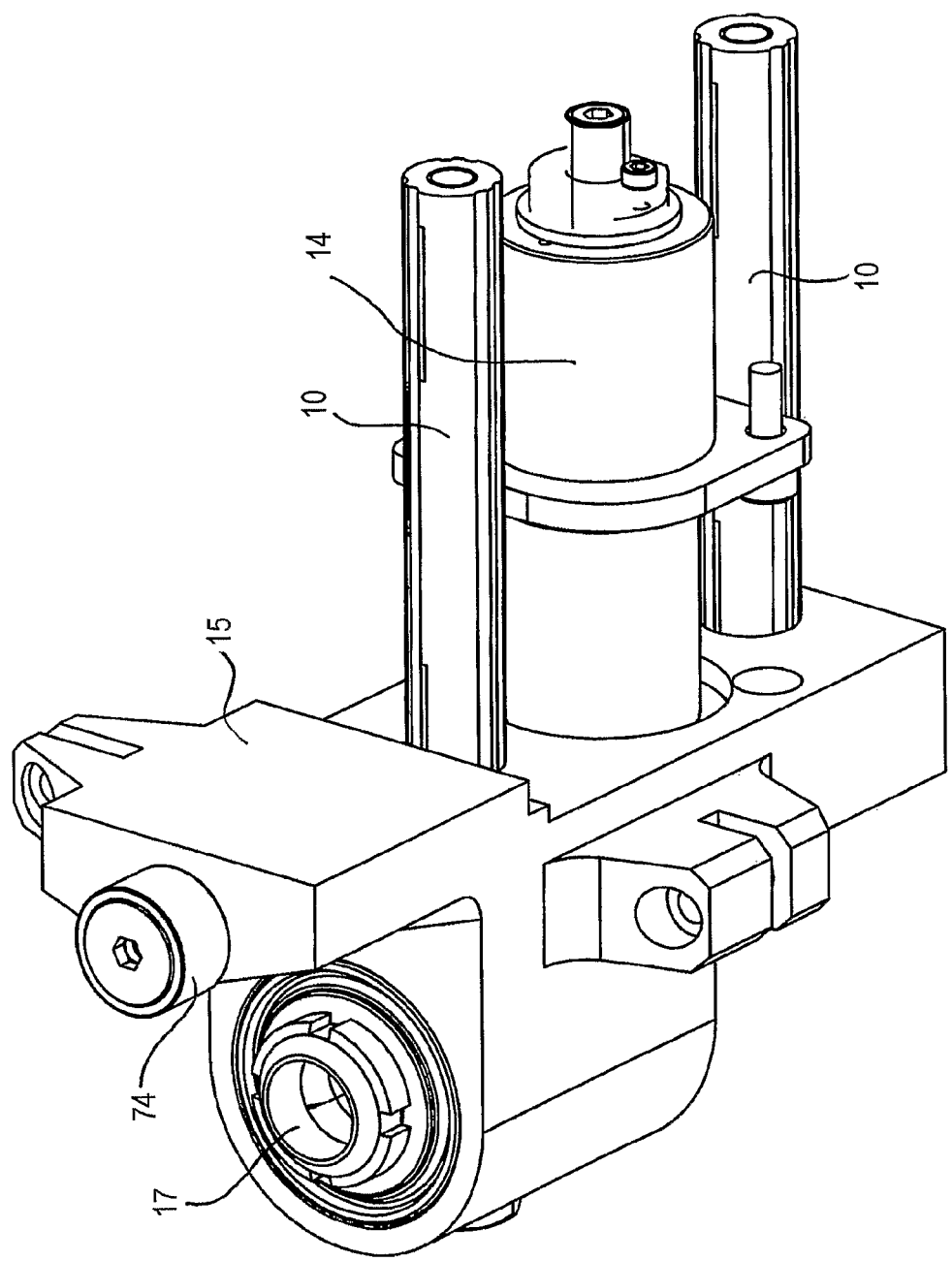
FIG. 18 is a perspective view of a component of a conveying element.

As shown in FIGS. 17 and 18, the conveying device 6 comprises a first movement device 69 and a second movement device 70 arranged for moving the conveying elements 8.

Owing to requirements connected with the manufacturing cycle, or in situations of emergency occurring during operation, it may be necessary to prevent the conveying elements 8 from interacting with the extruder, (or with the cutting devices that cut the plastics that exit a dispensing nozzle of the extruder to give rise to the doses 80), in such a way that the conveying elements 8 do not remove doses 80 of plastics from the extruder. Similarly it may be necessary to prevent the conveying elements 8 from interacting with the compression-moulding device 1, in such a way that the conveying elements 8 do not deliver doses 80 of plastics to the moulding cavities 5.

More generally, it may be the case that it is desired to prevent any interaction between the conveying device 6 and the compression-moulding device 1.

In addition, it may be desirable for only some of the conveying elements 8 to interact with the extruder and with the compression-moulding device 1, whilst the remaining conveying elements are maintained in a non-operating position.

The first movement device 69 is positioned in a zone of the conveying device 6 at which the conveying device 6 interacts with the compression-moulding device 1, in such a way as to remove, if required, the conveying elements 8 from the carousel 2.

The second movement device 70 is positioned in a further zone of the conveying device 6 at which the conveying device 6 interacts with the extruder in such a way as to remove, if required, the conveying elements 8 from the extruder.

The first movement device 69 and the second 70 comprise a plate 71 in which a groove 72 is obtained defining a cam profile.

The first movement device 69 and the second movement device 70 further comprise actuating devices 73, for example pneumatic actuating devices, having a portion connected to the further carousel 7 and a further portion connected to the plate 71.

The actuating devices 73 move the plate 71 between an operating position, in which a revolving body 74, rotatably supported by the supporting body 15, is received in the groove 72, and a rest position, in which the revolving body 74 does not interact with the groove 72.

Columns 75 are further provided that guide the plate 71 from the operating position to the rest position, and vice versa.

In the operating position, the groove 72 leads the rolling body 74 to travel along a predetermined path.

The rolling body 74, therefore, by interacting with the groove 72, overcomes the force exerted by the spring 12 and leads the conveying element 8 to approach the further rotation axis B.

When the plate 71 lies in the operating position, a plurality of revolving bodies 74, associated with mutually adjacent conveying elements 8, simultaneously engage the groove 72.

Consequently, the plate 71 simultaneously moves a group of successive conveying elements 8.

Alternatively, each conveying element 8 may comprise, instead of the spring 12, a linear actuating device, pneumatic or of other type (for example LinMot®), that on the one hand assures a substantially constant thrust on the conveying element 8, towards the exterior of the further carousel 7, irrespective of the radial position of the conveying element 8, and on the other hand enables the conveying element 8 to be moved, irrespective of the other conveying elements 8, to remove said conveying element 8 from the maximum extent configuration E and move said conveying element 8 closer to the further rotation axis B.

In this case, it is not necessary to provide the first movement device 69 and the second movement device 70.

Figure 19:
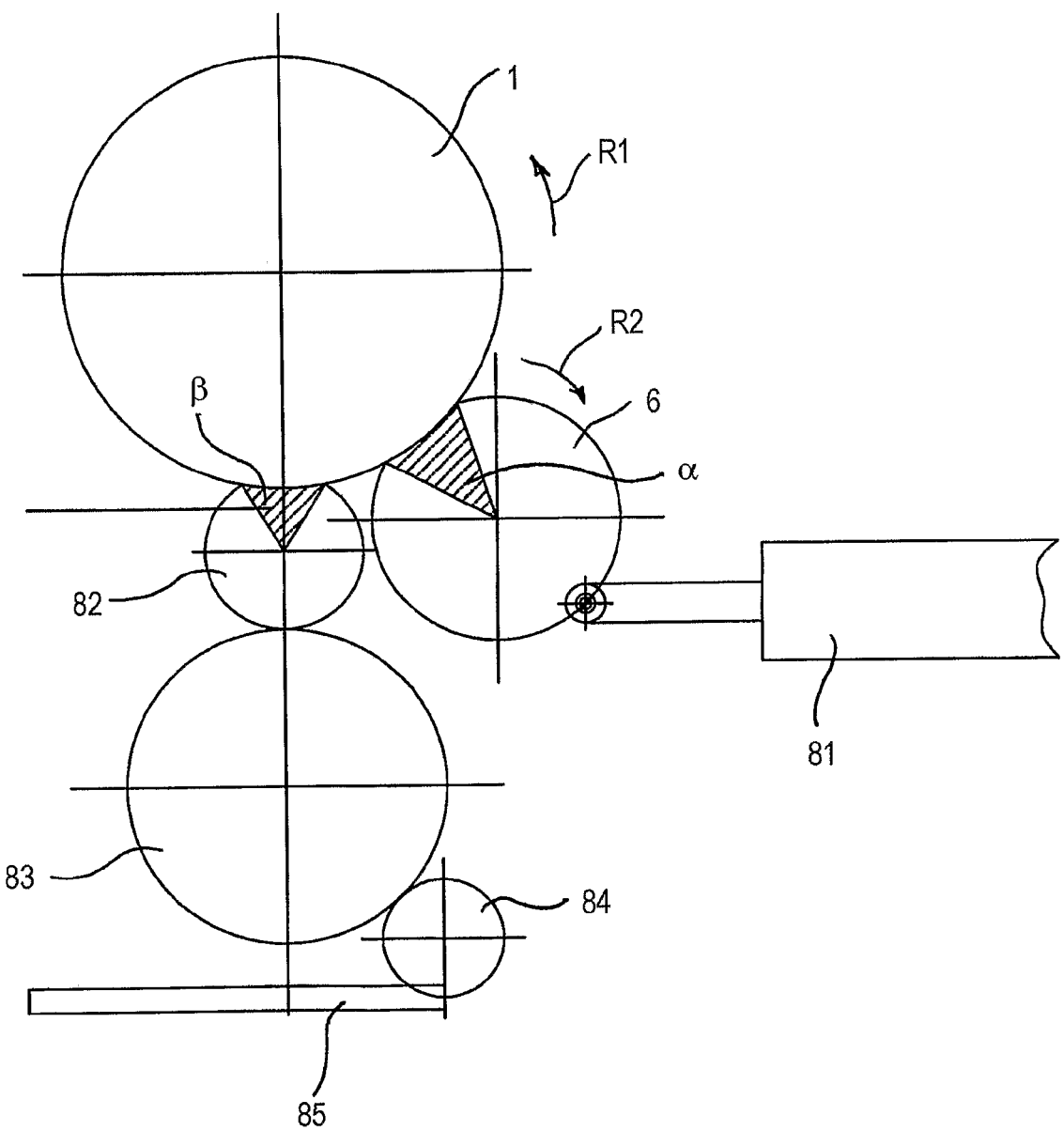
FIG. 19 is a schematic layout of an apparatus for compression-moulding plastics.

Referring to FIG. 19, an apparatus is shown for pressure forming doses of plastics for obtaining objects, particularly container preforms, said apparatus comprising an extruder 81, a conveying device 6 of the type disclosed above, that removes doses of pasty plastics from the extruder 81 and transfers said doses to a compression-moulding device 1, of the type disclosed above.

The apparatus further comprises an extracting device 82, a thermal conditioning device 83, a removing device 84 and a conveying device 85.

The extracting device 82, the thermal conditioning device 83 and the removing device 84 may each comprise a rotating carousel.

The extracting device 82 removes the objects from the compression-moulding device 1 and delivers said objects to the thermal conditioning device 83 wherein said objects are thermally conditioned, for example cooled.

The removing device 84 removes the objects from the thermal conditioning device 83 and delivers the aforesaid objects to the conveying device 85, which discharges said objects.

In the conveying device 6 an angular sector □ is identified for inserting the doses 80.

In the extracting device 82 an angular sector □ is identified for removing the finished products.

The extruder 81 cannot be moved with respect to the conveying device 6 so as to adopt a position arranged more downstream with respect to the further rotating direction R2—i.e. the extruder 81 cannot be moved closer to the angular sector □ while being moved along the further rotating direction R2—in order not to prevent an operator accessing a zone bound by the conveying device 6, by the extracting device 82 and by the thermal conditioning device 83.

Figure 20:
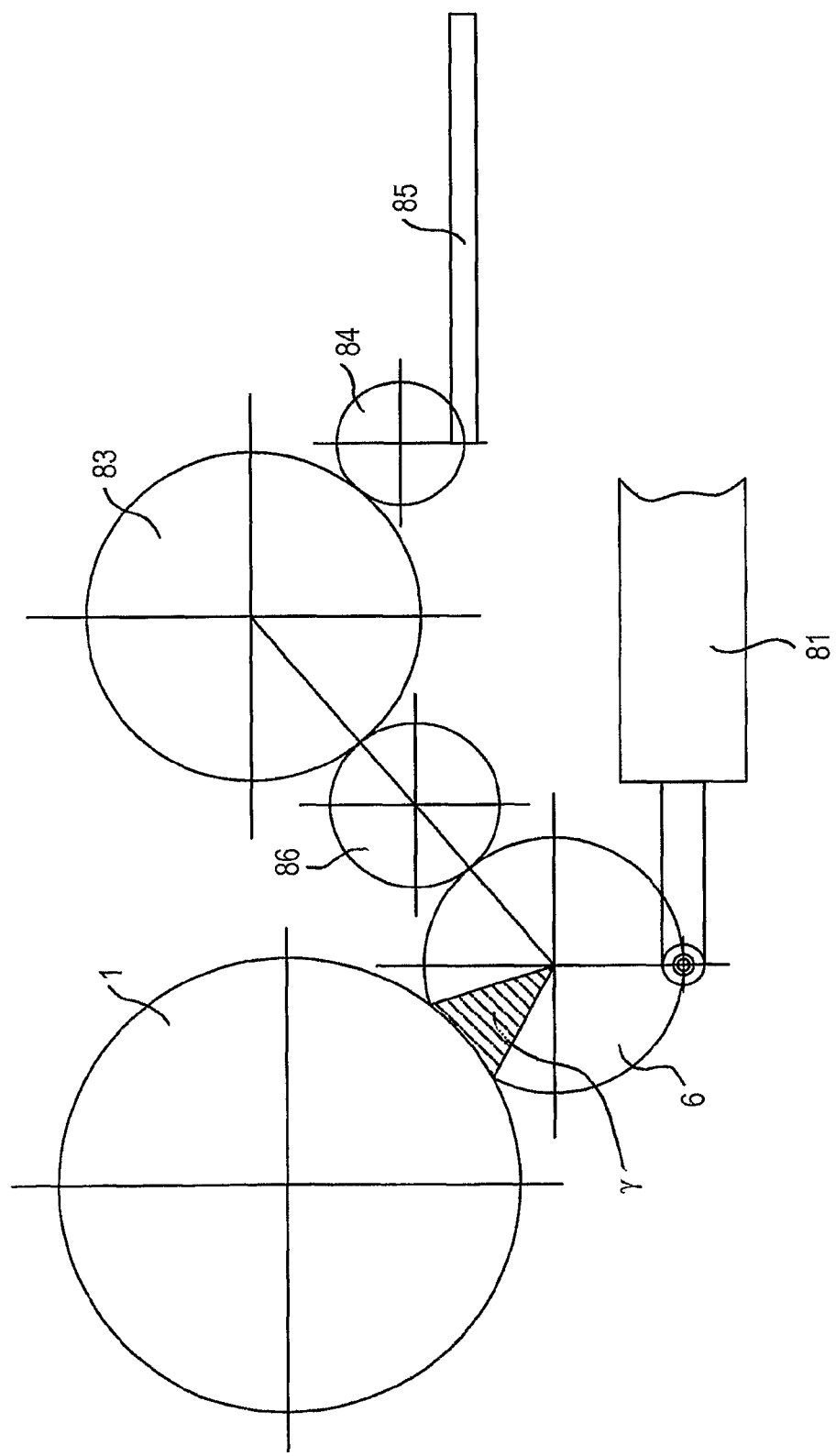
FIG. 20 is a schematic layout of a further apparatus for compression-moulding plastics.

Referring to FIG. 20, an apparatus is shown for pressure forming doses of plastics in order to obtain objects, particularly container preforms, said apparatus comprising an extruder 81, a compression-moulding device 1, a thermal conditioning device 83, a removing device 84 and a conveying device 85 similar to those disclosed with reference to FIG. 19.

The apparatus is provided with a conveying device 6 that removes the doses of pasty plastics from the extruder 81 and transfers said doses to a compression-moulding device 1.

The conveying device 6 further removes the objects from the compression-moulding device 1 and transfers the aforesaid objects to a transferring device 86, for example of carousel type.

Subsequently, the transferring device 86 supplies the objects to the thermal conditioning device 83.

An angular sector □ for inserting the doses 80 and removing the finished products is defined in the conveying device 6.

In an embodiment that is not shown, the transferring device 86 may be not provided, in this case the conveying device 6 delivers the objects directly to the thermal conditioning device 83.

This enables a structurally simpler apparatus to be obtained.

Figure 10:
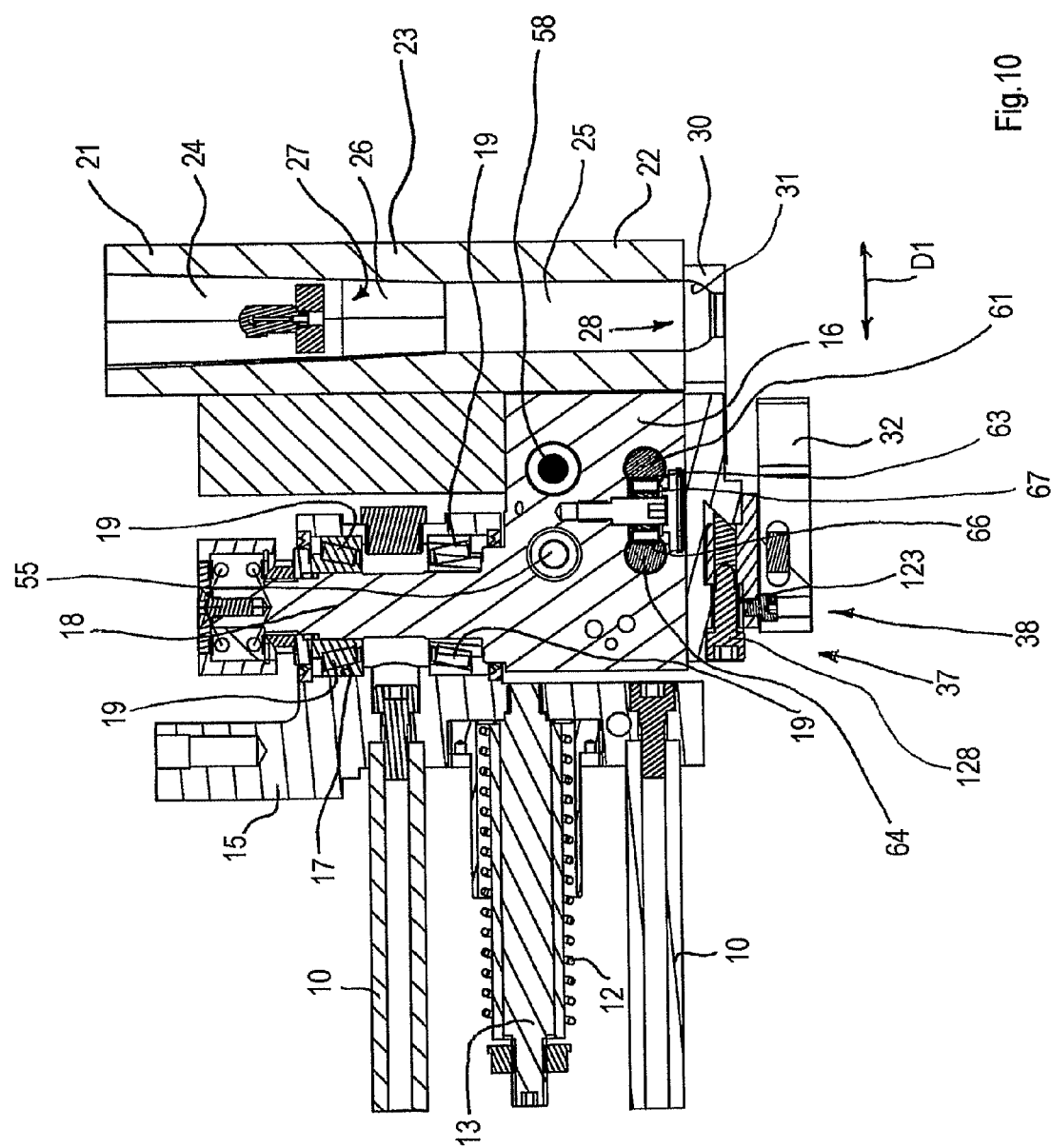
FIG. 10 is a longitudinal section of the conveying element in FIG. 7.
Figure 11:
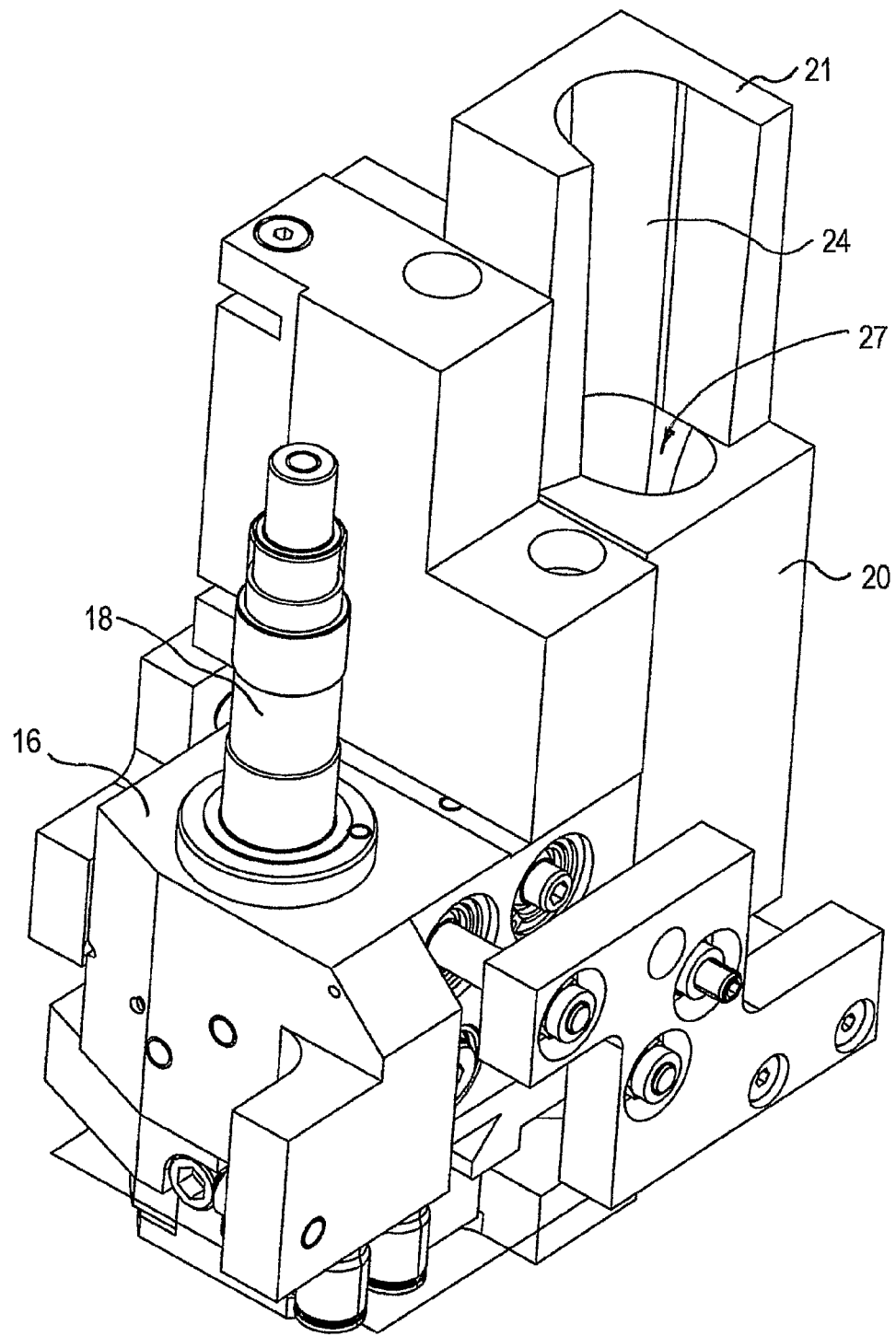
FIG. 11 is a perspective view of a part of a conveying element.
Figure 12:
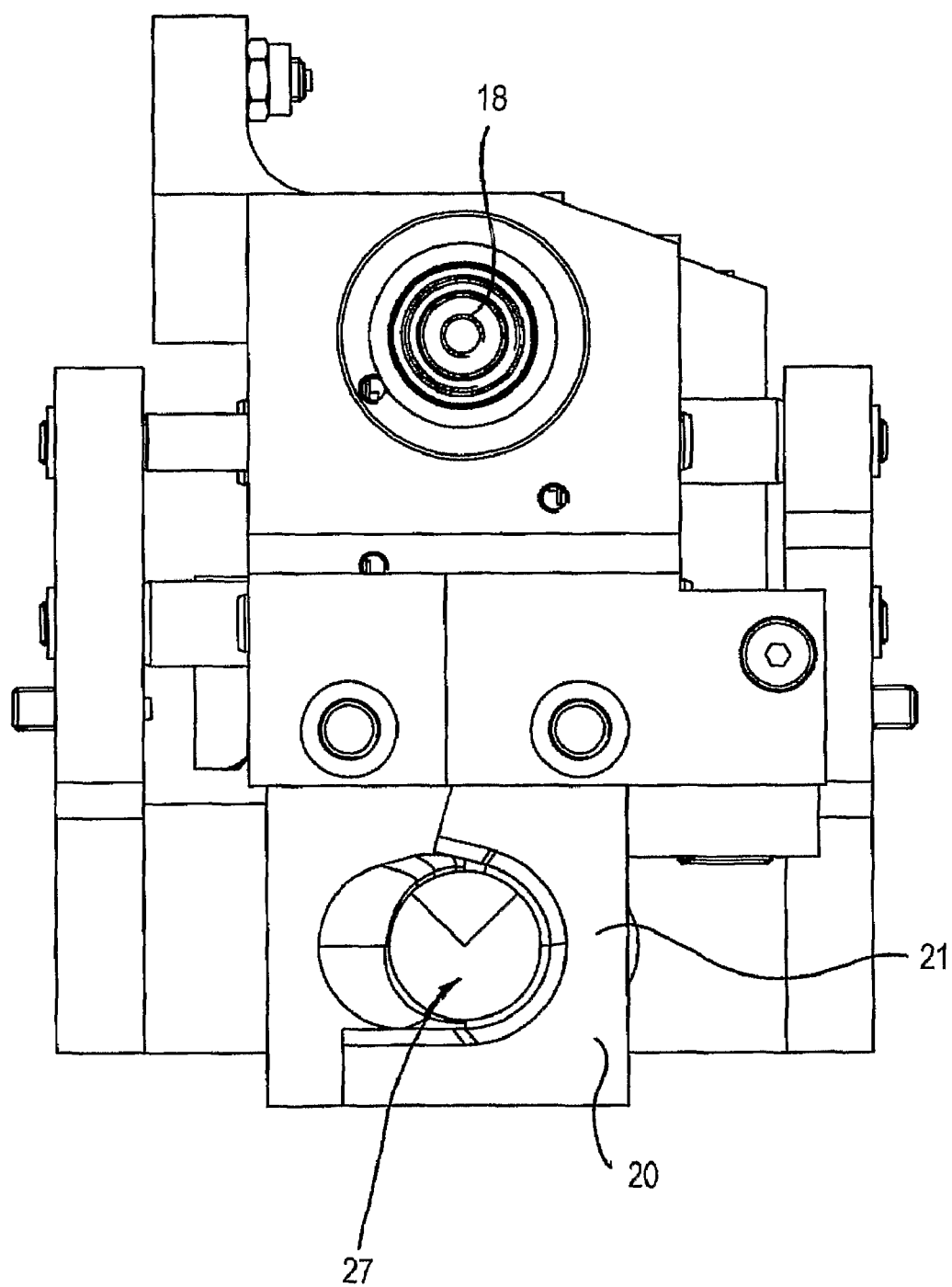
FIG. 12 is a plan view of the part of the conveying element in FIG. 11.
Figure 13:
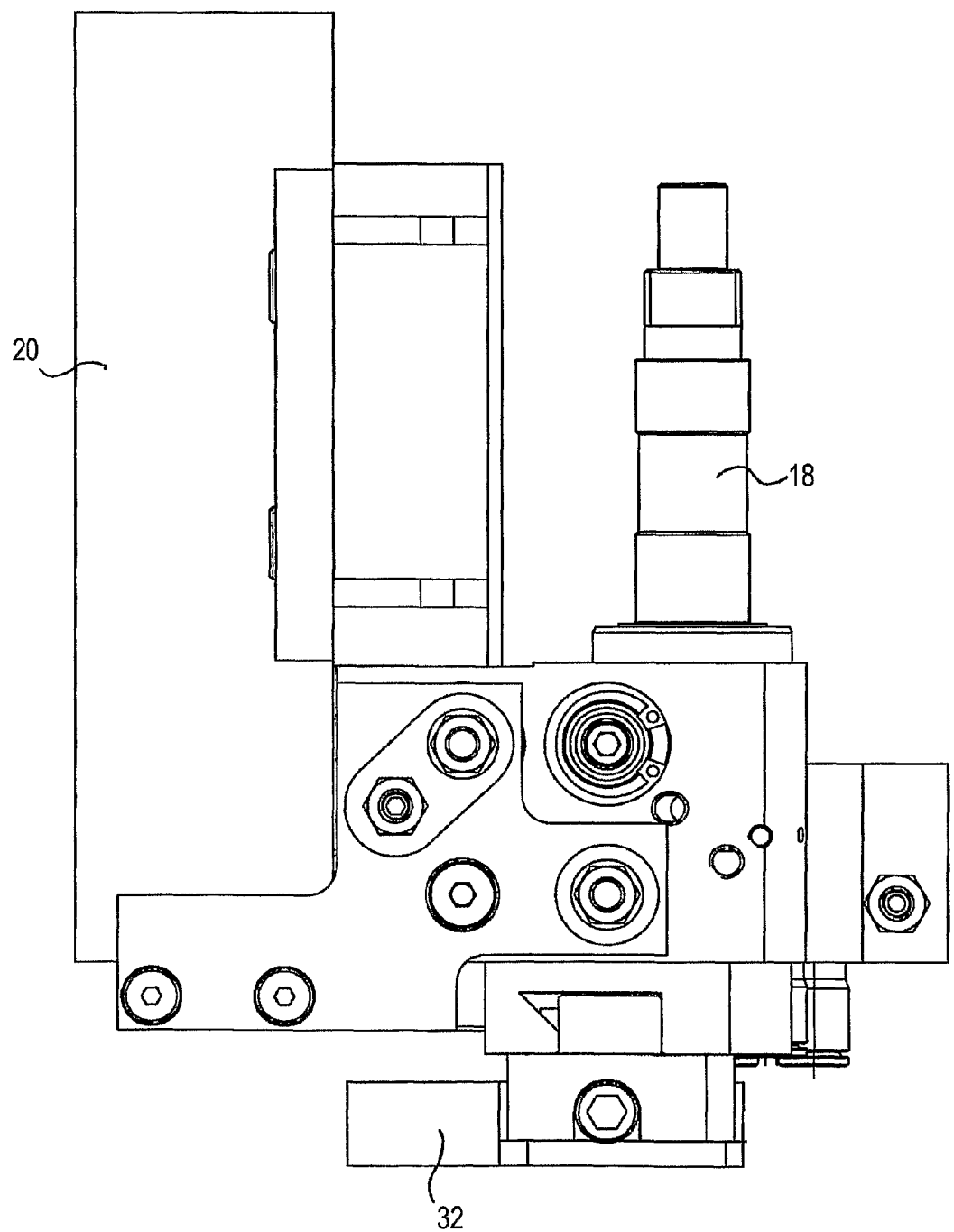
FIG. 13 is a side view of the part of a conveying element in FIG. 11.
Figure 14:
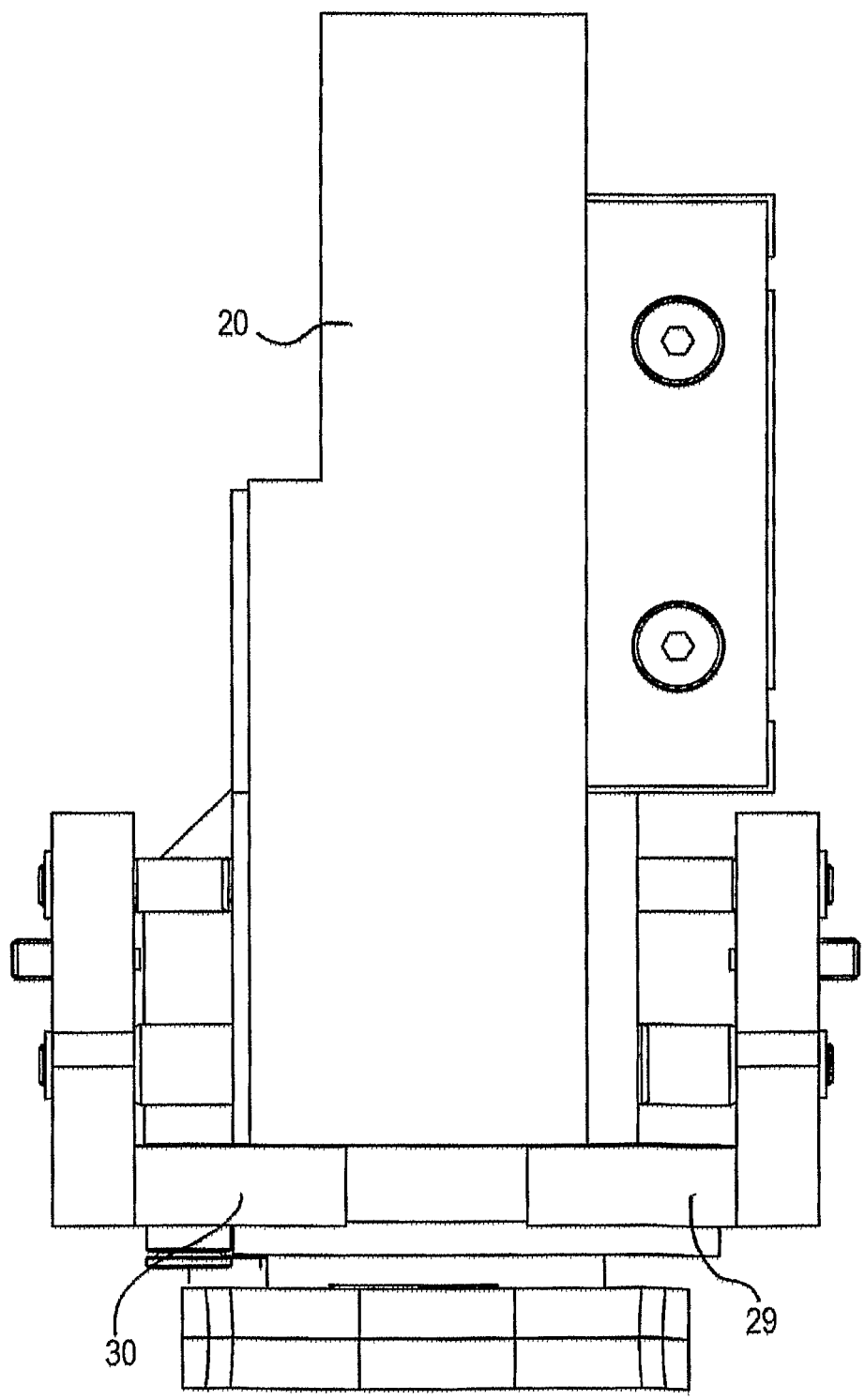
FIG. 14 is a frontal view of the part of a conveying element in FIG. 11.

As shown in FIGS. 7, 10 and 12, the receiving portion 22 of the conveying elements 8 of the conveying device 6 is so shaped as to receive and support an object.

The gap 24 of the receiving portion 22 may be so shaped as to efficiently receive and handle both a dose and an object, particularly if such an object is a preform and, therefore, shows a remarkable similarity, as regards shape and dimensions, to a dose 80 designed for giving rise to said preform.

While the preform is collected, the closing element 41, if present, lies in the closing position K.

Consequently, the closing element 41, properly shaped for the purpose, can act as supporting element supporting the preform from below.

The extruder 81 can adopt, with respect to the further rotation direction R2, a position arranged further downstream than the position adopted by the extruder 81 in the apparatus in FIG. 19.

In other words, it is possible to move the extruder 81, by moving the aforesaid extruder 81 along the further rotation direction R2, closer to the angular sector □ since the extruder, the extraction device 82 being not provided, does not prevent access to the conveying device 6.

Additionally, since the extruder is positioned further downstream than the further rotation direction R2, the doses remain inside the conveying elements 8 for a shorter time than in the apparatus shown in FIG. 19.

This contributes to preventing the plastics from attaching themselves to the walls of the conveying elements 8.

In addition, as the objects are removed by the compression-moulding device 1 when the doses are inserted into the compression-moulding device 1—and not before the doses are inserted into the compression-moulding device 1—said doses (and the preforms originating from said doses) remain on the compression-moulding device 1 for a time interval corresponding substantially to a complete rotation of the carousel 2 around the axis A.

More time is thus provided than in the case of the apparatus shown in FIG. 19, during which time the object, after having been formed, can cool in such a way that the weight thereof is stabilised.

With reference to FIGS. 21 to 24, a handling element 20 is shown comprising a containing portion 22 provided with a guiding element 87 arranged for directing the dose 80 towards the moulding cavity 5.

The guiding element 87 comprises a sleeve 88 received inside the cavity 25.

Figure 23:
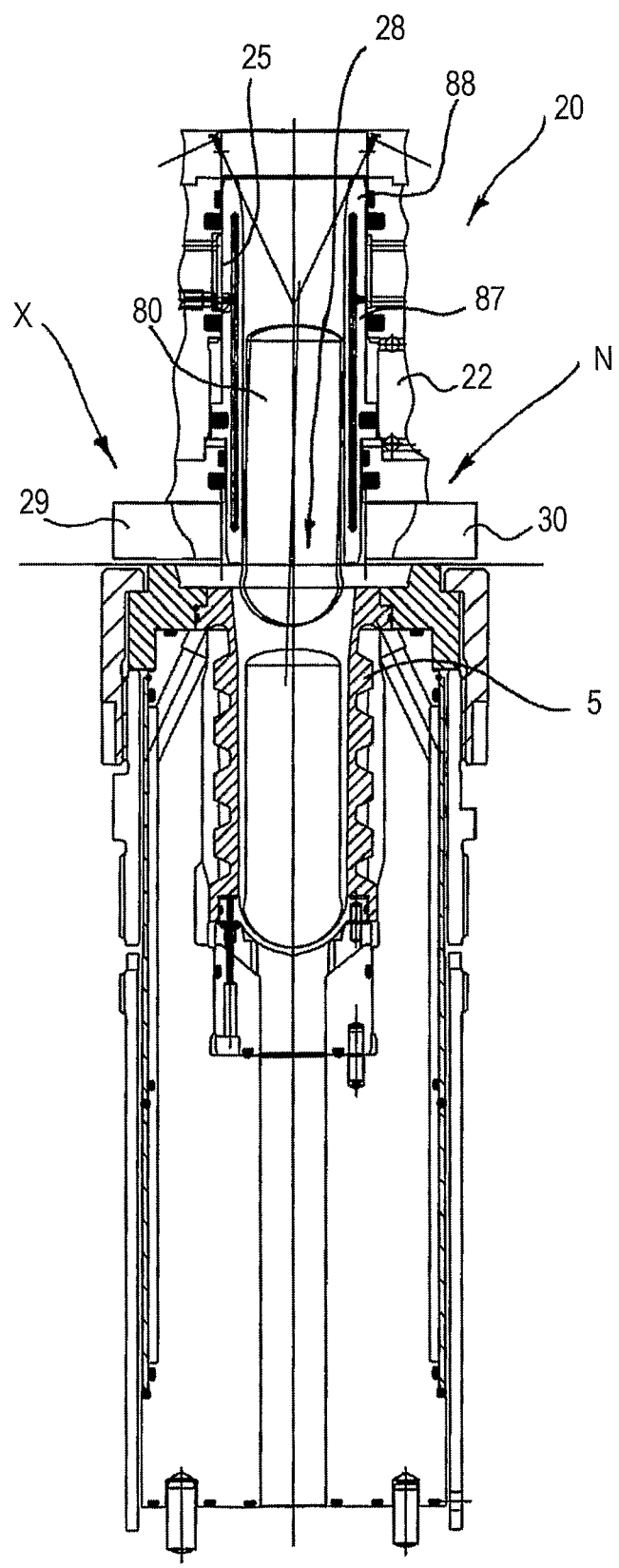
FIG. 23 is a section like the one in FIG. 21 showing the handling element in a further operating configuration.
Figure 24:
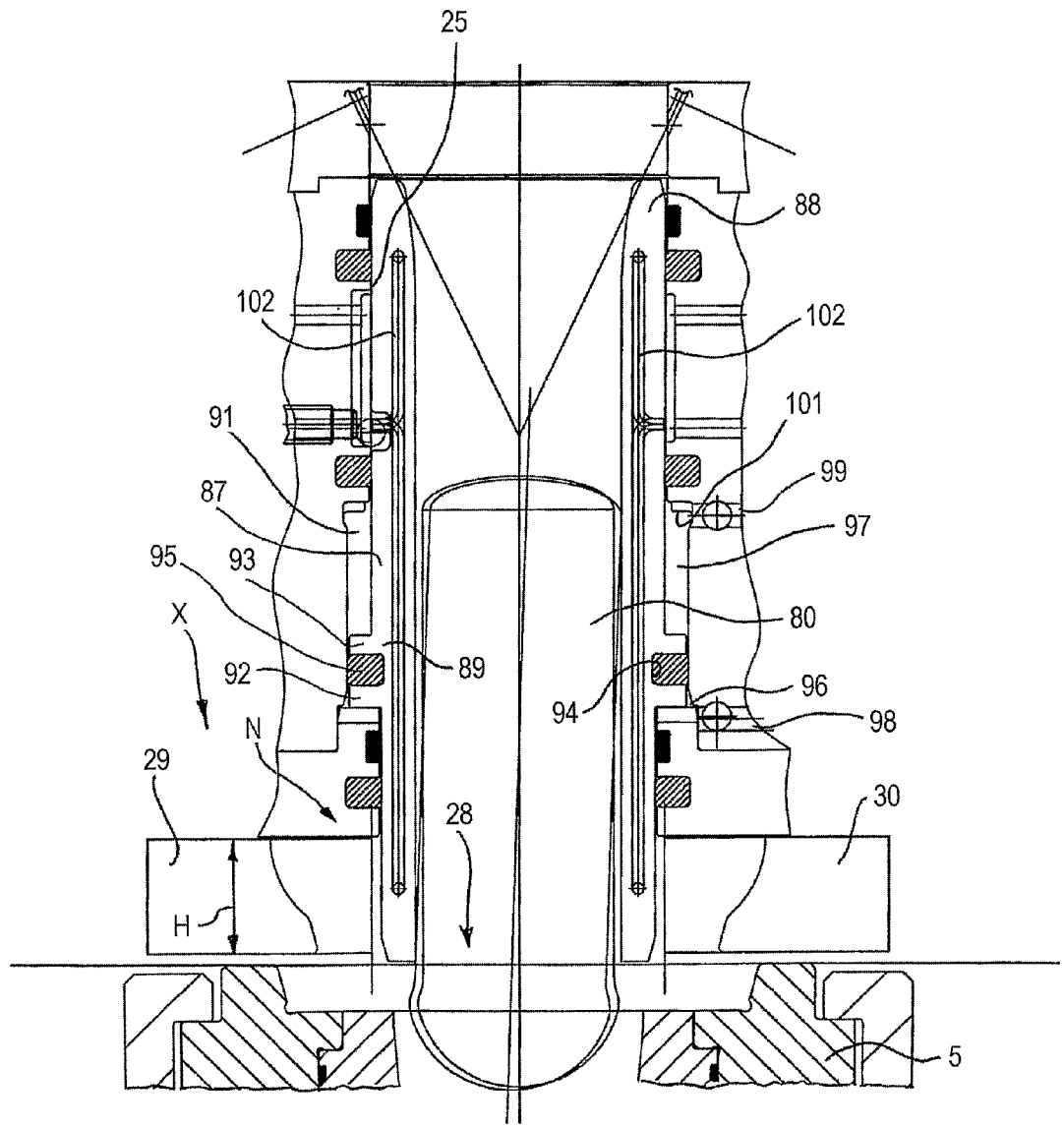
FIG. 24 is an enlarged detail of FIG. 23.
Figure 25:
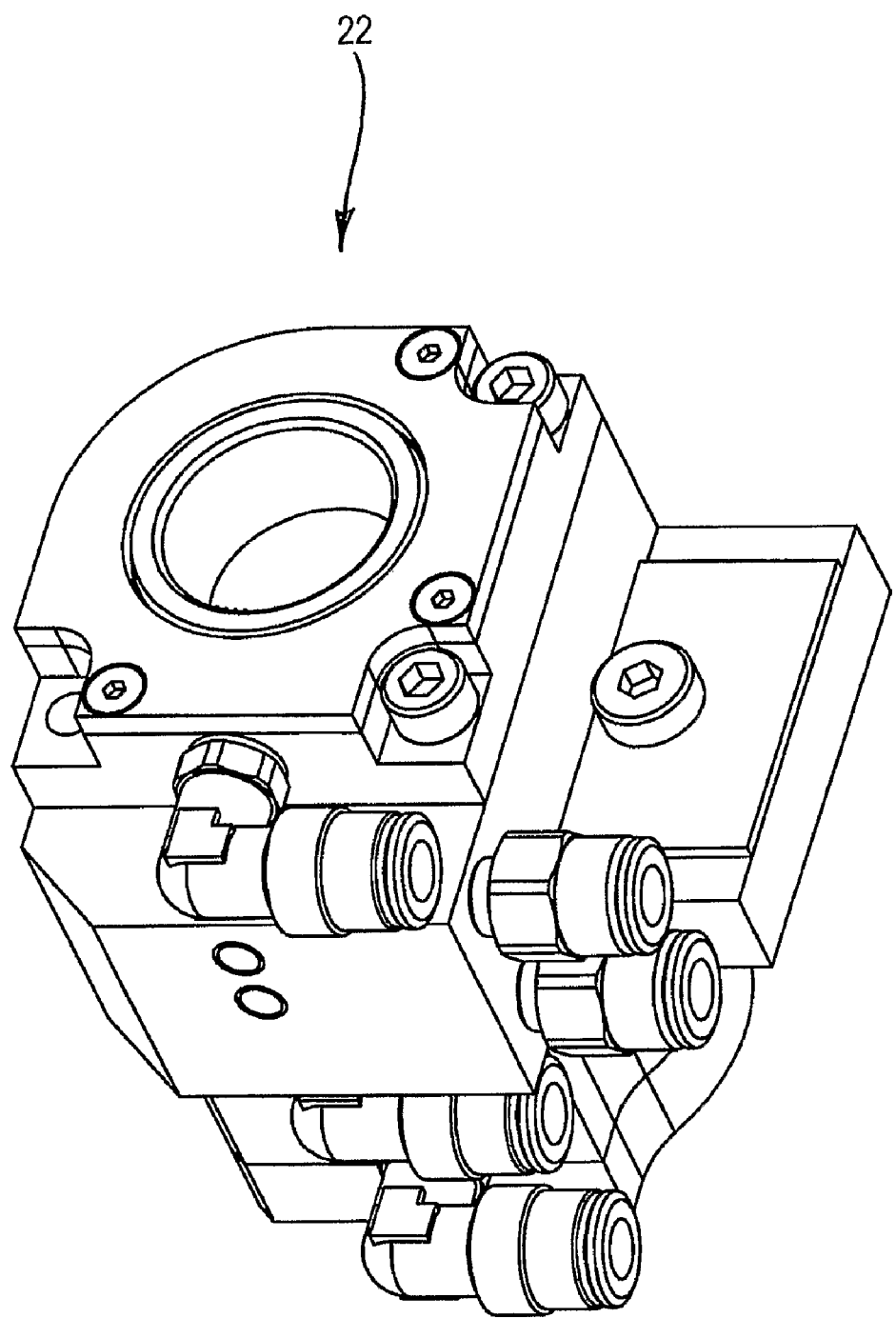
FIG. 25 is a perspective view of a containing portion of a handling element.
Figure 26:
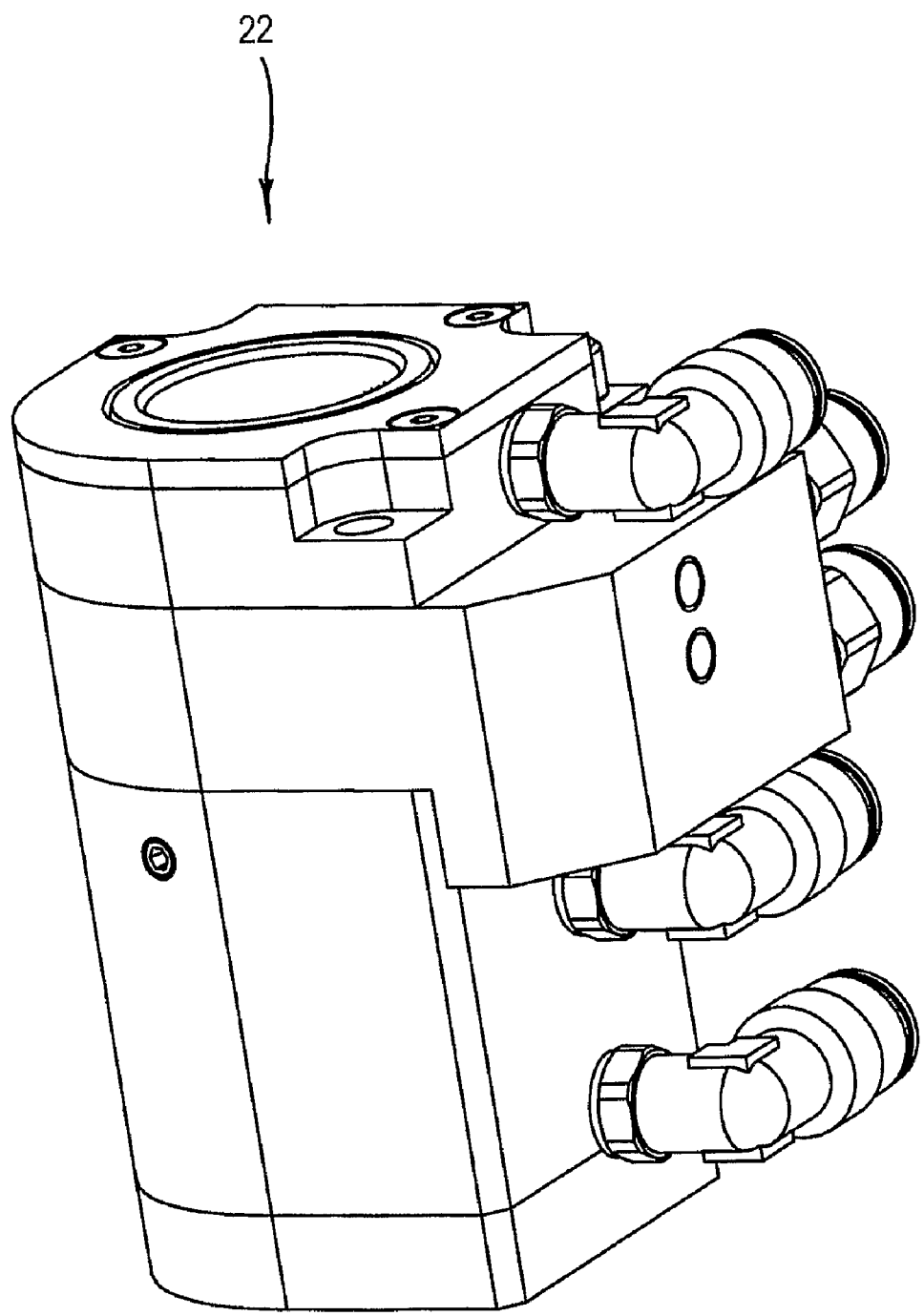
FIG. 26 is a further perspective view of the containing portion in FIG. 25.
Figure 27:
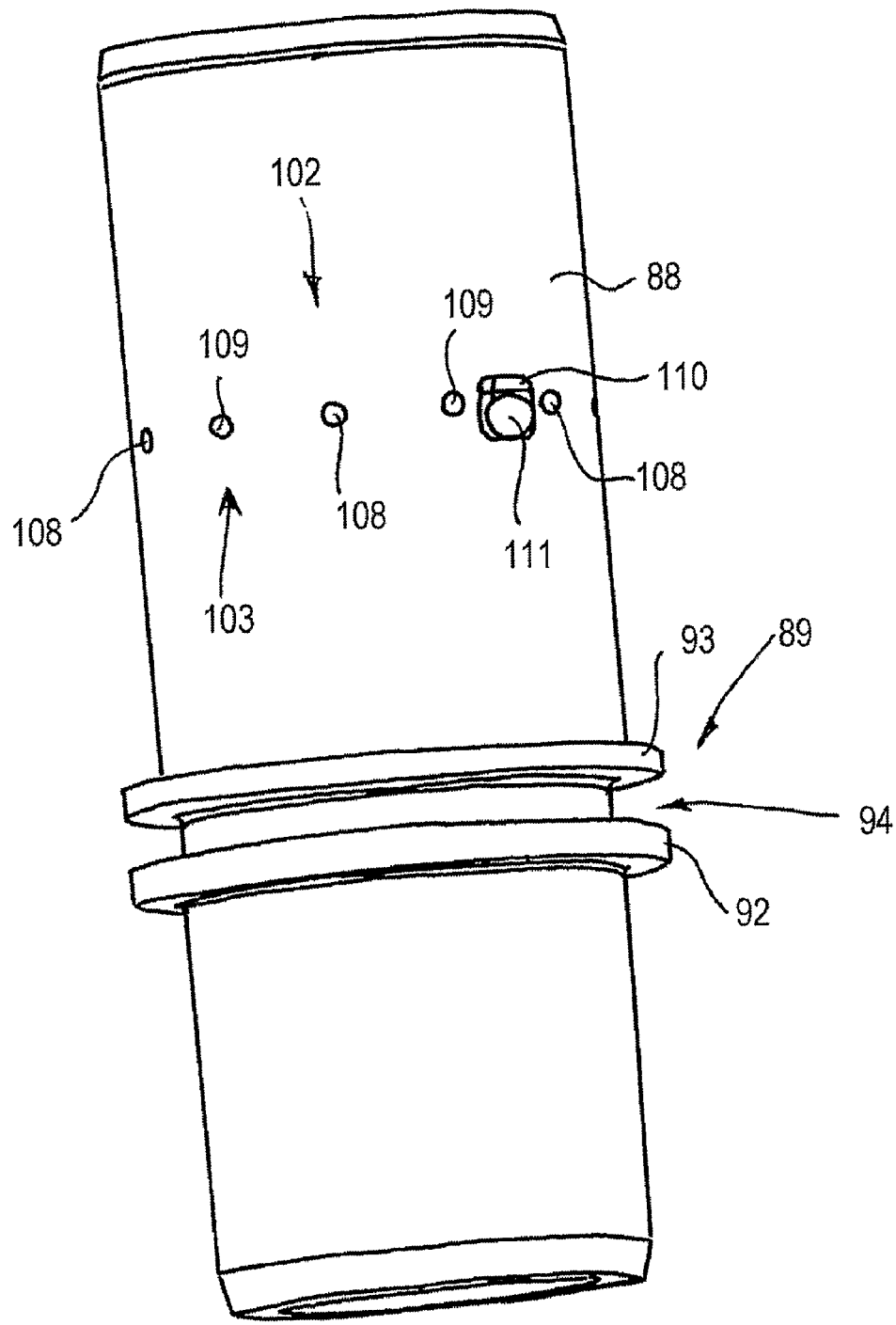
FIG. 27 is a schematic perspective view of a guiding element with which the containing portion in FIG. 25 is provided.

The guiding element 87 is moving between a retracted position M, shown in FIGS. 21 and 22, in which the sleeve 88 is contained inside the containing portion 22, and an extended position N, shown in FIGS. 23 and 24, in which the sleeve 88 is protruding through the exit opening 28, possibly beyond the first closing element 29 and the second closing element 30, for delivering the dose 80 to the moulding cavity 5.

The guiding element 87 adopts the retracted position M when the first closing element 29 and the second closing element 30 are in the closed configuration Y. The guiding element 87 adopts the extended position N when the first closing element 29 and the second closing element 30 are in the open configuration X. The sleeve 88, by passing from the retracted position M to the extended position N, travels along a distance that can be equal to, or greater than, a thickness H of the first closing element 29 and the second closing element 30, said thickness being measured parallel to the further axis B.

The guiding element 87 comprises an annular projecting ridge 89 leading away from the sleeve 88 for being received into a housing 91 obtained in the containing portion 22.

The annular projecting ridge 89 identifies inside the housing 91 a first chamber 96 and a second chamber 97.

The first chamber 96 is supplied with an operating fluid, for example compressed air, through a duct 98.

The second chamber 97 is supplied with an operating fluid, for example compressed air, through a further duct 99.

During operation, when the guiding element 87 lies in the retracted position M, the second chamber 97 is supplied with the operating fluid.

The annular projecting ridge 89 moves until the first rib 92 abuts against a reference surface 100 of the housing 91.

Thus the guiding element 87 passes from the retracted position M to the extended position N.

Subsequently, the first chamber 96 is supplied with the operating fluid.

The annular projecting ridge 89 moves until the second rib 93 abuts against a further reference surface 101 of the housing 91.

The operating fluid existing inside the second chamber 97 is discharged through the further duct 99.

Thus, the guiding element 87 returns from the extended position N to the retracted position M.

Referring to FIGS. 25 to 31, a containing portion 22 is shown of a handling element 20, said containing portion 22 being provided with a sleeve 88 comprising a side wall 116 wherein a conduit arrangement 102 is obtained arranged for conveying a cooling fluid.

A seat element 110, housing a sphere 111, is obtained in the sleeve 88.

A portion of the sphere 111 protrudes from the seat element 110 and is received into a groove obtained in the containing portion 22.

The sphere 111, thereby, enables the guiding element 87 to move between the retracted position M and the extended position N, but prevents the sleeve 88 from rotating around a longitudinal axis E of the said sleeve 88.

Below, two particular embodiments of the conduit arrangement 102 will be disclosed by way of example, although other embodiments can be provided alternatively.

Below, two particular embodiments of the conduit arrangement 102 will be disclosed by way of example, although other embodiments can be provided alternatively.

Figure 28:
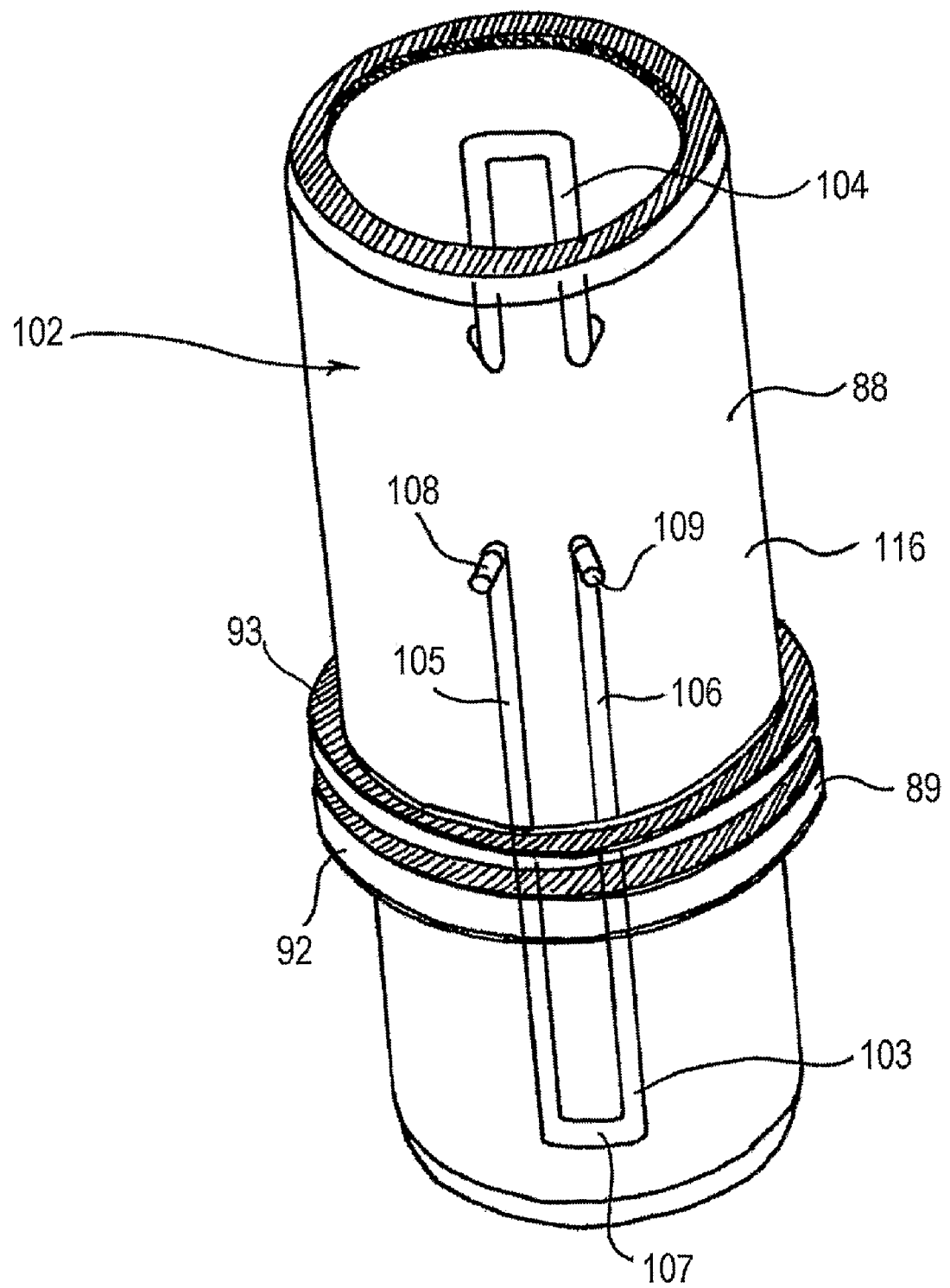
FIG. 28 is a further schematic perspective view of the guiding element in FIG. 27, showing, in transparency, an embodiment of a conduit arrangement arranged for receiving a cooling fluid.

The conduit arrangement 102 further comprises a plurality of upper conduits 104, only one of which is shown in FIG. 28, circumferentially arranged next to one another.

Below, one of the lower conduits 103 will be disclosed in detail.

What has been affirmed with reference to said lower conduit 103 is to be understood to be also applicable to the other conduits 103 and the upper conduits 104.

The lower conduit 104 comprises a first pipe 105 and a second pipe 106, substantially rectilinear, extending substantially parallel to the longitudinal axis E. The first pipe 105 and the second pipe 106 are connected by a third pipe 107 having a curvilinear profile and extending substantially circumferentially with respect to the sleeve 88.

The lower conduit 104 further comprises a first tubular element 108, connected to the first pipe 105, through which first tubular element 108 the cooling fluid is introduced into the lower conduit 104, and a second tubular element 109, connected to the second pipe 106, through which second tubular element 109 the cooling fluid is removed from the lower conduit 104.

The first tubular element 108 and the second tubular element 109 are arranged substantially radially with respect to the sleeve 88.

Figure 30:
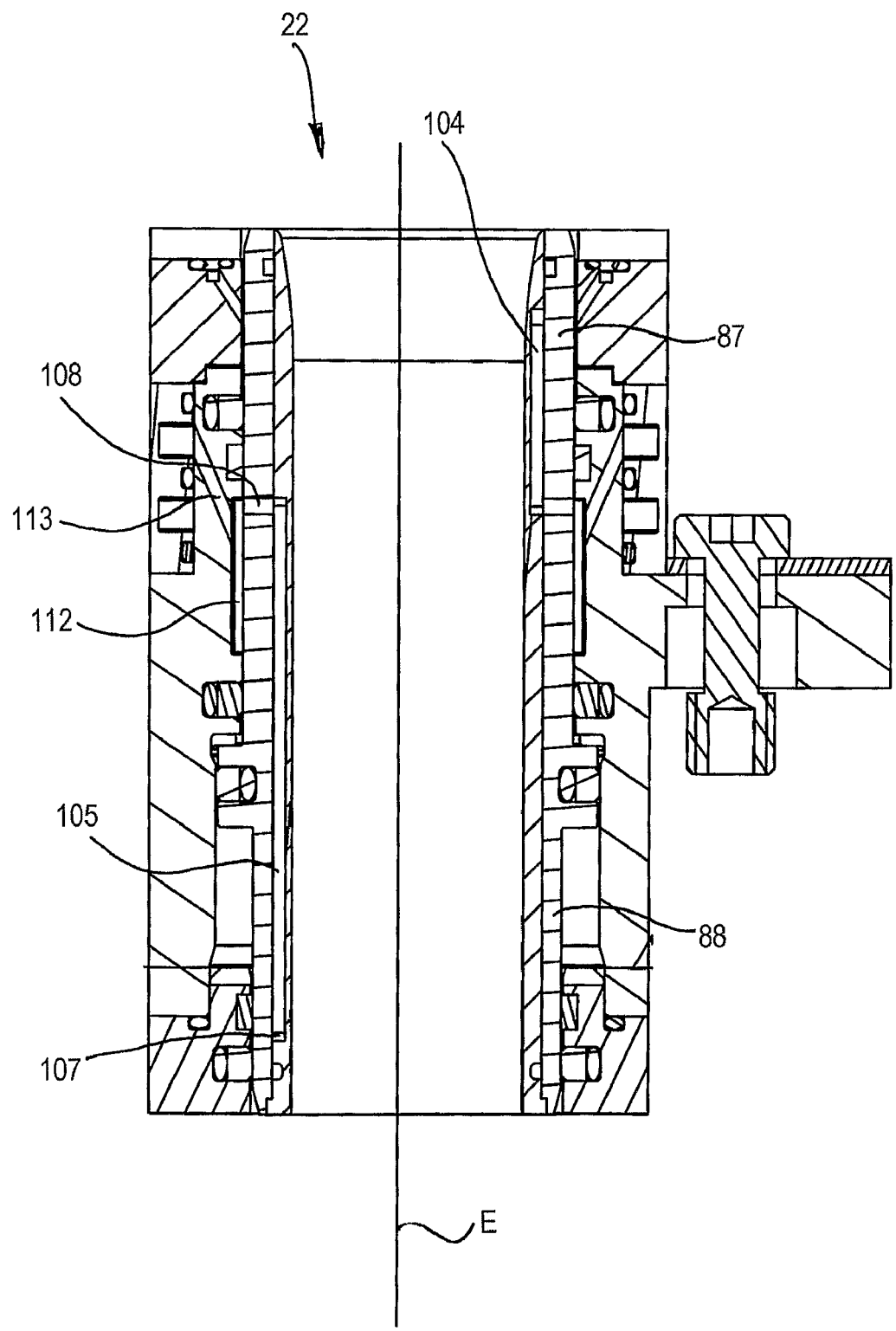
FIG. 30 is a further section taken along a longitudinal plane of the containing portion in FIG. 25.

As shown in FIG. 30, the first tubular element 108 faces a first chamber 112 obtained in the containing portion 22.

The first chamber 112 is supplied with the cooling fluid through a supply conduit 113 and, in turn, supplies the first tubular element 108.

The first chamber 112 has an extension, measured parallel to the longitudinal axis E, that is equal to, or greater than, the stroke that the guiding element 87 performs when moving from the retracted position M to the extended position N. Consequently, the first tubular element 108 faces the first chamber 112 both when the guiding element 87 is in the retracted position M and when the guiding element is in the extended position N.

Further, the first tubular element 108 is held constantly in connection with the first chamber 112 while the guiding element 87 moves from the retracted position M to the extended position N, and vice versa.

Figure 29:
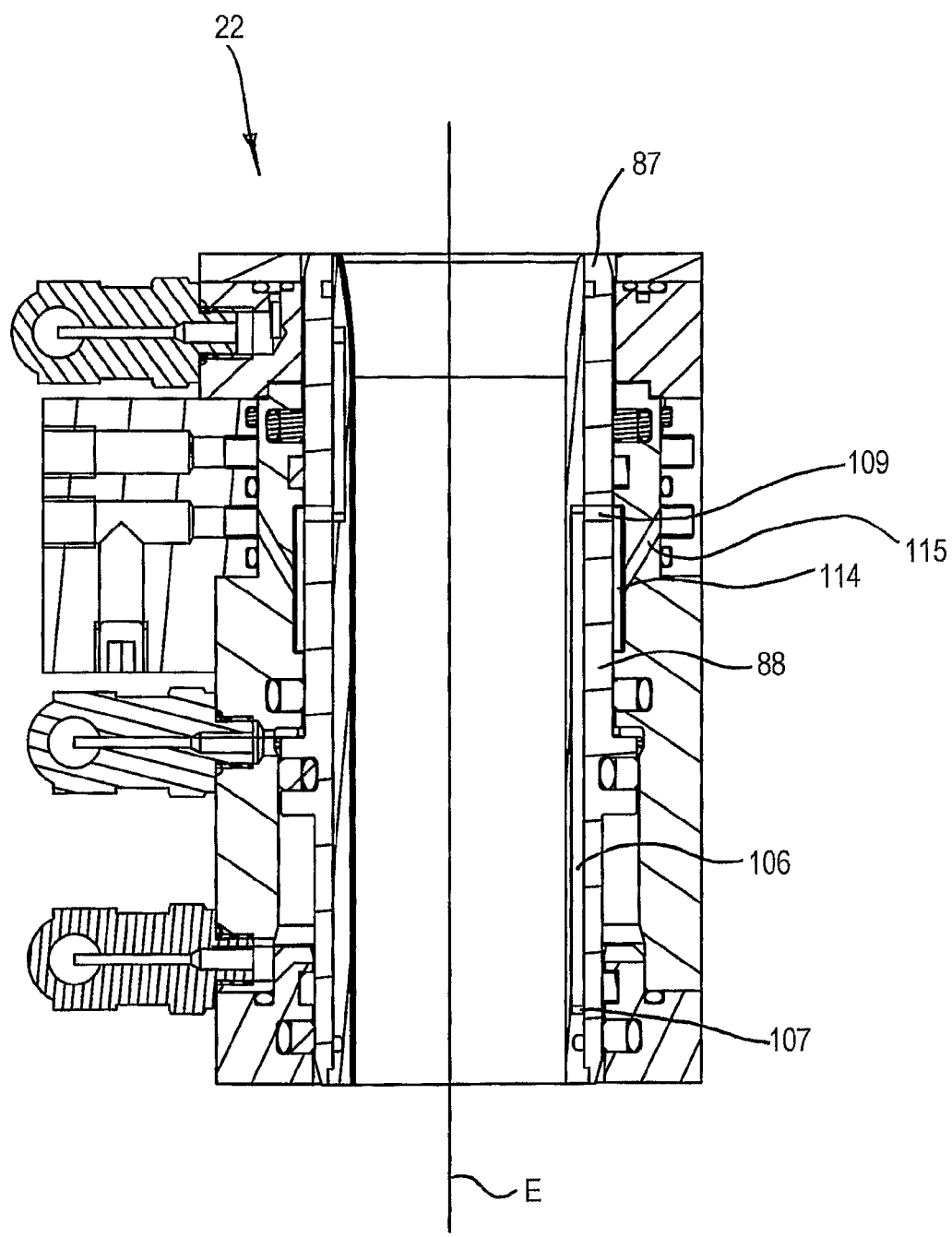
FIG. 29 is a section taken along a longitudinal plane of the containing portion in FIG. 25.

As shown in FIG. 29, the second tubular element 109 opens into a second chamber 114 obtained in the containing portion 22.

The second chamber 114 receives the cooling fluid from the second tubular element 109. The cooling fluid is discharged from the second chamber 114 through a discharging conduit 115.

The second chamber 114 has an extent, measured parallel to the longitudinal axis E, that is equal to, or greater than, the stroke that the guiding element 87 covers when moving from the retracted position M to the extended position N. Consequently, the second tubular element 109 opens into the second chamber 114 both when the guiding element 87 is in the retracted position M and when the guiding element 87 is in the extended position N.

Further, the second tubular element 109 is held constantly in connection with the second chamber 114, while the guiding element 87 moves from the retracted position M to the extended position N, and vice versa.

This enables the guiding element to be efficiently cooled at any moment of the operating cycle.

Figure 31:
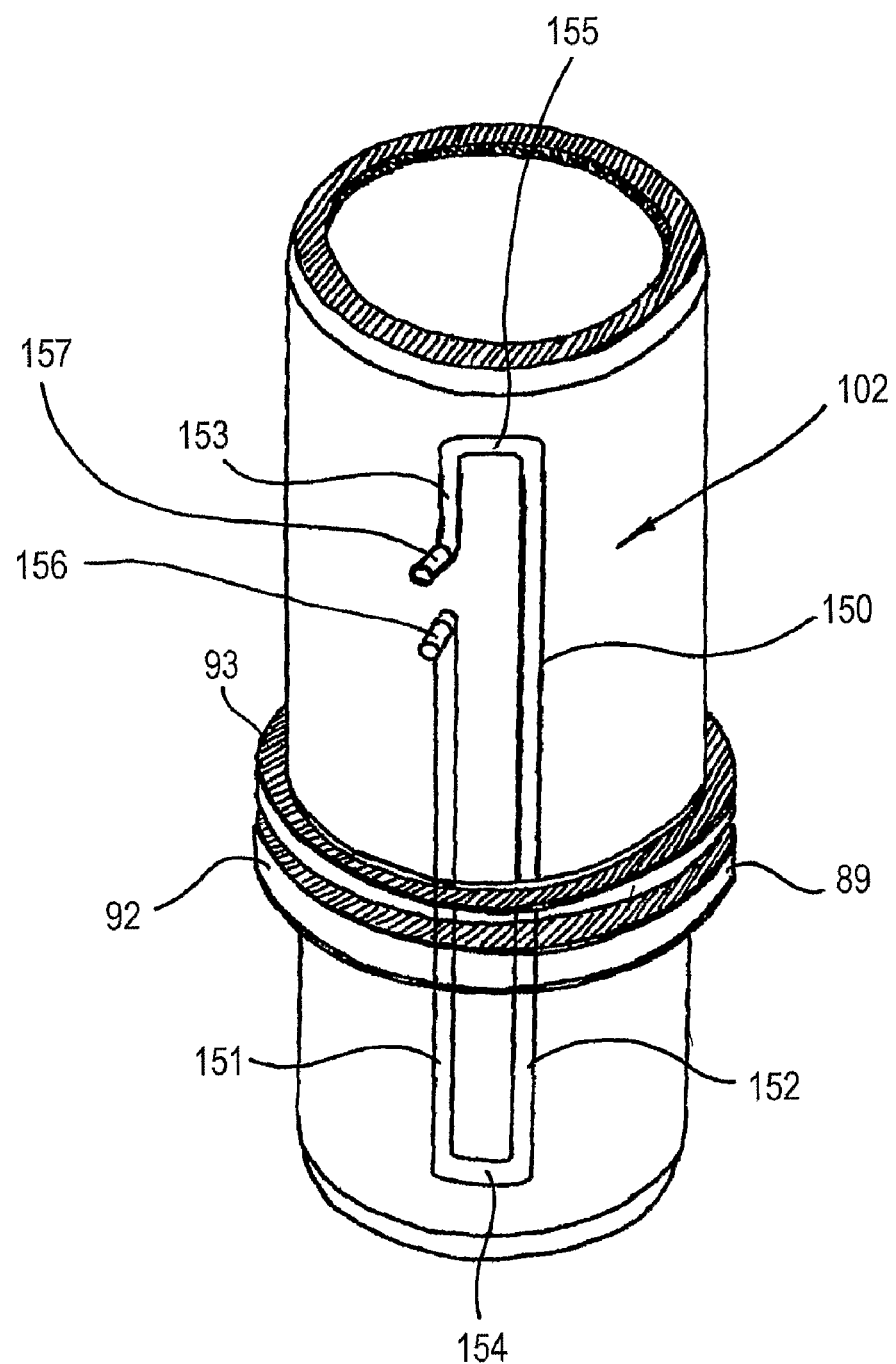
FIG. 31 is a view like the one in FIG. 28, showing, in transparency, a further embodiment of the conduit arrangement.
Figure 32:
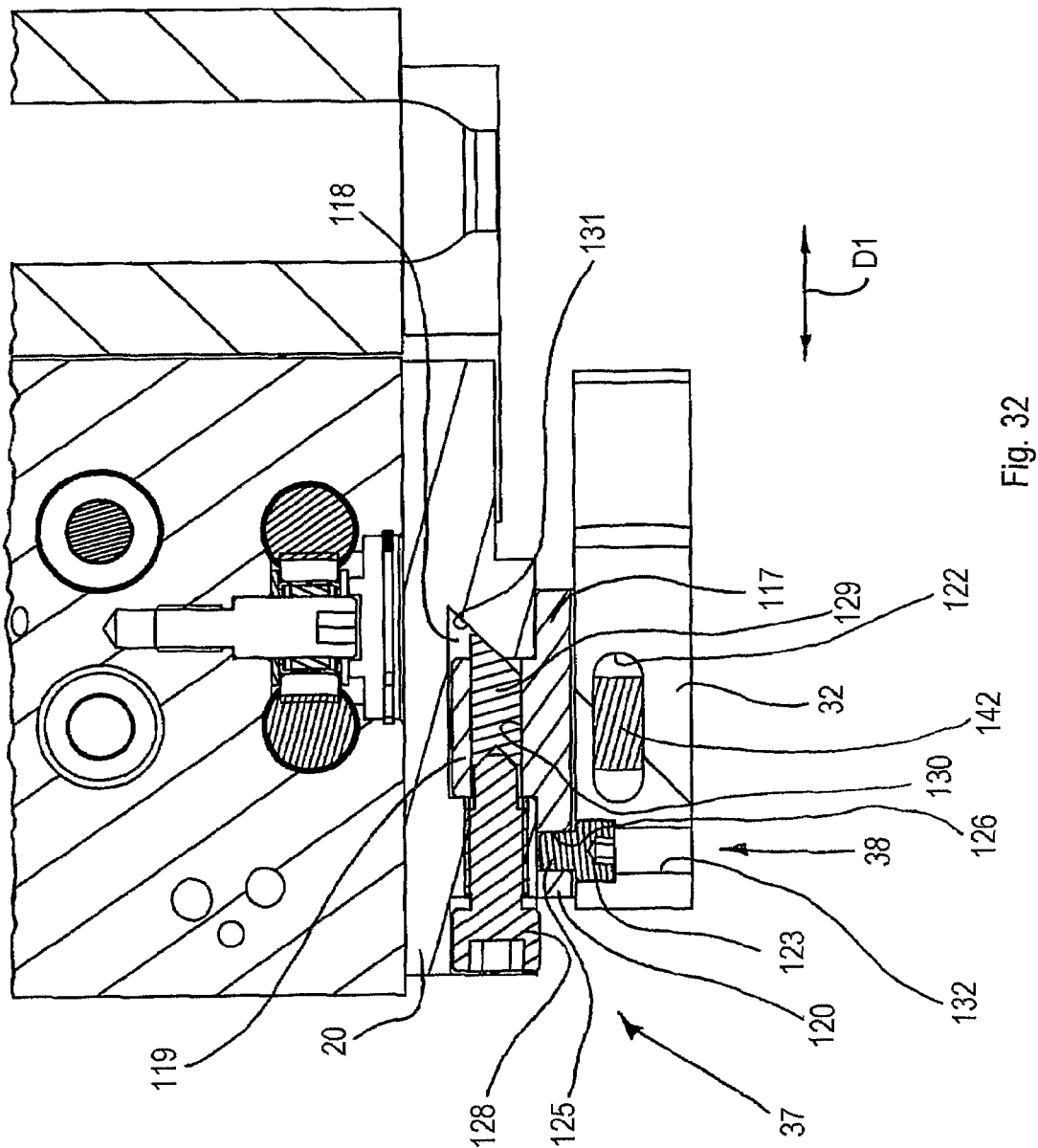
FIG. 32 is a detail in FIG. 10.

Referring to FIG. 31, the conduit arrangement 102 comprises a plurality of conduits 150, only one of which is shown in FIG. 31, arranged circumferentially next to each other.

Below, one of the conduits 150 will be disclosed in detail.

What has been affirmed with reference to said conduit 150 is to be understood to be also suitable for being applied to the other conduits 150.

The conduit 150 comprises a first portion of pipe 151, a second portion of pipe 152 and a third portion of pipe 153, substantially rectilinear, extending substantially parallel to the longitudinal axis E.

The first portion of pipe 151 and the third portion of pipe 153 are substantially mutually aligned.

The first portion of pipe 151 and the second portion of pipe 152 are connected by a fourth portion of pipe 154 having a curvilinear profile and extending substantially circumferentially with respect to the sleeve 88.

The second portion of pipe 152 and the third portion of pipe 153 are connected by a fifth portion of pipe 155 having a curvilinear profile and extending substantially circumferentially with respect to the sleeve 88.

The conduit 150 further comprises a further first tubular element 156, connected to the first portion of pipe 151, through which further first tubular element 156 the cooling fluid is introduced into the conduit 150, and a further second tubular element 157, connected to the third portion of pipe 153, through which further second tubular element 157 the cooling fluid is removed from the conduit 150.

The further first tubular element 156 and the further second tubular element 157 are arranged substantially radially with respect to the sleeve 88.

The further first tubular element 156 faces a further first chamber, which is not shown, obtained in the containing portion 22.

The further first chamber is supplied with the cooling fluid and, in turn, supplies the further first tubular element 156.

The further first chamber has an extent, measured parallel to the longitudinal axis E, that is equal to, or greater than, the stroke that the guiding element 87 performs when moving from the retracted position M to the extended position N. Consequently, the further first tubular element 156 faces the further first chamber both when the guiding element 87 is in the retracted position M and when the guiding element 87 is in the extended position N.

Further, the further first tubular element 156 is maintained constantly in connection with the further first chamber while the guiding element 87 moves from the retracted position M to the extended position N, and vice versa.

The further second tubular element 157 faces a further second chamber, which is not shown, obtained in the containing portion 22.

The further second chamber receives the cooling fluid from the further second tubular element 157 and discharges said cooling fluid.

The further second chamber has an extent, measured parallel to the longitudinal axis E, that is equal to, or greater than, the stroke that the guiding element 87 performs when moving from the retracted position M to the extended position N.

Consequently the further second tubular element 157 faces the further second chamber both when the guiding element 87 is in the retracted position M and when the guiding element 87 is in the extended position N.

Further, the further second tubular element 157 is maintained constantly in connection with the further second chamber, while the guiding element 87 moves from the retracted position M to the extended position N, and vice versa.

This enables the guiding element to be efficiently cooled at any time of the operating cycle.

With reference to FIGS. 57 to 81, there is shown a forming device 1 for compression-moulding doses of plastics comprising a carousel 2 rotatable around a rotation axis A, in a direction R1, and supporting a plurality of forming moulds 3. The forming moulds 3 are positioned in a peripheral zone of the carousel 2 and are so arranged as to be substantially angularly equidistant.

Each forming mould 3 comprises a moulding cavity 5 and a punch 305 that are reciprocally movable. The forming mould 3 may assume an open configuration Z1, shown in FIGS. 76 to 78, in which the moulding cavity 5 and the punch are mutually spaced apart from one another in such a way that a dose 80 of plastics is inserted into the moulding cavity 5 and a formed object, for example a container preform 300, is removed from the forming mould 3, and a closed configuration Z2, shown in FIGS. 72 and 73, in which the punch 305 penetrates inside the moulding cavity 5 to shape the dose 80.

In an embodiment which is not shown, the forming device 1 comprises, instead of the carousel 2, a movement and supporting element for moving and supporting the forming moulds 3 provided with a flexible element, for example a belt or chain element, travelling along a closed loop path.

Cutting devices are further provided, which are not shown, that cut the plastics exiting a distributing nozzle of an extruder in order to give rise to the doses 80. The cutting devices may comprise one or more cutting elements, and one or more contrasting elements acting as abutting elements for the plastics and preventing a cutting element, after a dose was separated from the plastics exiting the distributing nozzle, from moving the same dose away from a delivery zone.

A conveying device 6 is further provided that receives the doses 80, separated by said cutting devices from the distributing nozzle, and delivers the doses 80 to the forming device 1.

In an embodiment that is not shown, instead of the forming device 1, a rotating operating device is provided, on the periphery of which a plurality of seats are provided.

In this case, the conveying device 6 can deliver objects to said seats, or can remove objects from said seats.

Similarly to what has been disclosed with reference to FIG. 20, the conveying device 6 is arranged for delivering doses of plastics 80 to the compression-moulding device and for removing objects, in particular the container preforms 300, from the compression-moulding device 1.

The conveying device 6 comprises a first rotating body 301 that supports a plurality of conveying elements 8 arranged for delivering the doses 80 to the compression-moulding device 1 and a second rotating body 302 that supports a plurality of removing elements 303 arranged for removing the container preforms 300 from the compression-moulding device 1. The conveying elements 8 are positioned in a peripheral zone of the first rotating body 301 and are so arranged as to be substantially angularly equidistant. The removing elements 303 are positioned in a peripheral zone of the second rotating body 302 and are so arranged as to be substantially angularly equidistant. The removing elements 303 receive the container preforms 300 from glue forming arrangement 304 with which the forming moulds 3 of the compression-moulding device 1 are provided. The glue forming arrangement 304 comprises a pair of half moulds that are mutually movable towards and away from one another. The glue forming arrangement 304 forms a glue zone of the container preforms 300, for example provided with a threaded portion, and retains the container preforms 300 after forming.

The first rotating body 301 and the second rotating body 302 are mutually operationally associated in such a way that, during operation of the conveying device 6, the first rotating body 301 and the second rotating body 302 rotate together, at the same rotation speed, around the same rotation axis B, in a rotation direction R2. The first rotating body 301 is arranged, along the rotation axis B, at a height that is less than the second rotating body 302.

The first rotating body 301 and the second rotating body 302 are so shaped as to be able to be rotated independently of one another during adjustment and/or maintenance operations on the conveying device 6.

The first rotating body 301 and the second rotating body 302 are positioned in such a way that a removing element 303 corresponds to each conveying element 8. During operation, whilst the conveying element 8 delivers a dose 80 to a moulding cavity 5 of a forming mould 3, the corresponding removing element 303 removes a container preform 300 from the glue forming arrangement 304 of the aforesaid forming mould 3.

In an embodiment which is not shown, the conveying device 6 comprises, instead of the first rotating body 301 and of the second rotating body 302, movement and supporting elements of the conveying elements 8 and of the removing elements 303 provided with flexible elements, for example belt or chain elements, which are movable along a closed loop path.

Each conveying element 8 comprises a pair of guiding rods 10 received in holes of the first rotating body 301.

The holes may house spherical circulating bushes.

Each conveying element 8 is fixed to a linear actuator 371 for example a pneumatic actuator, that moves the rotating element towards and away from the rotation axis B. In particular, the linear actuator 371 maintains the conveying element 8 in a maximum extent configuration E, shown in FIG. 64, in which the guiding rods 10 extend by a maximum amount outside the holes.

The maximum extent configuration E is determined by end stroke elements associated with the guiding rods 10.

The conveying element 8 comprises a supporting body 15, to which the guiding rods 10 are fixed, which is radially movable with respect to the first rotating body 301, towards and away from the rotation axis B.

The conveying element 8 further comprises a further supporting body 16 rotatably supported on the supporting body 15.

The supporting body 15 is covered by a hole 17 inside which a shank 18 of the further supporting body 15 is received. Between the hole 17 and the shank 18 bearings 19 are interposed that enable the further supporting body 16 to oscillate with respect to the supporting body 15.

The further supporting body 16 comprises a handling element 20 provided with a receiving portion 321, arranged for receiving a dose 80 that the aforesaid cutting devices have separated from the dispensing nozzle, of a containing portion 322, arranged for containing the dose 80 and for giving the dose 80 a desired shape, and with a joining portion 323, interposed between the receiving portion 321 and the containing portion 322 and arranged for promoting the transferring of the dose 80 from the receiving portion 321 to the containing portion 322.

The joining portion 323 and the containing portion 322 cooperate to define a tubular body 308, the receiving portion 321 being hinged on the further body 16 in such a way as to be movable with respect to the tubular body 308.

The receiving portion 321 comprises a base 306 from which a wall 307 leads away—which is "C"-shaped or "U"-shaped—that bounds a gap 24 that is open in the rotation direction R2 and is generally shaped like a reversed truncated cone, i.e. having a decreasing section approaching the containing joining portion 323. The containing portion 322 is internally provided with a recess 25 with a substantially cylindrical shape.

The joining portion 323 is internally provided with a further recess 26 shaped like a reversed truncated cone, i.e. having a decreasing section approaching the containing portion 322. In other words, the joining portion 323 is funnel-shaped to facilitate the insertion of the dose 80 in the containing portion 322.

The joining portion 323 is provided with an inlet opening 27 through which the dose 80, removed by the extruder (or from the aforesaid cutting devices that cut the plastics that exit a dispensing nozzle of the extruder to give rise to the doses 80) from the receiving portion 321, penetrates inside the joining portion 323.

The containing portion 322 is provided with an exit opening 28 through which the dose 80 is delivered to a moulding cavity 5.

A thermoregulating arrangement is provided arranged for regulating the temperature of the handling element 20, in order to prevent the plastics from involuntarily adhering to the surfaces designed to come into contact with the doses.

The thermoregulating arrangement may comprise a cooling conduit arrangement obtained in the handling element 20 and supplied with a cooling liquid.

Figure 79:
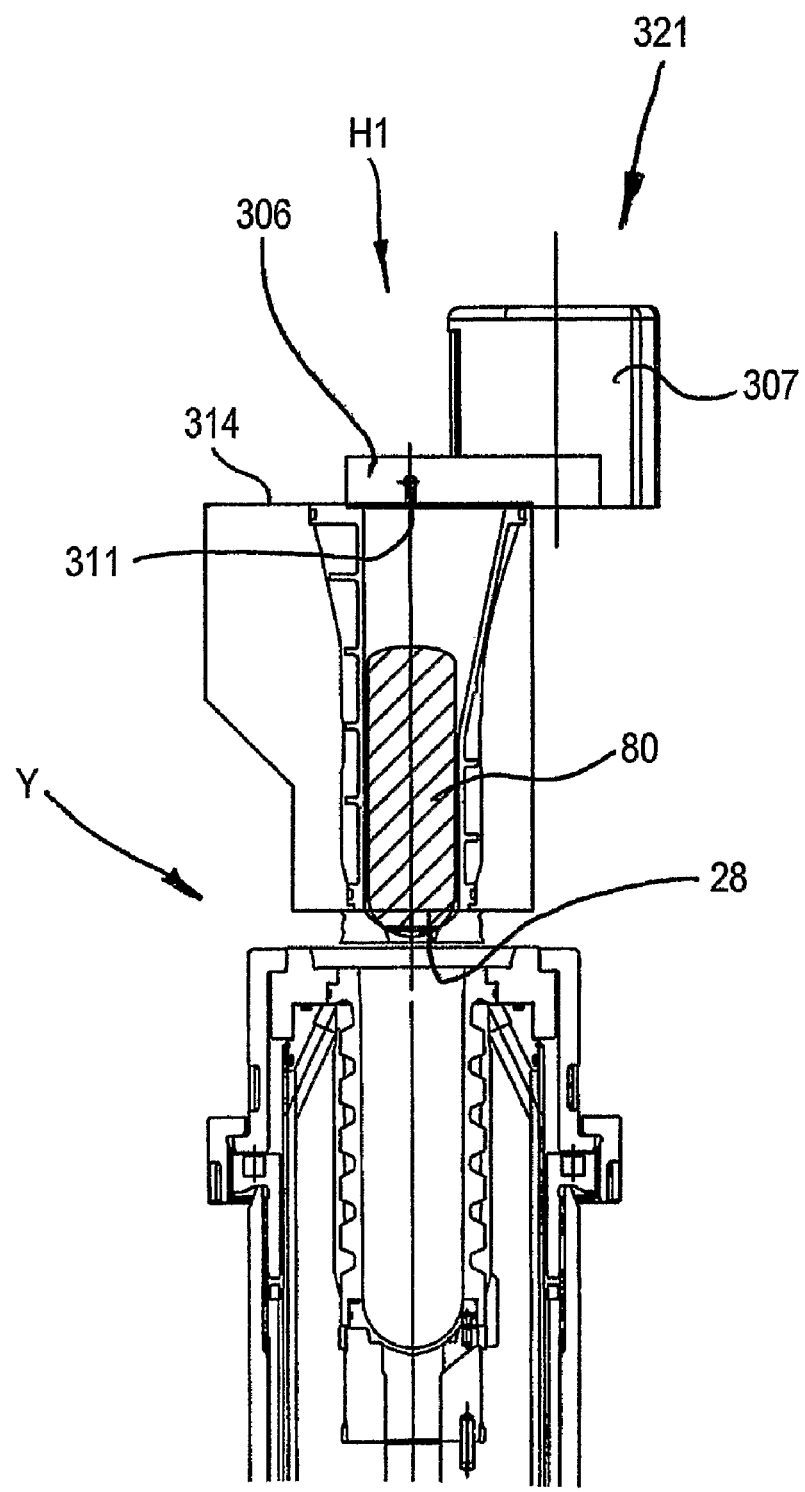
FIG. 79 is a detail in FIG. 76.
Figure 81:
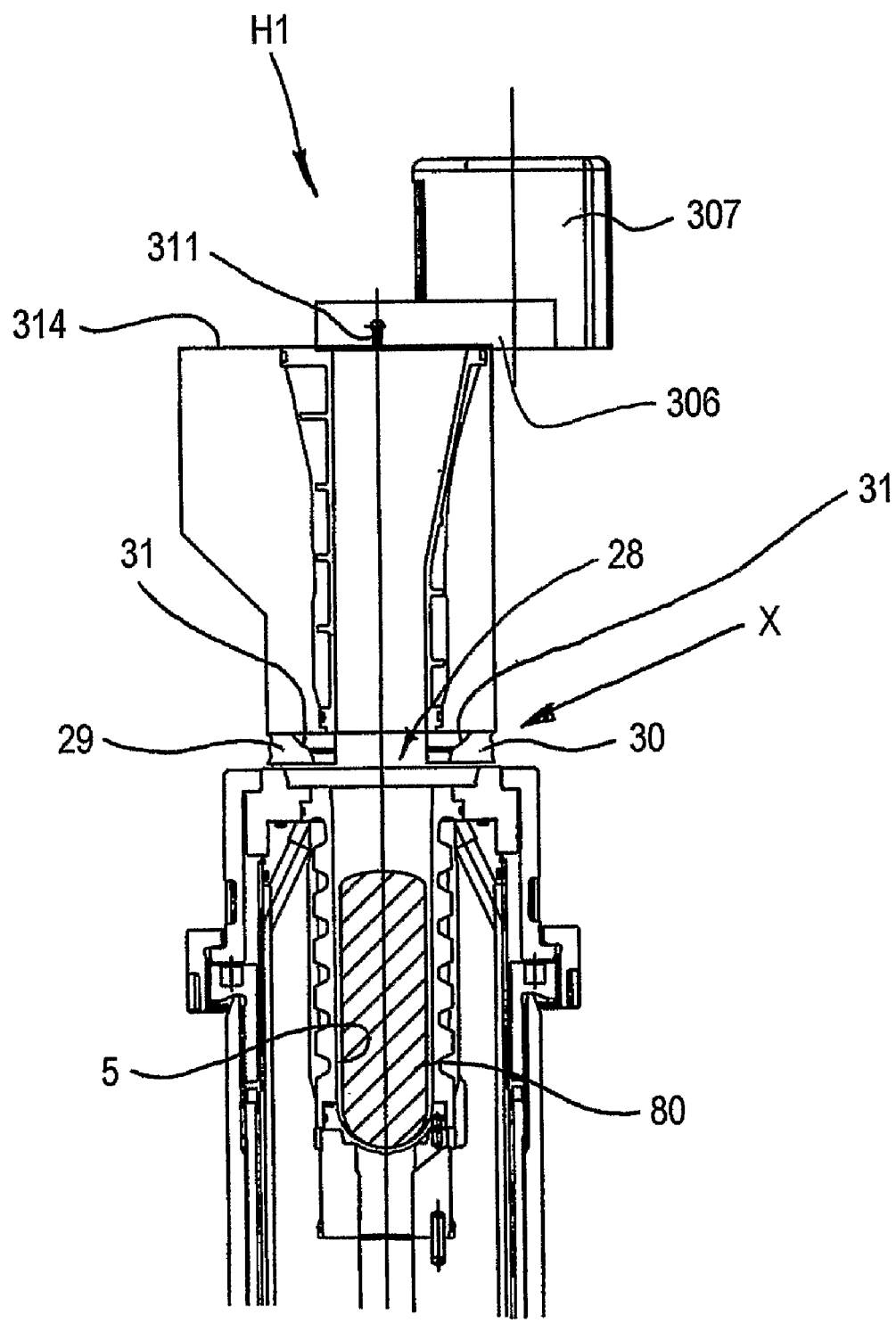
FIG. 81 is a detail in FIG. 78.

A first closing element 29 and a second closing element 30 are further associated with the exit opening 28 and are movable between an open configuration X, shown in FIG. 81, in which the first closing element 29 and the second closing element 30 enable the dose 80 to pass through the exit opening 28, and a closed configuration Y, shown in FIG. 79, in which the first closing element 29 and the second closing element 30 prevent the dose 80 passing through the exit opening 28.

The first closing element 29 and the second closing element 30 comprise a shaped portion 31 arranged for giving the tip of the dose 80 a desired shape.

The first closing element 29 and the second closing element 30 are driven between the open configuration X and the closed configuration Y by a driving device, for example by a driving device 52 of the type disclosed with reference to FIGS. 15 and 16.

Figure 75:
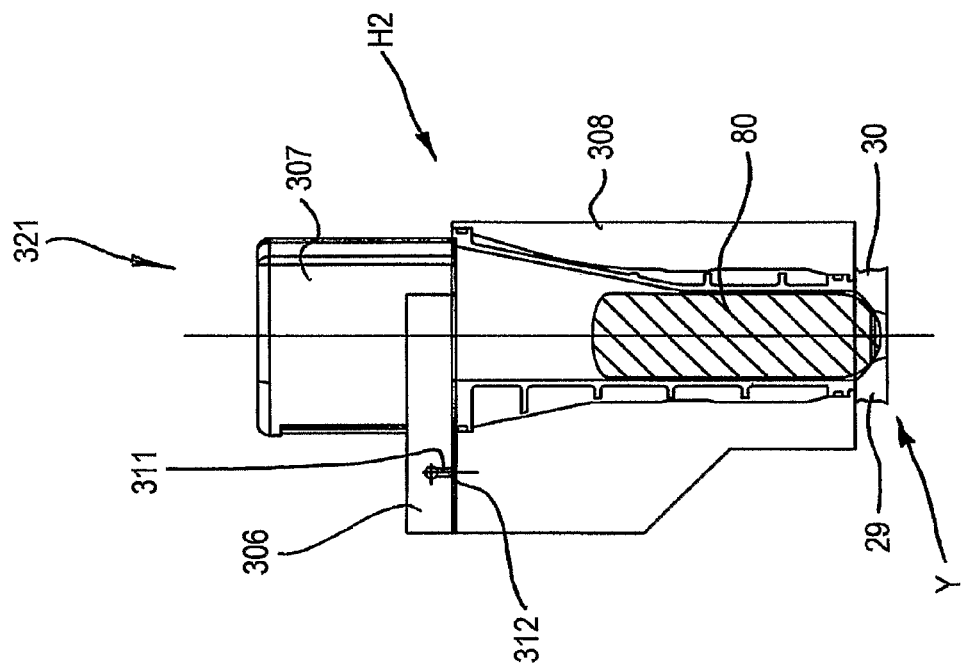
FIG. 75 is a section like the one in FIG. 74 showing the conveying element in another operating configuration.
Figure 74:
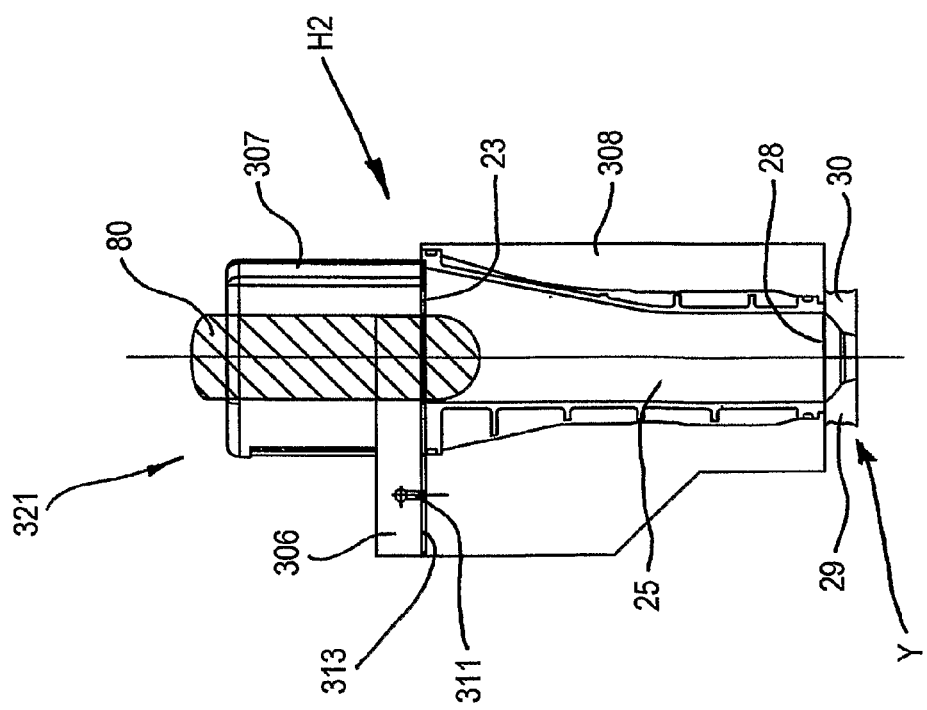
FIG. 74 is a schematic section taken along a longitudinal plane of a conveying element in an operating configuration.

The receiving portion 321 is movable with respect to the tubular body 308 between a closing position H1, shown in FIGS. 76 to 81, in which the base 306 closes the inlet opening 27, and an opening position H2, shown in FIGS. 74 and 75, in which the base 306 is far from the inlet opening 27.

On the receiving portion 321 a revolving element 309 is hinged that cooperates with a cam element 310 fixed to a frame of the conveying device 6.

The cam element 310 is so shaped as to move the receiving portion 321 from the opening position H2 to the closing position H1, for example by overcoming the thrust that tends to maintain the receiving portion 321 in the opening position H2, during rotation of the first rotating body 301, without causing alterations to the position of the supporting body 15 and of the further supporting body 16.

The base 306 is traveled along by a conduit 311 that leads into an opening 312 arranged at a face 313 of the base 306 facing the tubular body 308.

The conduit 311 is arranged for dispensing a fluid, for example compressed air, into the joining portion 323 and the containing portion 322, to promote the ejection of the dose 80 from the containing portion 322.

With reference to FIGS. 74 to 81 successive steps of a work cycle are shown. In a first step of the work cycle, shown in FIG. 74, the receiving portion 321 is in the opening position H2 in which the gap 24 is substantially coaxial with the recess 25.

The receiving portion 321 receives a dose 80 from the extruder.

In a successive step of the work cycle, shown in FIG. 75, the dose 80 descends into the tubular body 308 until coming into contact with the first closing element 29 and with the second closing element 30 that are in the closed configuration Y. The receiving portion 321 is in the opening position H2.

Figure 64:
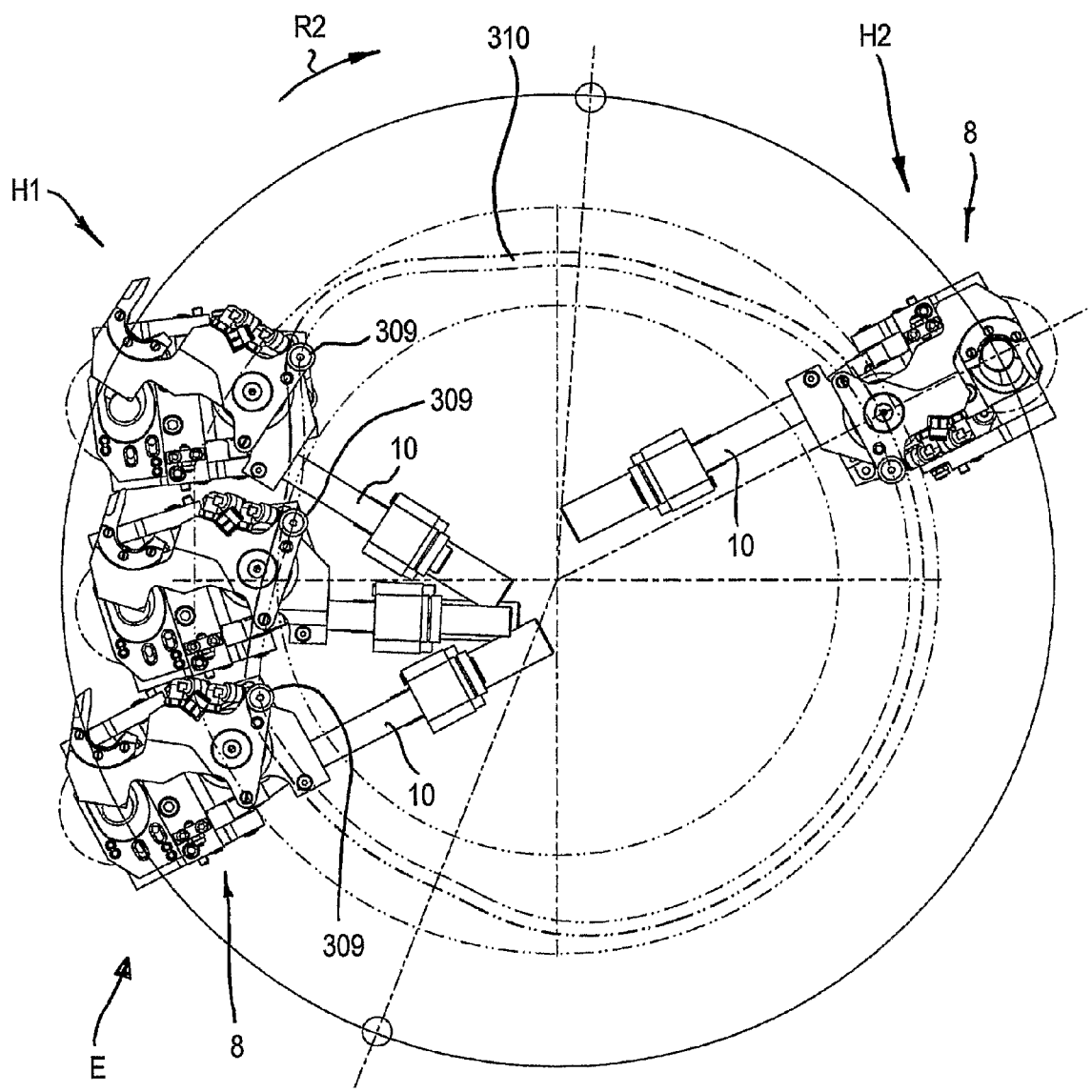
FIG. 64 is a schematic plan view of the lower part of the movement device.
Figure 65:
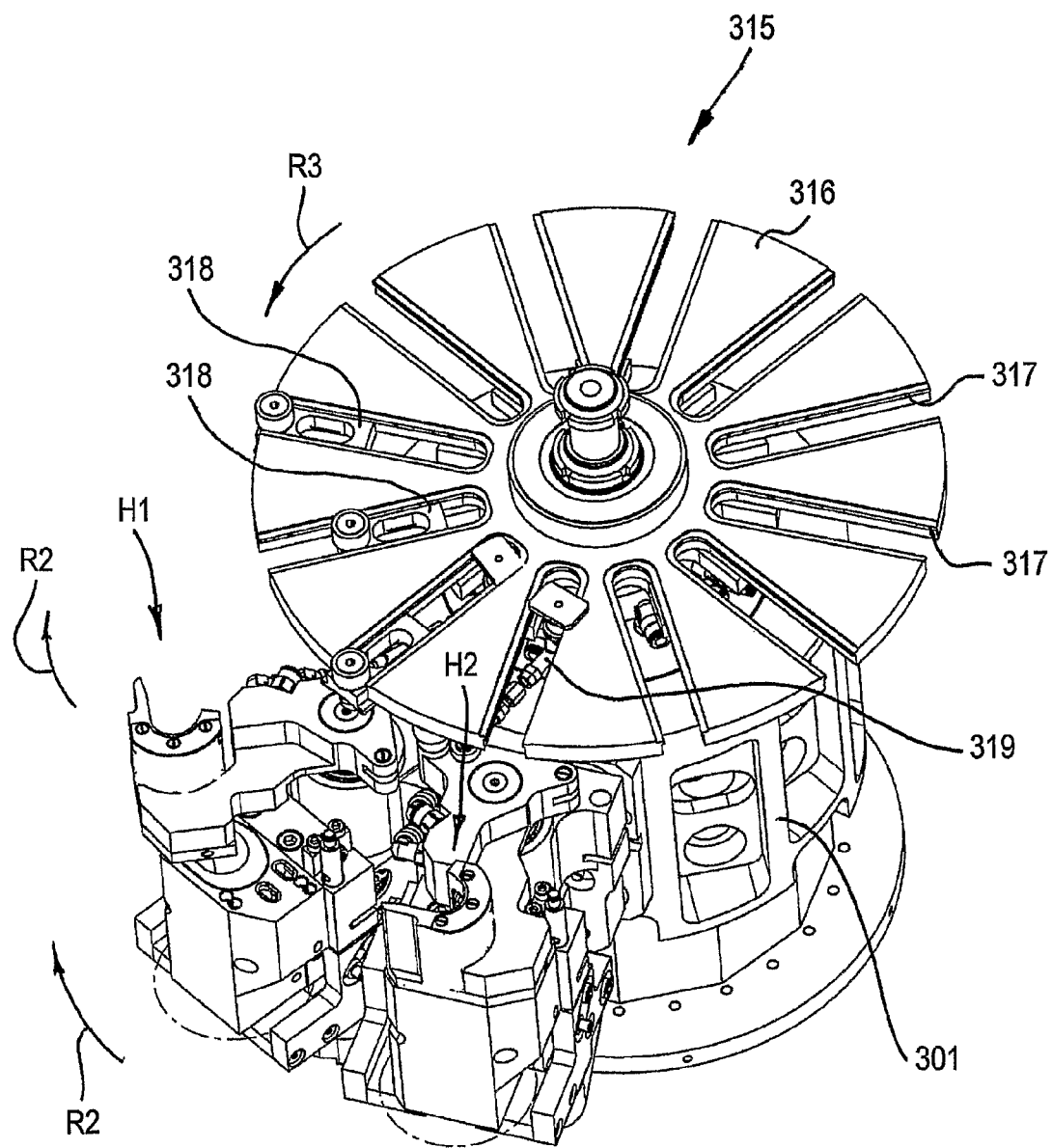
FIG. 65 is a perspective view from above of the lower part of the movement device.
Figure 66:
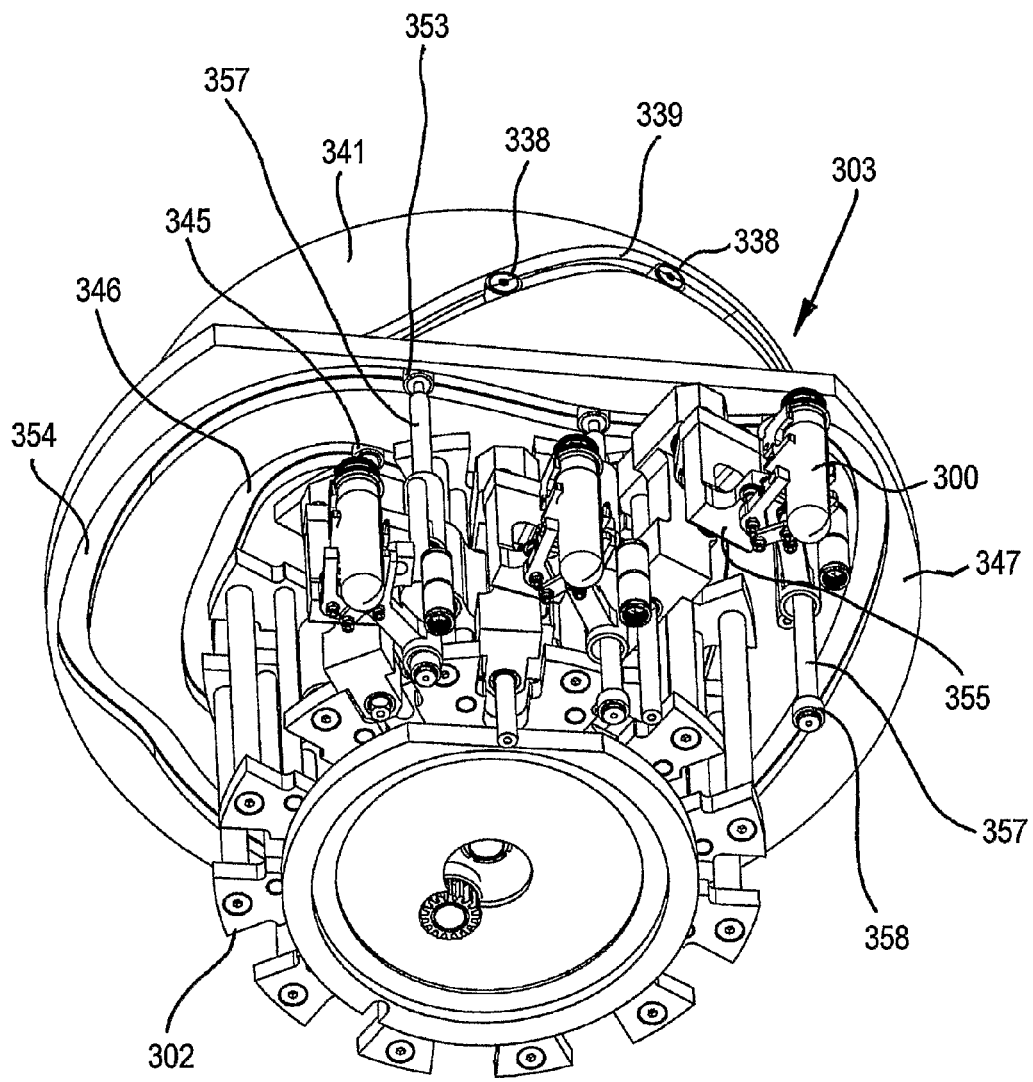
FIG. 66 is a perspective view from below of an upper part of the movement device.
Figure 67:
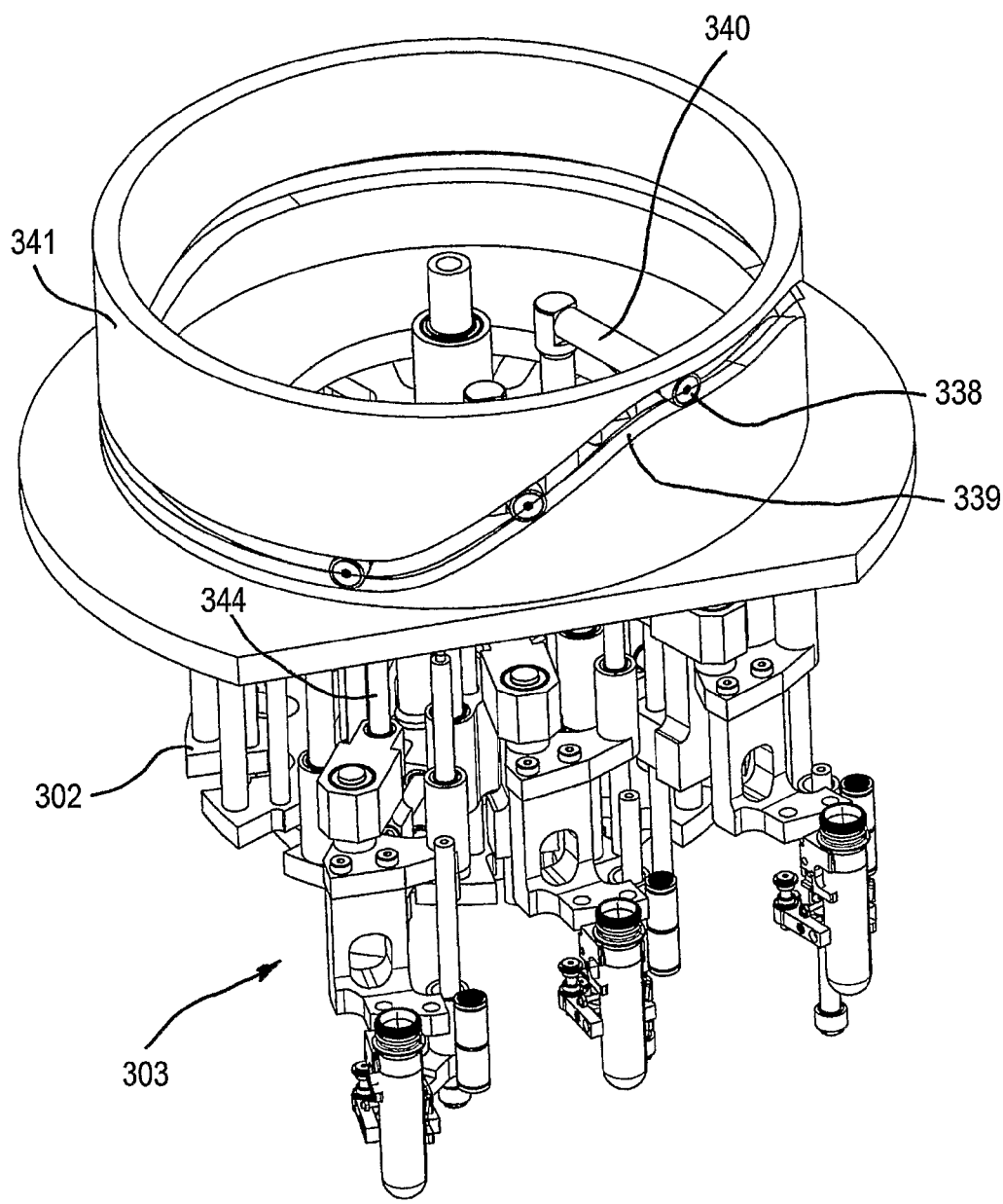
Figure 68:
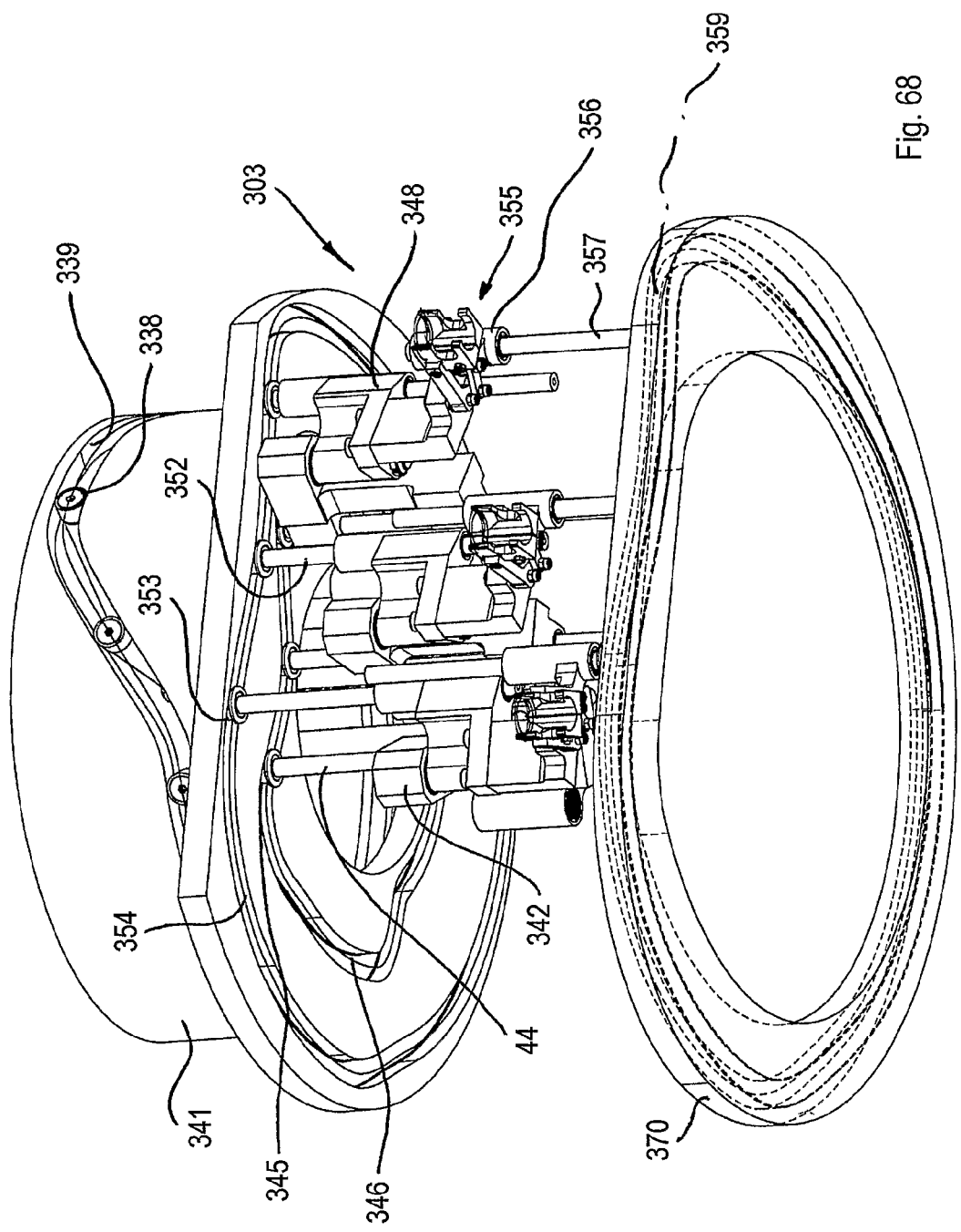
Figure 69:
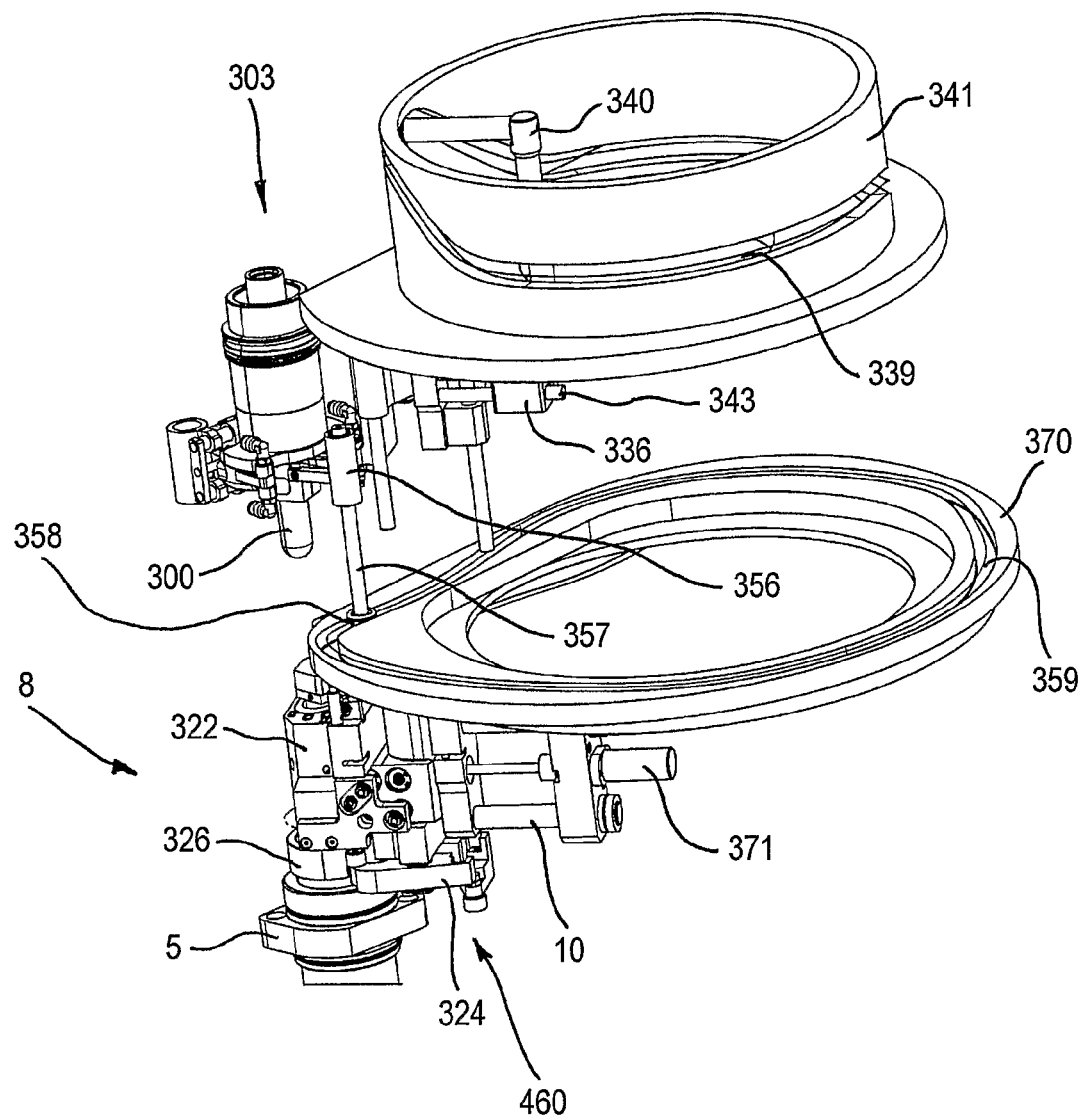
Figure 70:
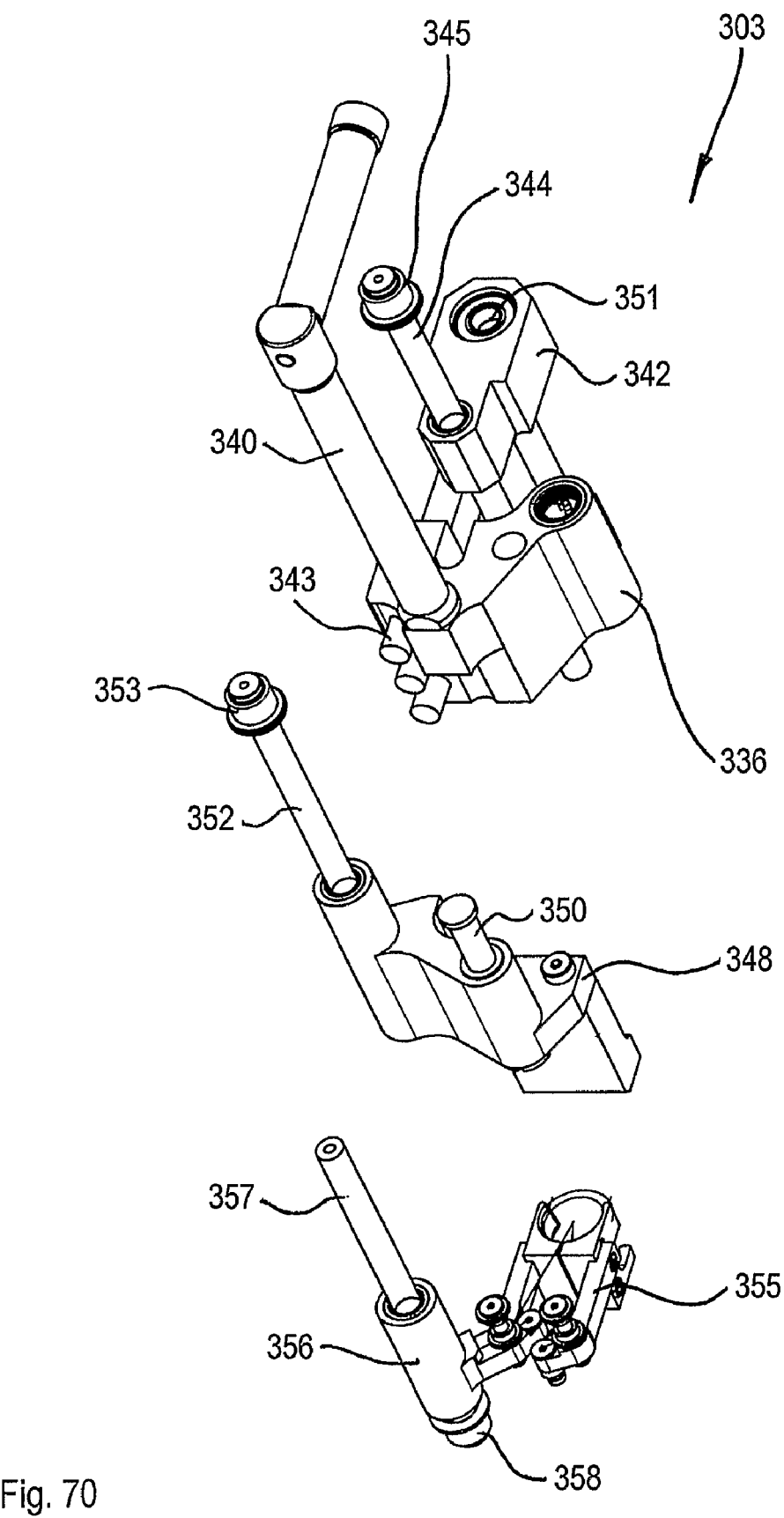
FIG. 70 is an exploded perspective view of a handling element of the formed objects.
Figure 71:
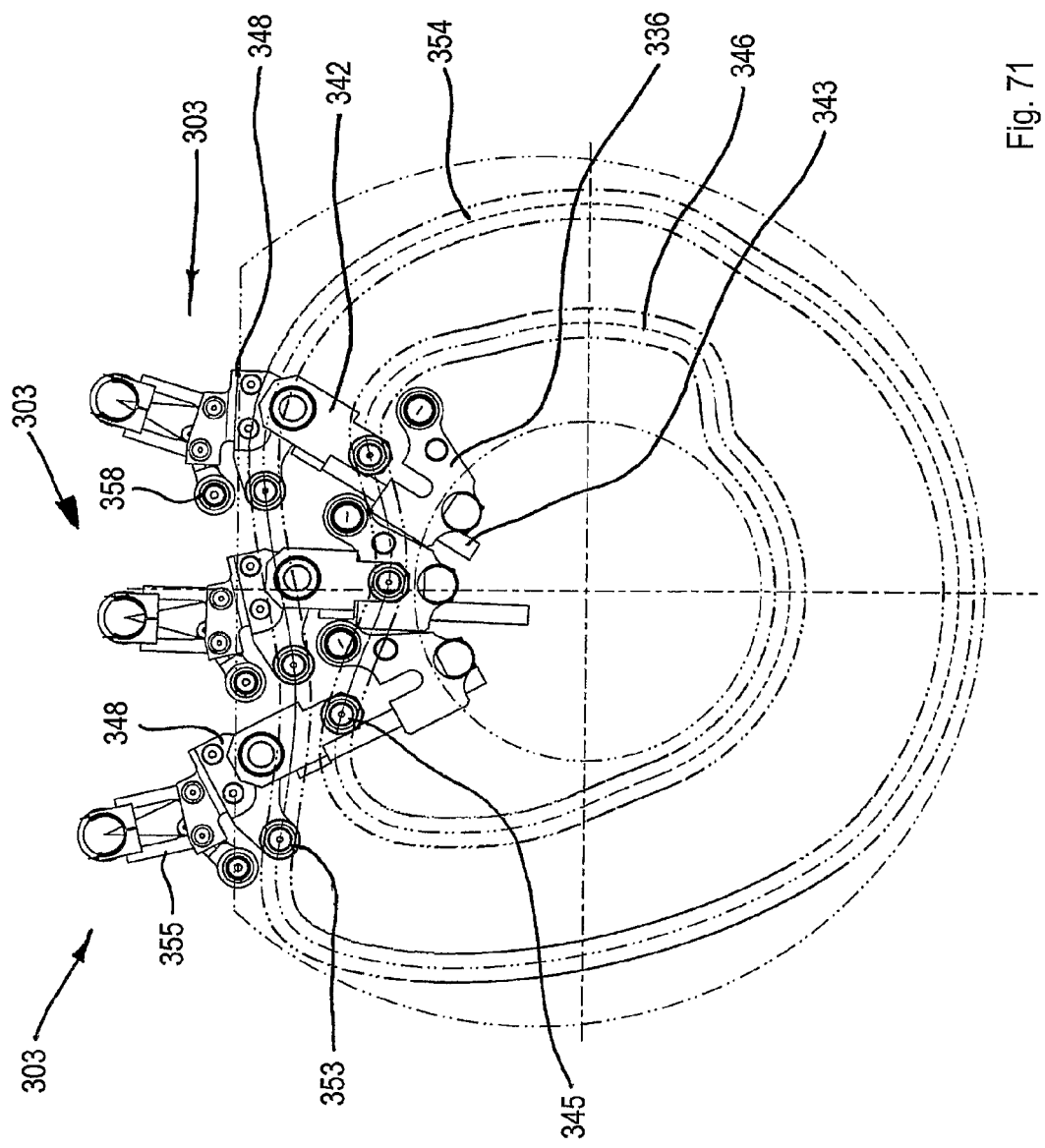
FIG. 71 is a schematic plan view of the upper part of the movement device.
Figure 72:
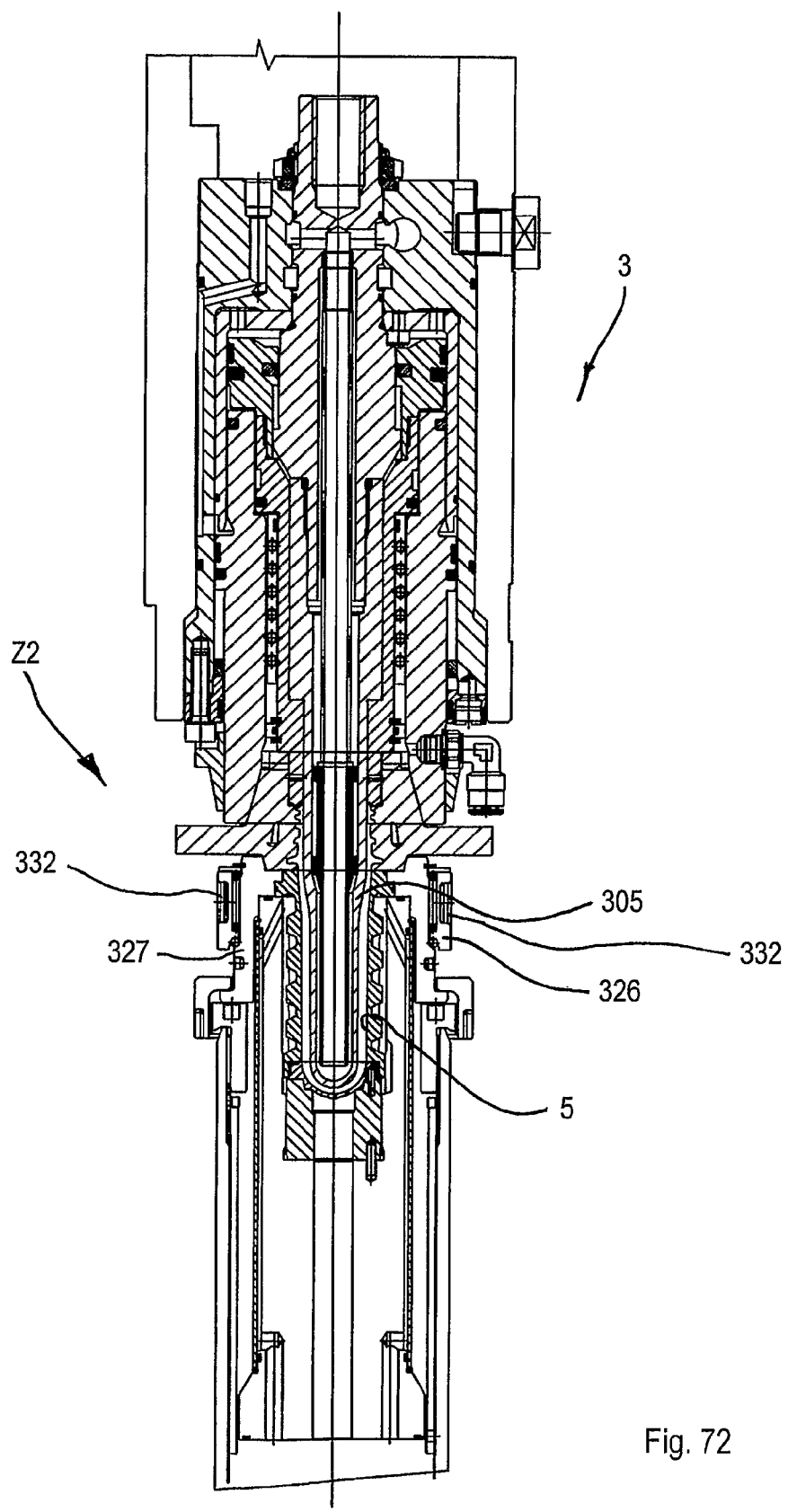
FIG. 72 is a section taken along a longitudinal plane of a forming mould of the compression-moulding device.
Figure 73:
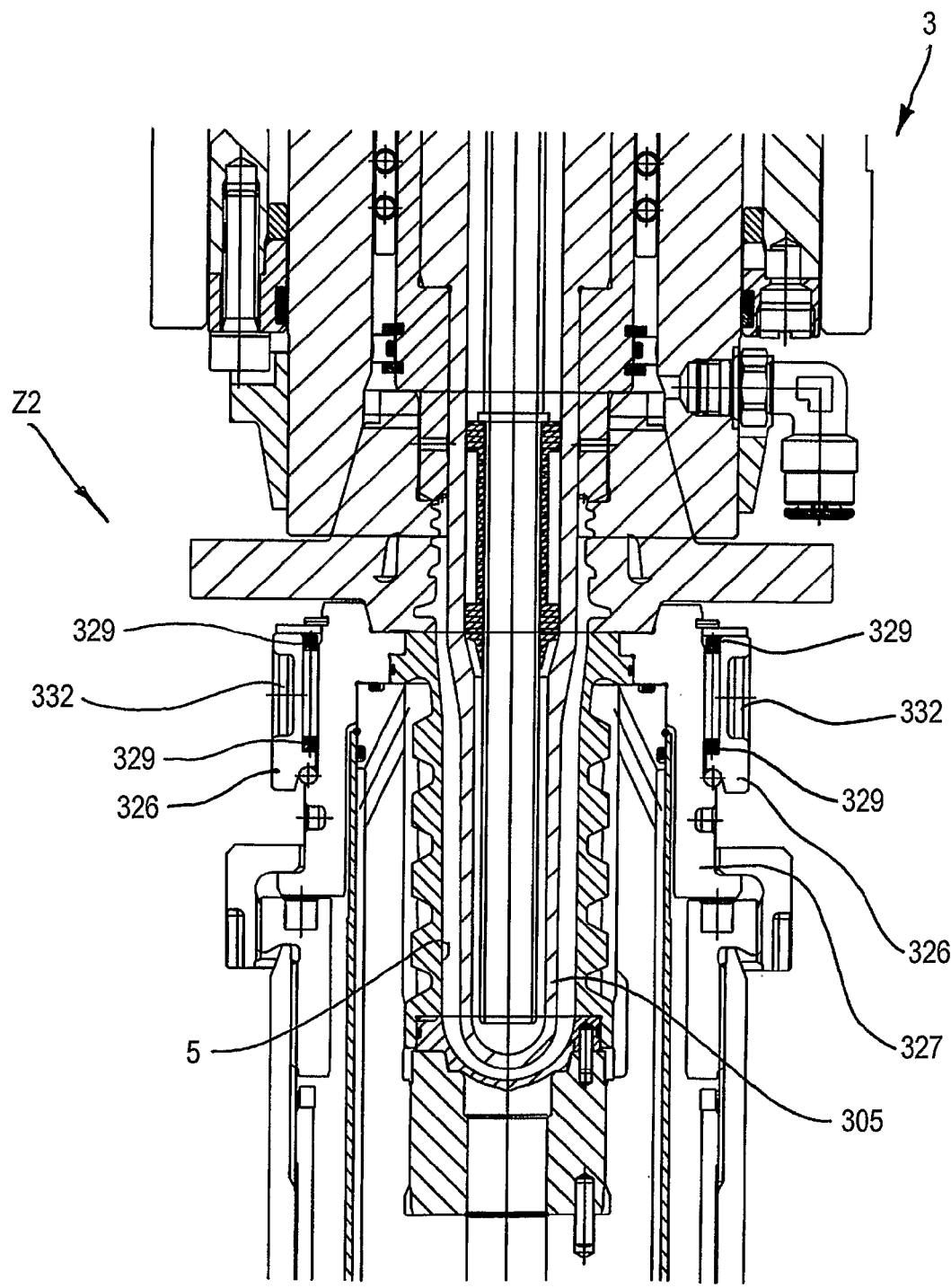
FIG. 73 is a detail in FIG. 72.

In a successive step of the work cycle, shown in FIGS. 76 and 79, the receiving portion 321 moves from the opening position H2 to the closing position H1 in which, as shown in FIGS. 64 and 65, the receiving portion 321 is more advanced than the tubular body 308 in the direction R2. Initially, compressed air is not dispensed through the conduit 311. Subsequently, whilst the tubular body 308—in the manner that will be disclosed in greater detail below—is maintained superimposed on and substantially aligned with a moulding cavity 5 into which the dose 80 has to be inserted, compressed air is dispensed—at a first pressure level—into the recess 25.

The compressed air fills the cavities defined between the dose 80 and the recess 25 in such a way as to form a cushion of fluid arranged above—and partially also laterally—with respect to the dose 80.

Simultaneously, the first closing element 29 and the second closing element 30 start to move from the closed configuration Y to the open configuration X.

Figure 77:
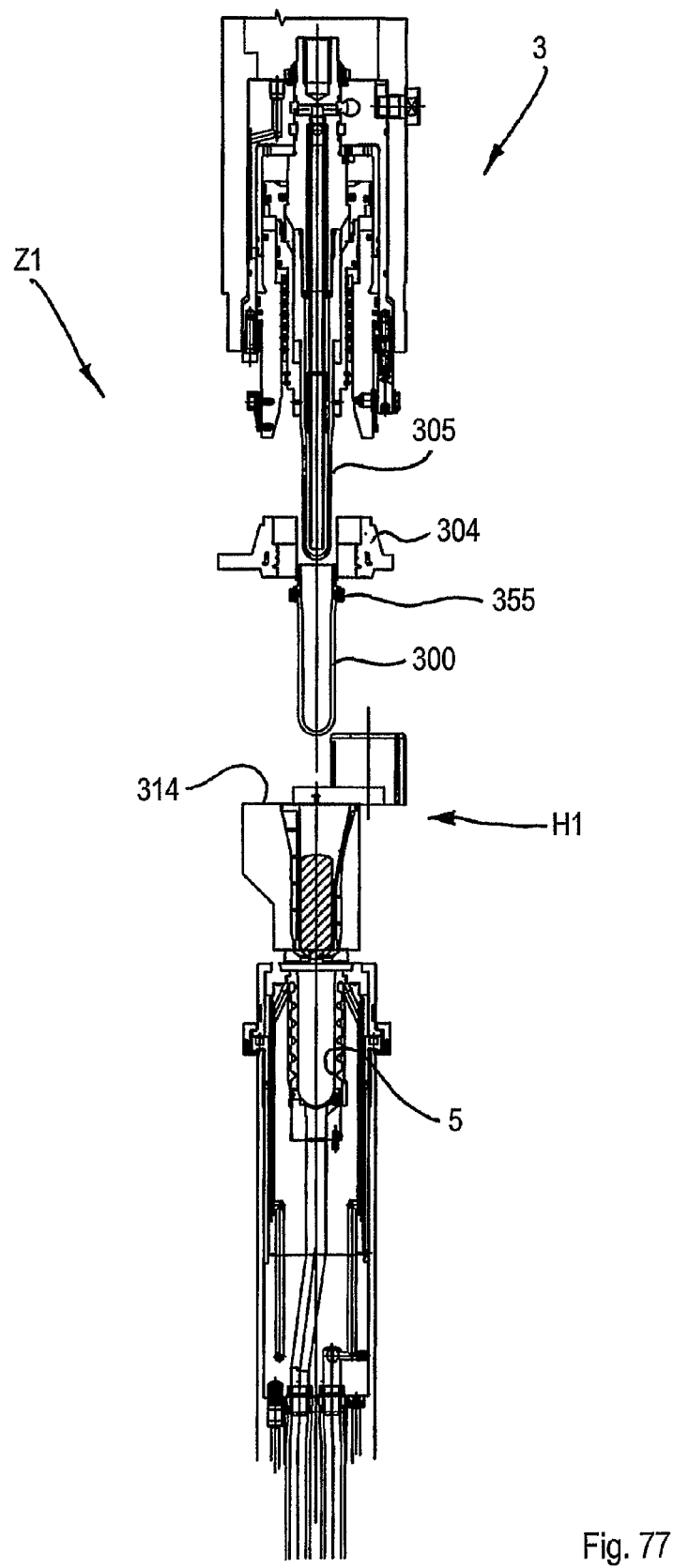
FIG. 77 is a section like the one in FIG. 74 showing the conveying element in a still further operating configuration.
Figure 80:
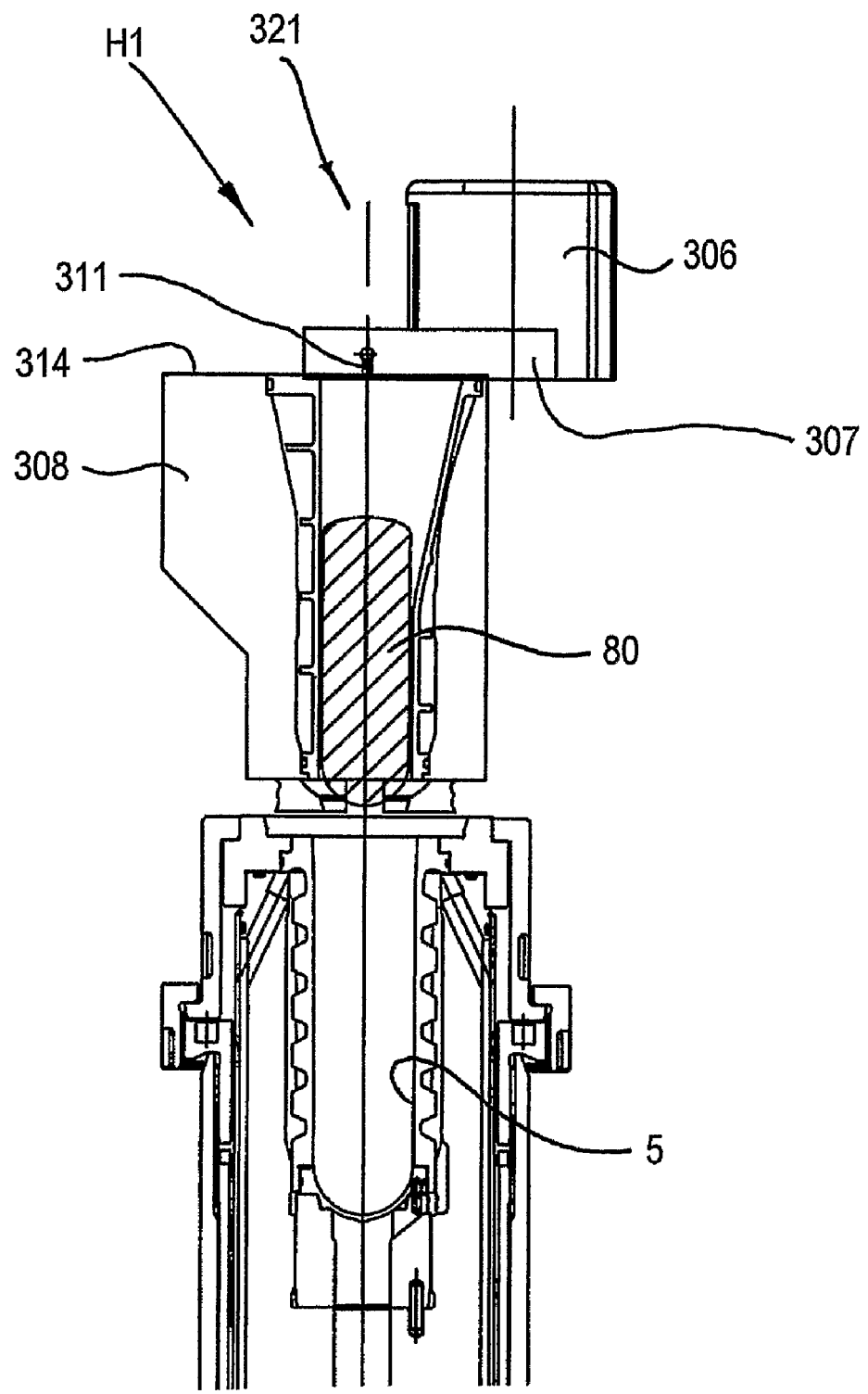
FIG. 80 is a detail in FIG. 77.

In a successive step of the work cycle, shown in FIGS. 77 and 80, whilst the first closing device 29 and the second closing device 30 continue to move to the open configuration X, compressed air is dispensed—at a second pressure level—into the recess 25, the aforesaid second pressure level being greater than the first pressure level.

The greater air pressure enables the dose 80 to be transferred rapidly from the recess 25 to the moulding cavity 5. The cushion of fluid formed by the air at lower pressure enables the stress exerted on the dose 80 of the jet of greater air pressure to be made uniform.

If the dose is subjected to a jet of greater air pressure without the air at lower pressure first having been inserted into the recess, the aforesaid jet of greater air pressure could move or deviate the dose 80, causing the dose 80 to interact with the walls of the recess 25 and prevent a correct transfer thereof into the moulding cavity 5.

Figure 78:
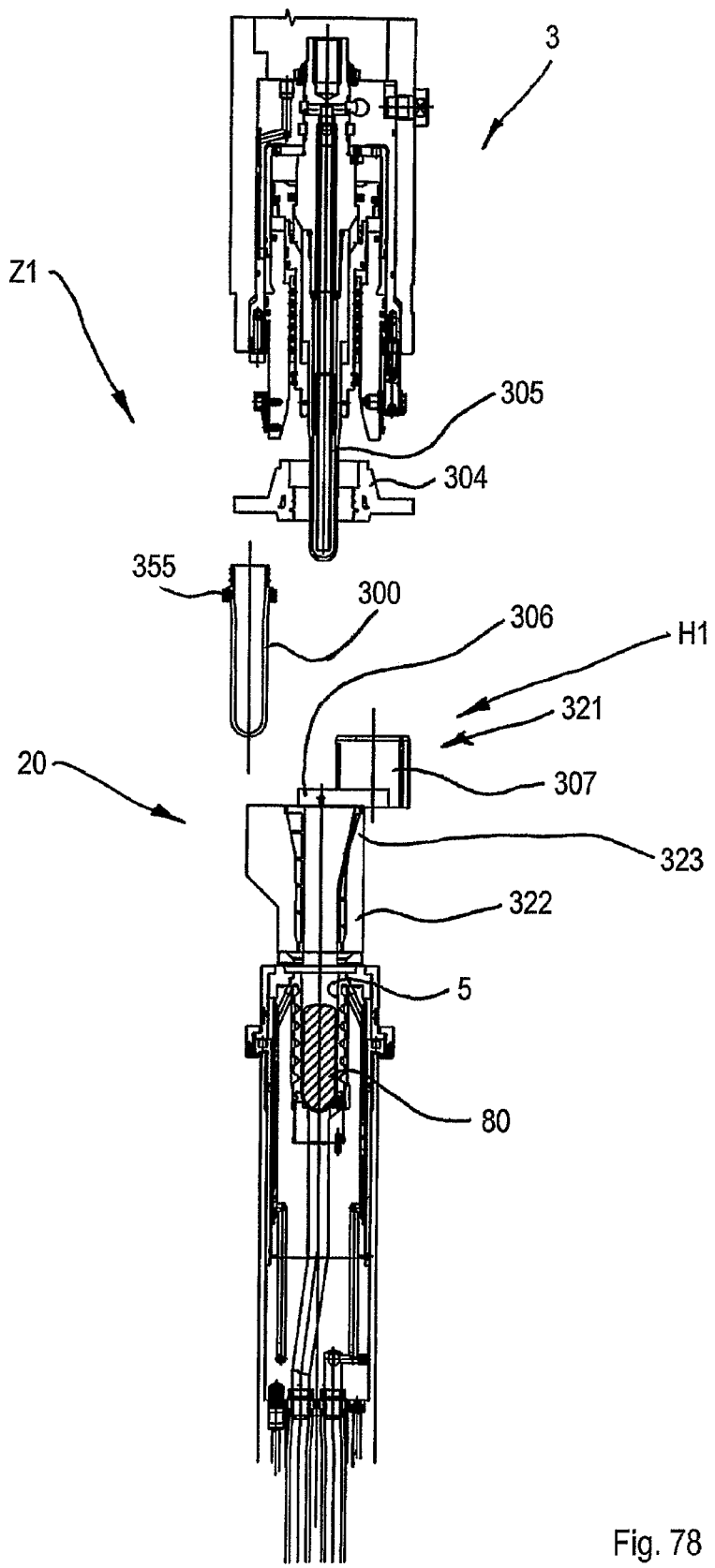
FIG. 78 is a section like the one in FIG. 74 showing the conveying element in a still further operating configuration.

In a successive step of the work cycle, shown in FIGS. 78 and 81, the dose 80 has reached the moulding cavity 5.

The receiving portion 321 is maintained in the closing position H1. Compressed air is not dispensed through the conduit 311.

During the steps of the operating cycle that are disclosed above, the receiving portion 321, by moving from the opening position H2 to the closing position H1, removes from an upper surface 314 of the tubular body 8 possible residues of plastics, such as portions of doses 80 that have not been correctly transferred into the recess 25. The aforesaid residues of plastics, if they have not been removed, and eliminated, could become fixed to the preform 300 which, substantially simultaneously to the insertion of the dose 80, is removed from the forming mould 3, as deducible from FIGS. 76 to 78, in the manner that will be disclosed in greater detail below.

Further, the receiving portion 321, when in the closing position H1, does not interact with the preform 300 during removal of the latter from the compression forming mould 3.

In other words, when the receiving portion 321 is in the closing position H1, only the base 306 (that has a very small thickness) and not also the wall 307 (which has a much greater thickness than that of the base 306) is aligned on the punch 305 and arranged below the preform 300. This enables ample space to be obtained below the punch 305 for extracting the preform from the glue forming arrangement 304. If, on the other hand, the receiving portion 321 is in the opening position H2, the wall 307—aligned with the punch 305—would hinder or even prevent the extraction of the preform from the glue forming arrangement 304.

It is possible to envisage that the containing portion 321 may be arranged in a position in which the containing portion 321 is still more advanced with respect to the tubular body 308 than what occurs in closing position H1. This enables the aforesaid residues of plastics to be moved still further from a zone of the upper surface 313 nearer the inlet opening 27.

In situations that are different from normal operation, it may be necessary for the conveying device 6 to stop supplying the moulding cavities 5 with doses 80, but to continue removing the already formed preforms 300 from the forming moulds 3, in such a way as to empty the compression-moulding device 1.

As the number of conveying elements 8 is less than the number of forming moulds 3, in order to empty all the forming moulds some revolutions of the conveying device are necessary, for example 3 to 4 revolutions.

During each of the aforesaid revolutions, all the receiving portions 321 pass from the opening position H2 to the closing position H1, and then return to the opening position H2. If portions of partially solidified plastics were stuck to the upper surface 313 the receiving portions 321, moving from the opening position H2 to the closing position H1, or vice versa, would interact with the aforesaid portions of partially solidified plastics and would consequently be subjected to stress such as to cause possible breakage of the receiving portions 321.

Therefore all the receiving portions 321, whilst the forming moulds 3 are being emptied from the preform 300 by means of the removing elements 303, can be maintained in the closing position H1.

For this purpose, there is provided a control device 315 comprising a plate 316, for example a substantially circular section, mounted on the first rotating body 301. An actuator is provided, for example a pneumatic actuator, that rotates the plate 316 with respect to the first rotating body 301, in such a way that the plate 316 can be arranged in a first operating configuration or in a second operating configuration, that will be disclosed in greater detail below. The plate 316 is provided with grooves 317, arranged substantially radially, being movable as a slide 318 inside each groove.

The number of grooves 317 is the same as the number of the conveying elements 8.

On each slide 318 an end of a rod 319 is hinged having a further end, opposite the aforesaid end, hinged on a zone of a corresponding receiving portion 321. During normal operation of the conveying device 6, the plate 316 is arranged in the first operating position. When the rotating body 301 is rotated, the revolving elements 310 cooperating with the cam element 309 remove, one after the other, the receiving portions 321 from the opening position H2 to the closing position H1. In this case, the grooves 317 enable the slides 318 to slide with respect to the plate 316.

In the situations that are different from normal operation of the conveying device 6 mentioned above, the actuator rotates the plate 16 in a driving direction R3 opposite the direction R2. The plate 316 is, therefore, arranged in the second operating position. When the plate 316 is moved from the first operating position to the second operating position, the slides 318 received in the grooves 317 are rotated in the direction R3 and, by means of the rods 319, cause each of the receiving portions 321 to rotate with respect to a corresponding tubular body 308. With each further supporting body 16 there is associated a connecting element 460 arranged for engaging a moulding cavity 5, as will be disclosed in greater detail below.

The connecting element 460 is shaped as a gripper and is intended to interact with a corresponding moulding cavity 5.

Each moulding cavity 5 is externally provided with a revolving element 326 which is shaped like a ring rotatably supported on a body 327 of the moulding cavity 5. Between the revolving element 326 and the body 327 rollers 329 are interposed that enable the revolving element 326 to rotate with respect to the body 327. The rollers 329 can be equally spaced apart from one another by a suitable transferring cage.

The connecting element 460 comprises an abutting element 328—for example a roller rotatably supported by a framework of the coupling element—and a first arm 324 and a second arm 325 hinged on the aforesaid framework.

On an end of the first arm 324 a first roller 330 is rotatably supported.

At an end of the second arm 325 a second roller 331 is rotatably supported.

The first roller 330 and the second roller 331 are arranged for being received in gaps 332 obtained in an external surface of the revolving element 326.

A positioning device is provided, which is not shown, that positions the revolving element 326 in such a way that a first gap 322 intended for receiving the first roller 330 and a second gap 322 intended for receiving the second roller 331 are arranged near the first roller 330 and the second roller 331 so as to promote the grip on the moulding cavity 5 by the first arm 324 and by the second arm 325.

The first arm 324 and the second arm 325 are mutually connected by a connecting rod 333, in such a way that the first arm 324 and the second arm 325 rotate, in opposite directions, with respect to the aforesaid framework.

An elastic arrangement is provided, for example a spring, that tends to maintain the connecting element 460 in a closed configuration.

During operation, the carousel 2 rotates around the rotation axis A in such a way that the forming moulds 3 supported thereby advance in the direction R1 along a circular path P1.

The first rotating body 301 rotates around the axis B, in such a way that the transferring elements 8 supported thereby—maintained in the maximum extent configuration E by the linear actuator 371—advance in the further direction R2 along a further circular path P2.

Figure 57:
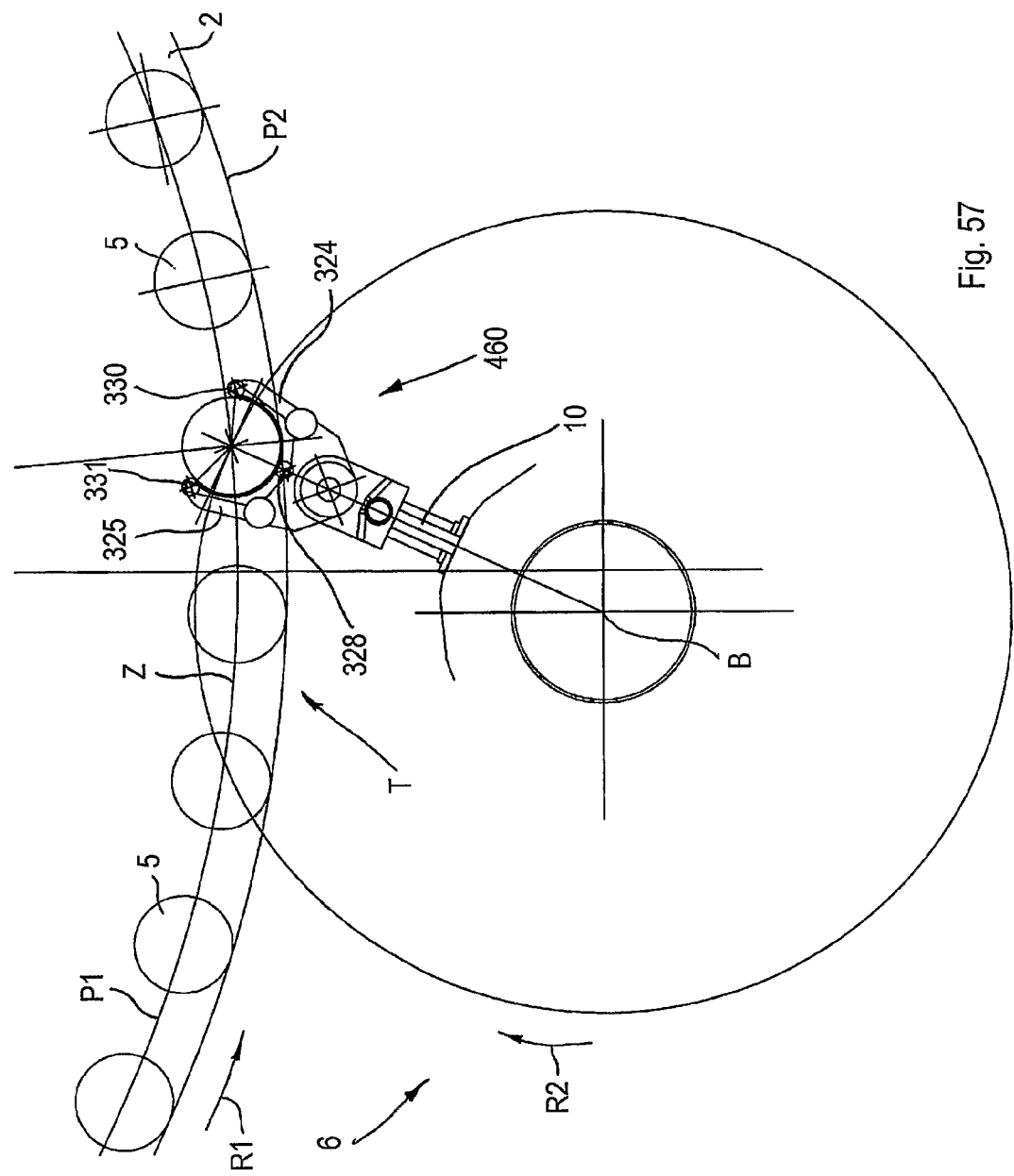
FIG. 57 is a schematic layout of an apparatus for compression-moulding plastics.
Figure 58:
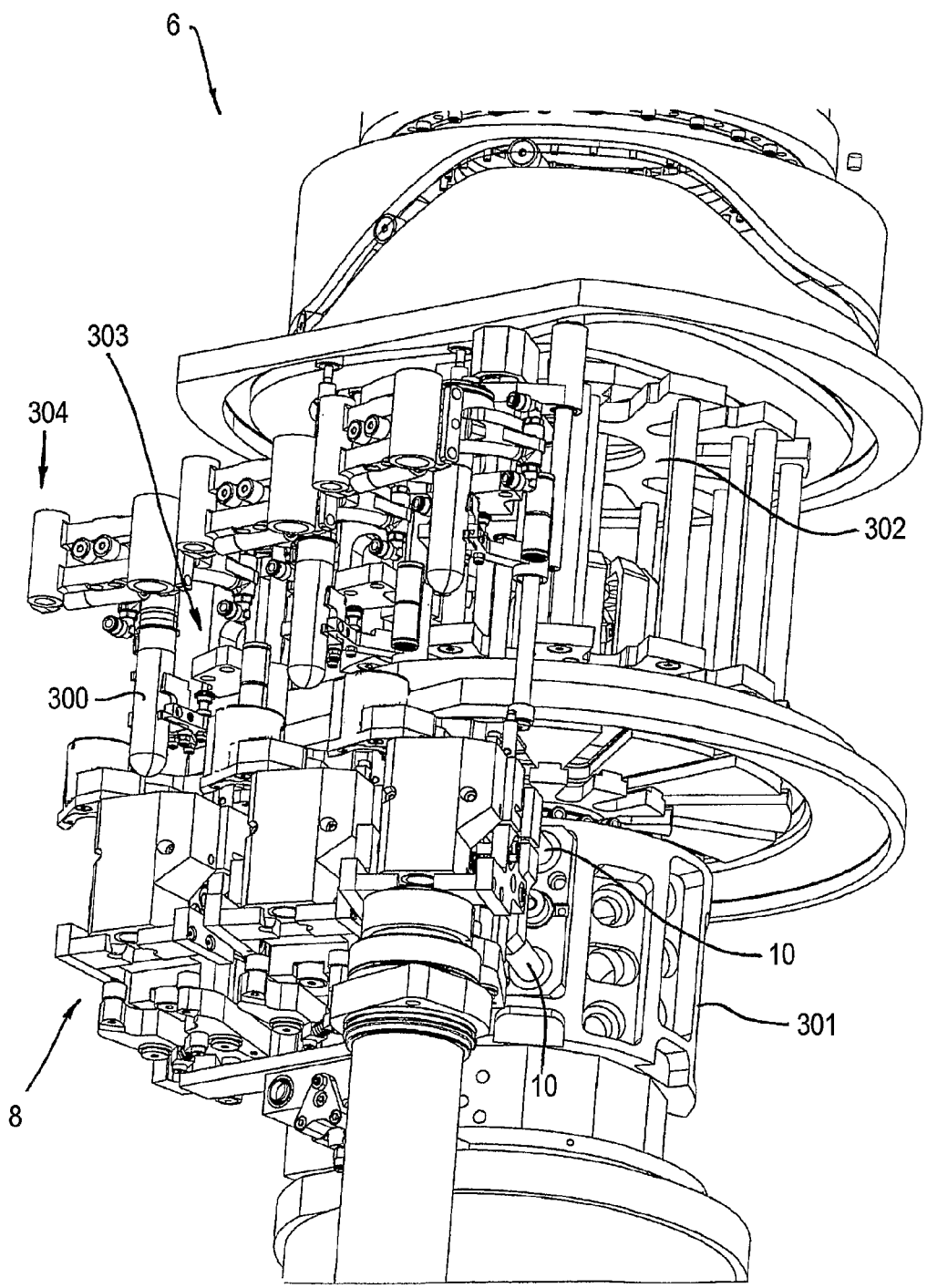
FIG. 58 is a fragmentary perspective view of a movement device arranged for inserting doses of plastics in a compression-moulding device and for removing objects formed by the compression-moulding device.
Figure 59:
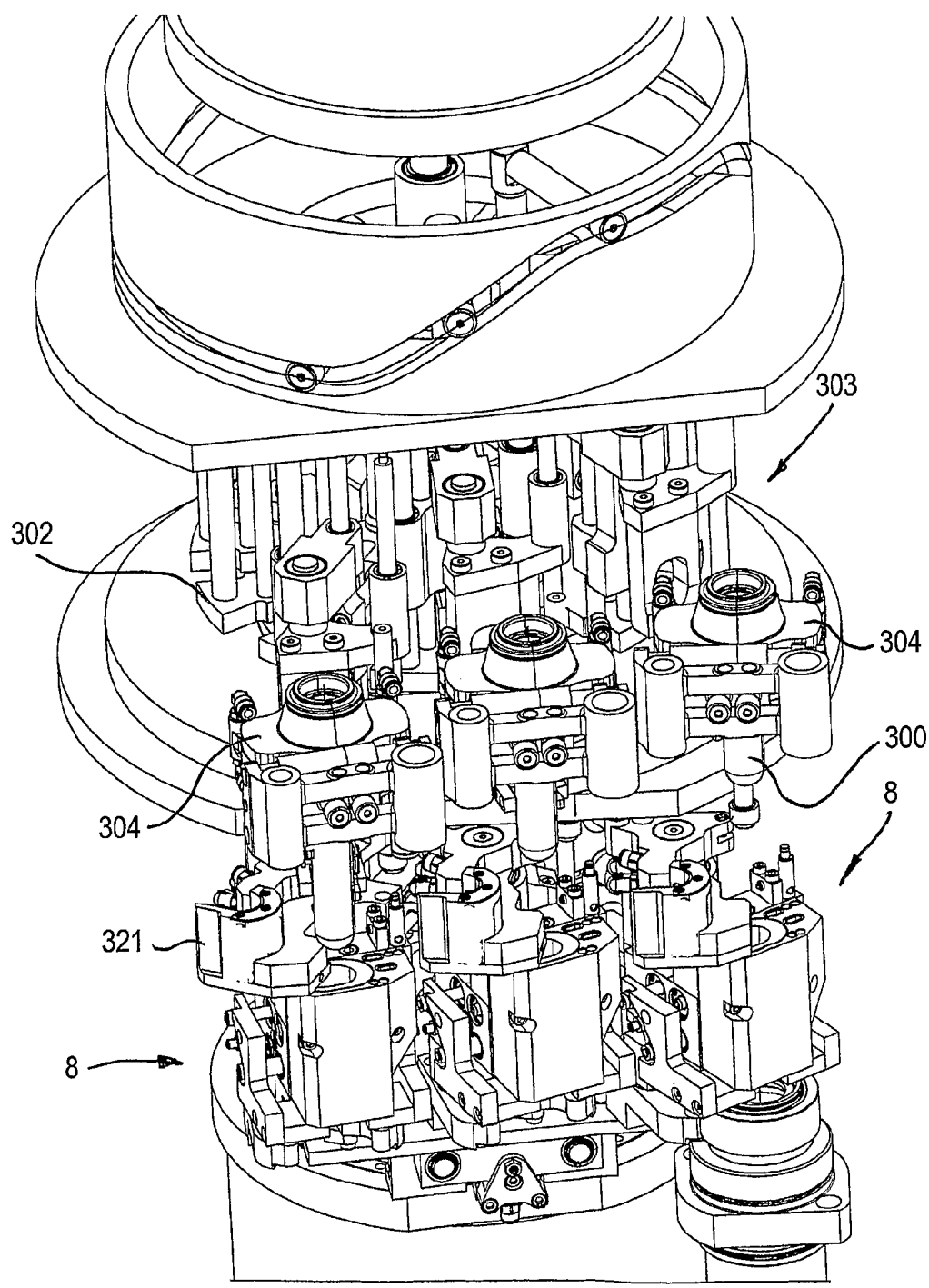
FIG. 59 is a further fragmentary perspective view of the movement device in FIG. 58.
Figure 60:
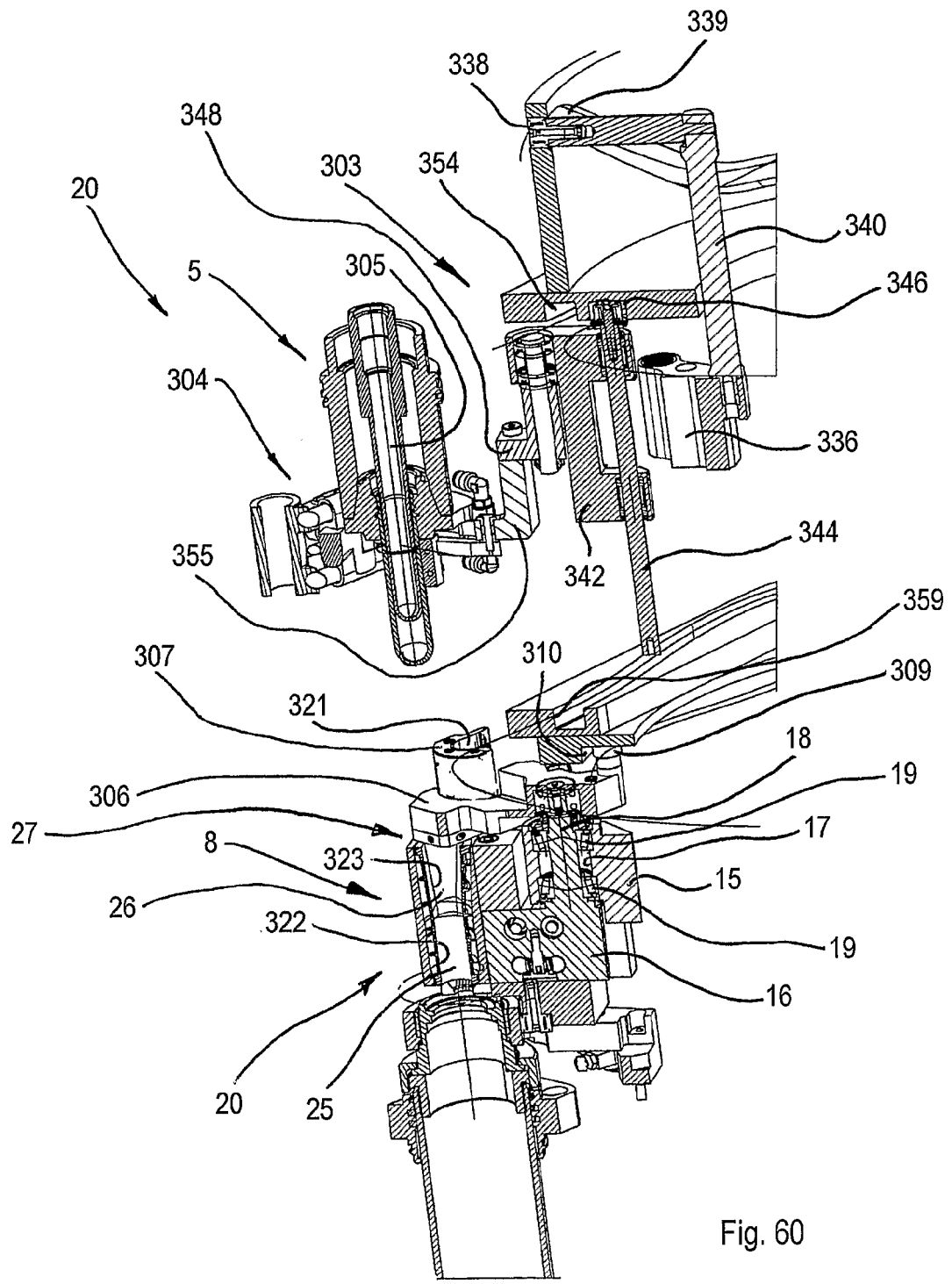
FIG. 60 is a fragmentary and partially sectioned perspective view of the movement device in FIG. 58.
Figure 61:
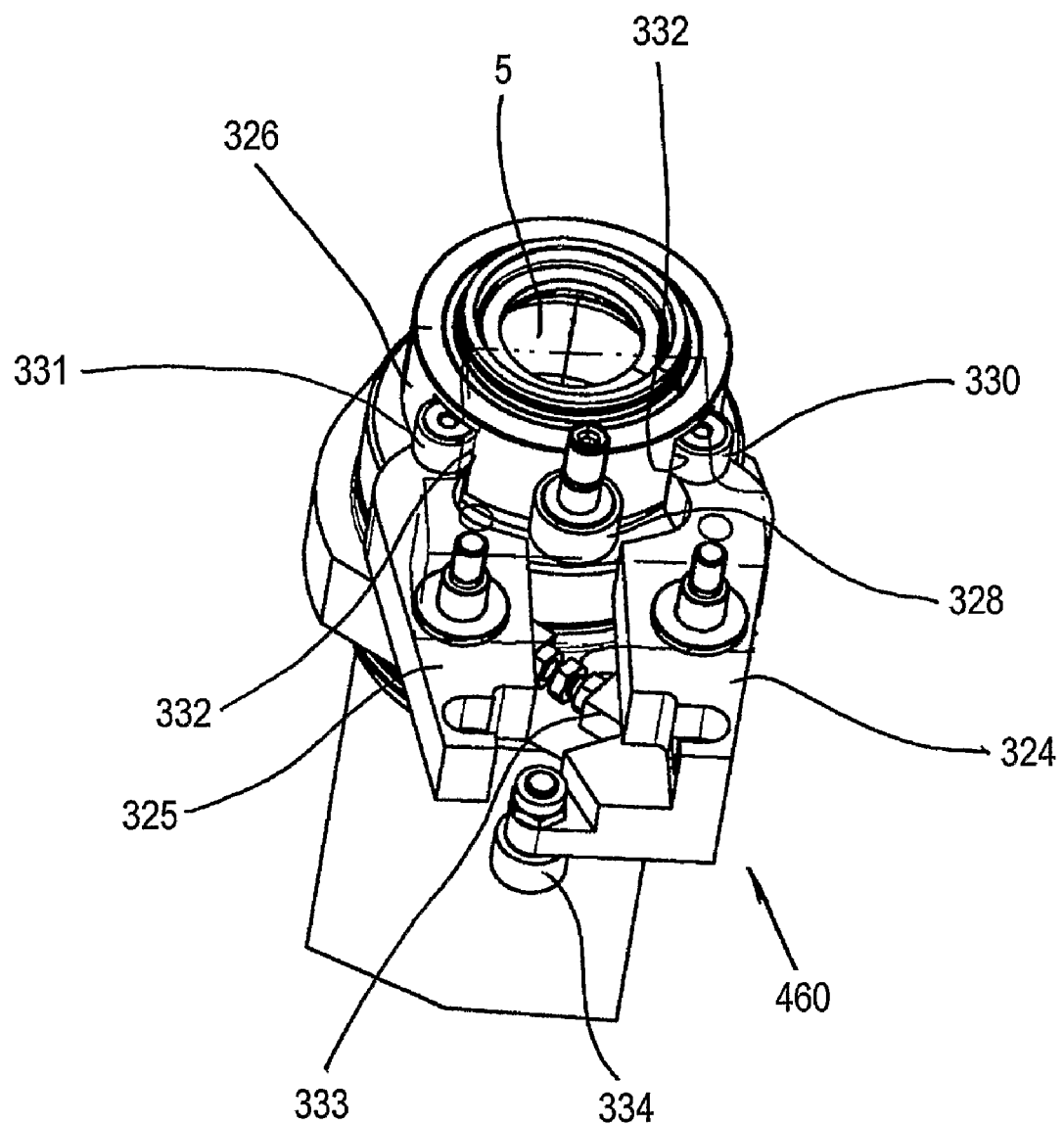
FIG. 61 is a perspective view of a locking element of a conveying element of the movement device engaging a moulding cavity of the compression-moulding device.
Figure 62:
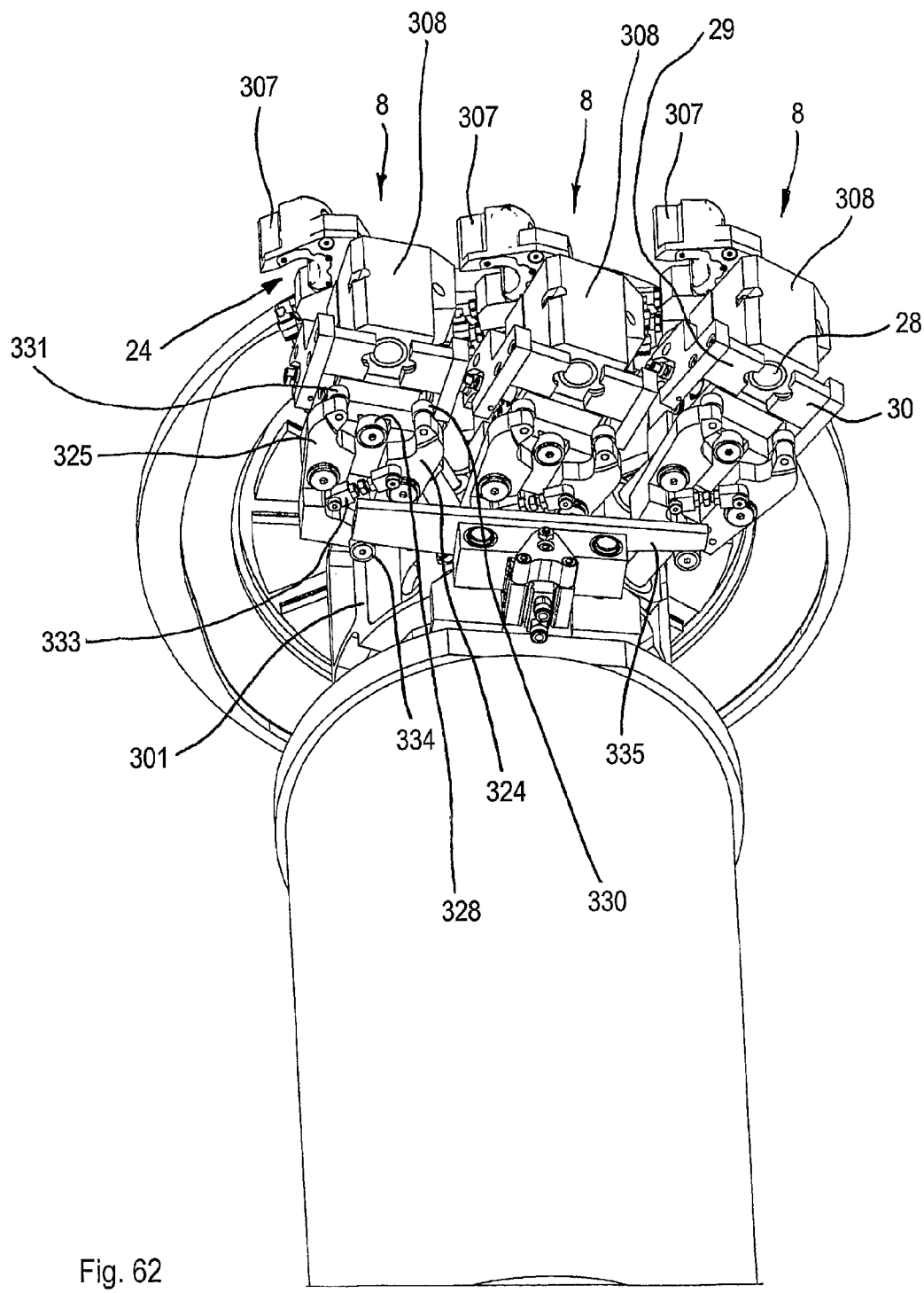
FIG. 62 is a perspective view from below of a lower part of the movement device.
Figure 63:
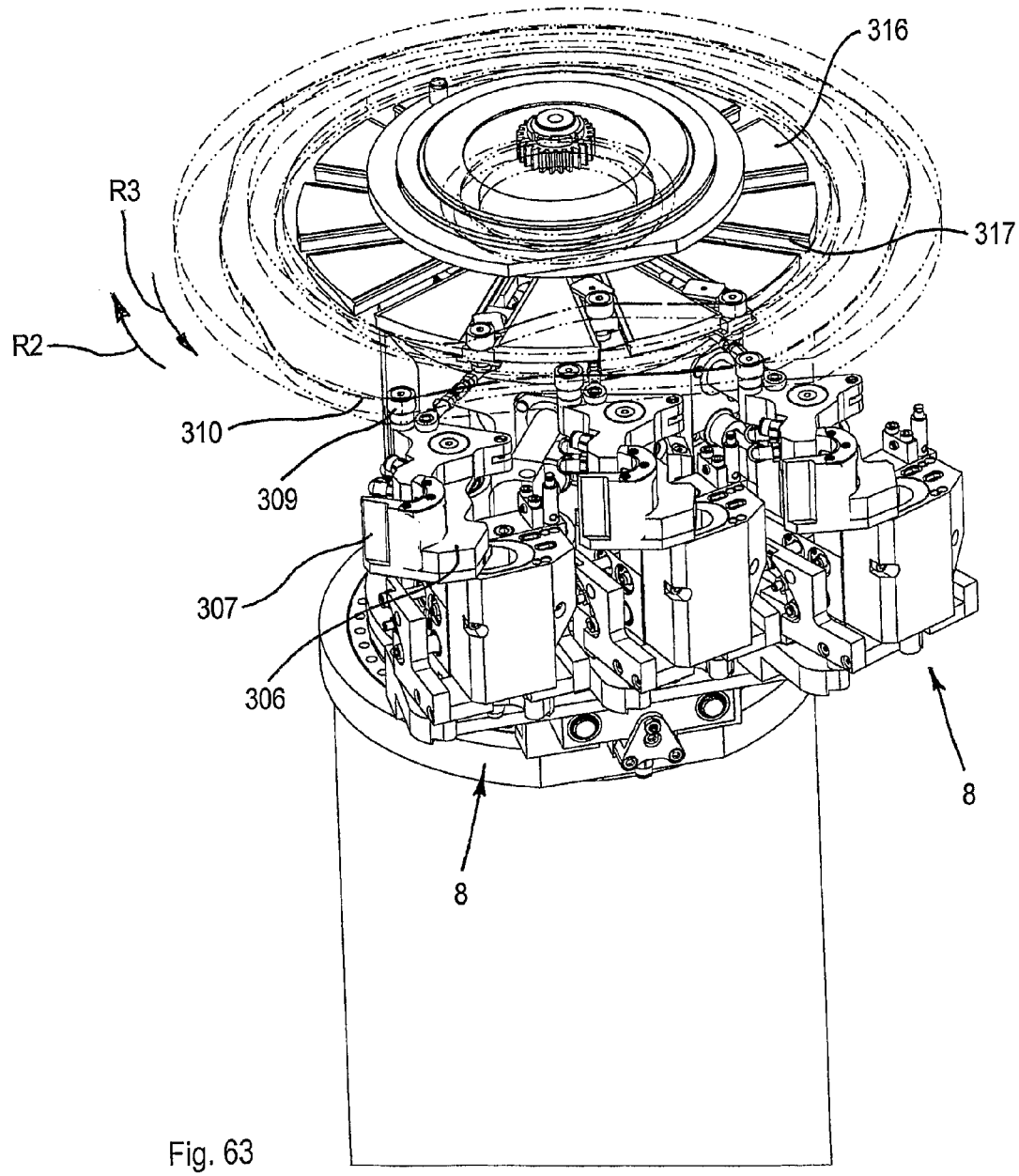
FIG. 63 is a perspective side view of the lower part of the movement device.

The forming device 1 and the conveying device 6 are positioned in such a way that the circular path P1 and the further circular path P2 intersect in a transferring zone T, shown in FIG. 57, in which the doses 80 are transferred by the conveying elements 8 to the moulding cavities 5.

In other words, the rotation axis A and the rotation axis B are separated by a distance that is less than the sum of the radii of the circular path P1 and of the further circular path P2.

During rotation of the carousel 2 and of the further carousel 7, a conveying device 8, which is at an initial part of the transferring zone T, interacts with a corresponding forming mould 3.

The moulding cavity 5, by interacting with the first roller 330 and with the second roller 331 tends to move the first arm 324 and the second arm 325 away from one another. In other words, the moulding cavity 5 tends to open the connecting element 460.

The abutting element 328 engages with an external cylindrical surface of the revolving element 326, whilst the first roller 330 and the second roller 331 are received in respective gaps 332.

Whilst the carousel 2 and the further carousel 7 continue to rotate, the moulding cavity 5 makes the conveying element 8 move from the maximum extent configuration E and move towards the rotation axis B.

The supporting body 15 moves radially with respect to the further carousel 7, whilst the guiding rods 10 are partially received inside holes 11, the thrust exerted on the supporting body 15 by the linear actuator 371 being overcome by the force exerted by the moulding cavity 5 on the connecting element 460.

The further supporting body 16 rotates with respect to the supporting body 15, whilst the connecting element 460 maintains the conveying element 8 and the moulding cavity 5 connected.

The conveying element 8, therefore, at the transferring zone T, abandons the further circular path P2 and moves along a portion Z of the circular path P1.

In this way, the transferring element 8 and the moulding cavity 5 interact for a significantly long interval of time, during which a dose 80 can be correctly transferred from the transferring element 8 to the moulding cavity 5.

As the abutting element 328 is in contact with the revolving element 326 and the first roller 330 and the second roller 331 are received inside the seats 332, the containing portion 322 is arranged above, and aligned with, the moulding cavity 5, whilst the moulding cavity 5 and the handling element 20 together travel along the portion Z.

This enables excellent transferring of the dose 80 from the containing portion 322 with the moulding cavity 5 to be achieved, as the moulding cavity 5 acts as a reference and centring element for the conveying element 8, ensuring correct positioning of the handling element 20 with respect to the moulding cavity 5. Further, as the further supporting body 16 can rotate with respect to the supporting body 15 and the supporting body 15 may move radially with respect to the first rotating body 301, whilst the linear actuator 371 makes the further supporting body 16 move away from the axis B, the connecting element 460 can engage correctly with the moulding cavity 5 even if the position of the connecting element 460 and/or the position of the moulding cavity 5 differ—within certain limits—from theoretically envisaged positions.

When the connecting element 460 interacts with the revolving element 326, the forming mould 3 is in the open configuration and the moulding cavity 5 is in a lower dead point position of the stroke thereof.

The moulding cavity 5 is moved by a driving device provided with a stem at an end of which there is fixed the moulding cavity 5.

In the lower dead centre position, a prevalent portion of the aforesaid stem is received inside a guide sleeve.

In the lower dead centre position, therefore, the moulding cavity 5 is provided with great stiffness, which enables more precise positioning of the handling element 20 to be obtained.

The moulding cavity 5, the connecting element 460 and the containing portion 322 can be shaped in such a way that, when the connecting element 460 interacts with the revolving element 326, an axis of the containing portion 322 substantially coincides with an axis of the moulding cavity 5.

An adjusting arrangement is provided, for example an adjusting arrangement 37 of the type shown with reference to FIGS. 32 to 35, that enables the connecting element 460 to be moved with respect to the further supporting body 16, in such a way that, when the connecting element 460 interacts with the revolving element 326, an axis of the dose 80 (and not the axis of the containing portion 322) substantially coincides with an axis of the moulding cavity 5.

Whilst the carousel 2 and the first rotating body 301 continue to rotate, the conveying element 8 and the moulding cavity 5, which are maintained in reciprocal contact by the connecting element 460, reach a terminal zone of the portion Z.

At this terminal zone, the connecting element 460 disengages from the revolving element 326.

The linear actuator 371 returns the conveying element 8 to the maximum extent configuration E, in such a way that the conveying element 8 abandons the circular path P1 and again travels along the further circular path P2.

On a further end of the first arm 324 a wheel 334 is hinged that is arranged for interacting with a cam body 335 fixed to a framework of the conveying device 6. The wheel 334 and the cam body 335 (together with the connecting rod 333 that connects the first arm 324 and the second arm 325) define a locking device that maintains the first arm 324 and the second arm 325 clamped on the moulding cavity.

The aforesaid locking device can act during normal operation of the conveying device 6 or only in the event of an emergency.

The connecting elements 460 enable further correct positioning of the removing elements 303 with respect to the punches 305 and the glue forming arrangement 304 from which they have to remove the preforms 300.

Each removing element 303 comprises a first supporting body 336 that is slidable along guide bars 337 fixed to the second rotating body 302. The guide bars 337 are arranged substantially parallel to the rotation axis B, i.e. substantially along a vertical direction.

The first supporting body 336 comprises an arm 340 on which a first wheel 338 is rotatably supported, engaging in a first cam 339. The first cam 339 is shaped as a groove obtained in a head 341 of the conveying device 6 and is arranged for receiving the first wheel 338. The head 341 is maintained in a fixed position when the second rotating body 302 is rotated. The first wheel 338, engaging the first cam 339, controls a movement of the first supporting body 338 along the rotation axis B.

In an adjusting and fine tuning step that precedes normal operation, the conveying elements 8—and, consequently, the removing elements 303—have to be phased with respect to the moulding cavities 5, i.e. also for obtaining a repeatable correct correspondence between the various moulding cavities 5.

The head 341 is movable, in a substantially vertical direction, along the rotation axis B, between an operating position, in which the first cam 339, interacting with the first wheels 338, guides the removing elements 303 to make them interact with the preforms 300 during normal operation, and a service position, in which the removing elements 303 are so positioned as not to interfere with the punches 305 of the moulds 3 to enable adjusting and fine tuning to be performed.

In particular, the removing elements 303 are positioned at a greater height when they are in an operating position and at a lesser height when they are in the service position.

Once adjusting and fine tuning have been performed, the head 341 can be moved from the service position (i.e. from the lowered position) to the operating position (i.e. to the raised position) when the second rotating body 302 is rotated. This variation of position can also be achieved whilst operation occurs dynamically at increasing rotation speed.

During lifting of the head 341, as the first rotating body 301 and the second rotating body 302 have been phased with respect to the carousel 2, the risk is avoided that each removing element 303 interferes with a corresponding punch 305.

The removing element 303 further comprises a second supporting body 342 that is supported by the first supporting body 336 and is slidable with respect to the first supporting body 336. The second supporting body 342 comprises further guide bars 343 that are slidably received in holes of the first supporting body 336. The second supporting body 342 is movable substantially radially with respect to the second rotating body 302. From the second supporting body 342 a rod 344 leads away at an edge of which a second wheel 345 is rotatably hinged, engaging a second cam 346.

The second cam 346 is shaped as a groove obtained in a fixed plate 347 of the conveying device 6 and arranged for receiving the second wheel 345. The second wheel 345, engaging with the second cam 346, controls sliding of the second supporting body 342 with respect to the first supporting body 336.

The removing element 303 further comprises a third supporting body 348 supported by the second supporting body 342 and rotatable with respect to the second supporting body 342. The third supporting body 348 comprises a pin 350 rotatably received in a seat 351 of the second supporting body 342. From the third supporting body 348 a further rod 352 leads away at an end of which a third wheel 353 engaging in a third cam 354 is rotatably supported.

The third cam 354 is shaped as a groove obtained in the plate 347 and is arranged for receiving the third wheel 353. The third wheel 353, by engaging with the third cam 354, rotates a third supporting body 348 with respect to the second supporting body 342.

The removing element 303 further comprises a gripping element 355 supported by the third supporting element 348 and arranged for removing the preforms 300 from the forming mould 3 and for delivering the preforms 300 to a transferring device, for example of the transferring device 86 type disclosed with reference to FIG. 20.

The gripping element 355 comprises a sleeve 356 inside which a still further rod 357 is achieved at an end of which a fourth wheel 358 is rotatably supported, engaging in a fourth cam 359. The fourth cam 359 is shaped as a groove obtained in a further plate 370 of the conveying device 6 and is arranged for receiving the fourth wheel 358. The fourth wheel 358, engaging with the fourth cam 359, controls the opening and the closure of a holding element of the gripping element 355.

During operation, after the connecting element 460 has mutually connected the conveying element 8 and the moulding cavity 5 in the previously disclosed manner, whilst a conveying element 8 deposits a dose 80 inside a moulding cavity 5 of a forming mould 3, a removing element 303—corresponding to the aforesaid conveying element 8—removes a preform 300 from a punch 305 of the forming mould 3.

The gripping element 355 is positioned on the preform 300 by the first wheel 338 and the first cam 339, the second wheel 345 and the second cam 346, the third wheel 353 and the third cam 354.

In particular, as shown in FIG. 76, whilst the glue forming arrangement 304 moves along the rotation axis A to remove the preform 300 from the punch 305, the gripping element 355 surrounds the preform 300.

Subsequently, the gripping element 355 clamps the preform 300 before the preform 300 is released by the glue forming arrangement 304. In this condition the gripping element 355 starts to move first vertically downwards with the same motion laws as the glue forming arrangement 304.

Subsequently, as shown in FIGS. 77 and 78, the gripping element 355 moves vertically, following the preform 300. Subsequently, once the preform 300 has been received by the glue forming arrangement, the gripping element 355 also moves laterally.

In the steps that precede the start of gripping of the preforms 300 by the gripping element 355 and that immediately follow the end of gripping of the preforms 300 by the gripping element 355 slight oscillations of the gripping element 355 may occur, such oscillations, however, do not adversely affect the correct handling of the preforms 300.

The invention claimed is:

1. Apparatus, comprising a conveying device provided with seat elements arranged for receiving objects, said seat elements being movable along a curved path, and a further conveying device provided with a transferring arrangement arranged for delivering said objects to, and/or removing said objects from, said conveying device, wherein said objects comprise doses of plastics and said transferring arrangement comprises:
   handling elements supported by a movable element of said further conveying device and arranged for receiving and handling said doses;
   supporting bodies slidable with respect to said movable element and further supporting bodies to which said handling elements are fixed, wherein said further supporting bodies are rotatably supported by said supporting bodies;
   coupling elements associated with said handling elements, wherein said coupling elements are arranged for engaging said seat elements in such a way that said seat elements and said transferring arrangement are maintained mutually coupled along a portion of said curved path such that said doses can be transferred from said handling elements to the seat elements.

2. Apparatus according to claim 1, and further comprising connecting elements so shaped as to mutually connect said transferring arrangement and said seat elements along said portion and to release said transferring arrangement and said seat elements after said transferring arrangement and said seat elements have jointly traveled along said portion.

3. Apparatus according to claim 2, wherein said connecting element comprises a first arm and a second arm.

4. Apparatus according to claim 3, wherein said first arm and said second arm define a movable gripper element between an open configuration, in which said seat element can enter or exit said gripper element, and a closed configuration, in which said gripper element clamps said seat element.

5. Apparatus according to claim 3, wherein said first arm and said second arm are hinged on a body of said connecting element.

6. Apparatus according to claim 3, wherein said connecting element comprises a connecting rod element arranged for mutually connecting said first arm and said second arm.

7. Apparatus according to claim 3, wherein said seat element is externally provided with a revolving element intended for interacting with said connecting element.

8. Apparatus according to claim 7, wherein said revolving element is shaped like a ring rotatably supported on a body of said seat element.

9. Apparatus according to claim 8, wherein between said revolving element and said body there are interposed roller elements that enable said revolving element to rotate with respect to said body.

10. Apparatus according to claim 7, wherein in said revolving element there are provided gap elements arranged for receiving engaging elements engaging said first arm and said second arm.

11. Apparatus according to claim 1, wherein said coupling element defines a gap element arranged for interacting with an external surface of said seat element, said external surface being a cylindrical external surface.

12. Apparatus according to claim 11 wherein said coupling element comprises a first wall and a second wall that are mutually tilted in such a way that said gap element has a "V"-shaped section.

13. Apparatus according to claim 11, and further comprising connecting elements so shaped as to mutually connect said transferring arrangement and said seat elements along said portion and to release said transferring arrangement and said seat elements after said transferring arrangement and said seat elements have jointly traveled along said portion wherein said connecting elements comprise maintaining elements that are movable between a locking configuration, in which said connecting elements mutually connect said transferring arrangement and said seat elements, and a release configuration, in which said connecting elements enable said transferring arrangement and said seat elements to move independently of one another.

14. Apparatus according to claim 13, wherein said maintaining elements cooperates with said coupling elements.

15. Apparatus according to claim 14, wherein said maintaining element comprises an arm arrangement rotatably supported by said coupling element, said arm arrangement comprising a first movable arm and a second movable arm that mutually cooperate.

16. Apparatus according to claim 1, wherein said transferring arrangement comprises guiding elements that are slidable with respect to said movable element, said guiding elements supporting said handling elements.

17. Apparatus according to claim 1, wherein said movable element comprises a carousel device rotatable around a rotation axis and supporting said transferring arrangement.

18. Apparatus according to claim 1, wherein said transferring arrangement comprises a plurality of transferring elements.

19. Apparatus according to claim 1, wherein said conveying device comprises a compression-moulding device for compression-moulding said doses, said seat elements comprising mould cavities of a mould arrangement of said compression-moulding device.

20. Apparatus according to claim 19, wherein said coupling element interacts with said mould cavity when said mould cavity is in a lower dead centre position of an operating stroke thereof.

21. Apparatus according to claim 19, wherein said compression-moulding device comprises a carousel rotatable around a rotation axis and supporting said mould arrangement.

22. Apparatus according to claim 19, wherein said mould arrangement comprises a plurality of moulds.

23. Apparatus according to claim 1, wherein said transferring arrangement comprises receiving elements arranged for removing said doses coming from an extruding device, said receiving elements being so shaped as to remove from said compression-moulding device products obtained from said doses.

24. Apparatus according to claim 23, wherein said receiving element comprises a gap element, said gap element being open in an advance direction of said transferring arrangement.

25. Apparatus according to claim 24, wherein said gap element is substantially shaped as an upturned cone having a greater section at an inlet zone of said doses into said receiving element and a lesser section at an outlet zone of said doses from said receiving element.

26. Apparatus according to claim 23, wherein with said receiving elements there are associated delivering elements arranged for receiving said doses from said receiving elements and delivering said doses to said compression-moulding device, said receiving elements and said delivering elements being mutually fixed.

27. Apparatus according to claim 26, and further comprising a closing arrangement arranged for closing an inlet opening through which said doses enter said delivering elements.

28. Apparatus according to claim 27, wherein said closing arrangement comprises a cover element that is movable between a closing position, in which said cover element closes said inlet opening, and an opening position, in which said cover element is distant from said inlet opening.

29. Apparatus according to claim 28, wherein with said cover element there is associated a dispensing device to dispense a fluid inside said delivering elements.

30. Apparatus according to claim 29, wherein said dispensing device dispenses said fluid when said cover element is in said closing position.

31. Apparatus according to claim 29, wherein said dispensing device dispenses said fluid directly in contact with said doses to eject said doses from said delivering elements.

32. Apparatus according to claim 1, wherein said transferring arrangement comprises receiving elements arranged for removing said doses coming from an extruding device and delivering elements arranged for receiving said doses from said receiving elements and delivering said doses to said compression-moulding device, said receiving elements being supported by said delivering elements and being movable with respect to said delivering elements.

33. Apparatus according to claim 32, wherein said receiving element comprises a gap element, said gap element being open in an advance direction of said transferring arrangement.

34. Apparatus according to claim 33, wherein said receiving elements are movable between a first operating position, in which said receiving elements and said delivering elements are mutually aligned, and a second operating position, in which said receiving elements are in a more advanced position with respect to said delivering elements in a movement direction of said transferring arrangement.

35. Apparatus according to claim 34, wherein, in said first operating position, said receiving elements and said delivering elements are substantially coaxial.

36. Apparatus according to claim 34, and further comprising movement elements arranged for moving said receiving elements between said first operating position and said second operating position.

37. Apparatus according to claim 34, and further comprising a driving and locking device arranged for moving said receiving elements in said second operating position and for maintaining said receiving elements in said second operating position.

38. Apparatus according to claim 32, wherein said receiving element comprises a wall bounding a gap arranged for receiving said doses and an appendage extending from a zone of said wall nearer said delivering element.

39. Apparatus according to claim 38, wherein in said appendage there is arranged a dispensing device for dispensing a fluid into said delivering element.

40. Apparatus according to claim 32, and further comprising a removing arrangement arranged for removing from said compression-moulding device products obtained from said doses.

41. Apparatus according to claim 40, wherein said removing arrangement comprises a plurality of removing elements and said transferring arrangement comprises a plurality of transferring elements, a transferring element of said plurality of transferring elements corresponding to each removing element of said plurality of removing elements.

42. Apparatus according claim 39, and further comprising a rotating body rotatable around a rotation axis and supporting said removing arrangement.

43. Apparatus according to claim 40, wherein said removing arrangement comprises a gripping element arranged for handling said products.

44. Apparatus according to claim 43, and further comprising a controlling arrangement arranged for controlling the opening and/or the closing of said gripping element.

45. Apparatus according to claim 1, and further comprising a movement promoting arrangement, arranged for moving said transferring arrangement towards said movable element.

46. Apparatus according to claim 45, wherein said movement promoting arrangement comprises a guiding body provided with a cam element.

47. Apparatus according to claim 46, wherein said guiding body is movable between an operating position, in which said cam element engages a revolving element rotatably supported by said transferring arrangement, and a rest position, in which said cam element is distant from said revolving element.

48. Apparatus according to claim 1, and further comprising a first closing element cooperating with a second closing element for closing and/or opening an opening of said transferring arrangement that is traversable by said doses and a driving device arranged for moving said first closing element and said second closing element, maintaining said first closing element and said second closing element parallel to one another on a plane arranged substantially parallel to said opening.

49. Apparatus according to claim 48, wherein said driving device comprises an elongated element fixed to said first closing element and comprising a rack element and a further elongated element fixed to said second closing element and comprising a further rack element, said driving device further comprising a toothed wheel, said elongated element and said further elongated element being arranged in such a way that said rack element and said further rack element face one another and mesh simultaneously with said toothed wheel.

50. Apparatus according to claim 48, wherein said driving device comprises an actuating arrangement arranged for driving said first closing element and said second closing element between an open configuration, in which said first closing element and said second closing element enable said doses to pass through said opening, and a closed configuration, in which said first closing element and said second closing element prevent said doses from passing through said opening.

51. Apparatus, comprising a conveying device provided with seat elements arranged for receiving objects, said seat elements being movable along a curved path, and a further conveying device provided with a transferring arrangement arranged for delivering said objects to, and/or removing said objects from, said conveying device, wherein said apparatus further comprises connecting elements so shaped as to mutually connect said transferring arrangement and said seat elements along a portion of said curved path and to release said transferring arrangement and said seat elements after said transferring arrangement and said seat elements have jointly traveled along said portion, wherein said connecting elements comprises coupling elements arranged for engaging said seat elements, said coupling elements defining gap elements arranged for interacting with an external surface of said seat elements, said connecting element comprising a first arm and a second arm defining a movable gripper element between an open configuration, in which said seat element can enter or exit said gripper element, and a closed configuration, in which said gripper element clamps said seat element.

52. Apparatus according to claim 51, wherein said first arm and said second arm are hinged on a body of said connecting element.

53. Apparatus according to claim 51, wherein said seat element is externally provided with a revolving element intended for interacting with said connecting element.

54. Apparatus according to claim 53, wherein said revolving element is shaped like a ring rotatably supported on a body of said seat element.

55. Apparatus according to claim 54, wherein between said revolving element and said body there are interposed roller elements that enable said revolving element to rotate with respect to said body.

56. Apparatus according to claim 53, wherein in said revolving element there are provided gap elements arranged for receiving engaging elements of said first arm and of said second arm.

57. Apparatus according to claim 56, wherein said engaging elements comprise a first revolving body rotatably supported by said first arm and a second revolving body rotatably supported by said second arm.

58. Apparatus according to claim 53, wherein said connecting element further comprises at least a further revolving body arranged for interacting with a cylindrical surface of said revolving element.

59. Apparatus according to claim 51, wherein said external surface is a cylindrical external surface.

60. Apparatus according to claim 51, wherein said coupling element comprises a first wall and a second wall that are mutually tilted in such a way that said gap element has a "V"-shaped section.

61. Apparatus according to claim 51, wherein said connecting elements further comprises maintaining elements that are movable between a locking configuration, in which said connecting elements mutually connects said transferring arrangement and said seat elements, and a release configuration, in which said connecting elements enable said transferring arrangement and said seat elements to move independently of one another.

62. Apparatus according to claim 61, wherein said maintaining elements cooperate with said coupling elements.

63. Apparatus according to claim 16, wherein said supporting bodies are fixed to said guiding elements.

64. Apparatus according to claim 63, wherein said movable element comprises a carousel device rotatable around a rotation axis along a circular path supporting said transferring arrangement, said supporting body being radially movable with respect to said carousel device.

65. Apparatus according to claim 16, wherein said movable element comprises a carousel device rotatable around a rotation axis along a circular path supporting said transferring arrangement, said transferring arrangement being movable between a maximum extent configuration determined by end stroke elements associated with said guiding elements and a minimum extent configuration, closer to the rotation axis of the carousel device.

66. Apparatus according to claim 65, wherein the transferring arrangement comprises an actuating device interposed between said transferring arrangement and said carousel device to assure a constant force on said transferring arrangement in the maximum extent configuration.

67. Apparatus according to claim 66, wherein the actuating device comprises a spring.

68. Apparatus according to 65, wherein said conveying device comprises a compression-moulding device for compression-moulding said doses, said seat elements comprising mould cavities of a mould arrangement of said compression-moulding device, the coupling elements being arranged for engaging said mould cavities such that when the transferring arrangement and said mould cavities are maintained mutually coupled along a portion of said curved path, said transferring arrangement is drivable in said minimum extent configuration by said mould cavities.

69. Apparatus according to 68, wherein in said minimum extent configuration the thrust applied by the actuating device on the transferring arrangement is overcome by the force applied by the moulding cavities to said transferring arrangement.

70. Apparatus according to claim 1, wherein said objects comprise doses of plastics and said movable element comprises a carousel device rotatable around a rotation axis along a circular path supporting said transferring arrangement and said conveying device comprises a compression-moulding device for compression-moulding said doses, said seat elements comprising mould cavities of a mould arrangement of said compression-moulding device, said compression-moulding device comprising a carousel rotatable around a respective rotation axis along a respective circular path and supporting said mould arrangement, the axis of said carousel supporting said transferring arrangement and the axis of said carousel supporting said moulding carousel being spaced apart by a distance that is less than the sum of the radii of the circular path and of the further circular path.

71. Apparatus according to claim 1, wherein said objects comprise doses of plastics and said movable element comprises a carousel device rotatable around a rotation axis along a circular path supporting said transferring arrangement; said conveying device comprising a compression-moulding device for compression-moulding said doses, said seat elements comprising mould cavities of a mould arrangement of said compression-moulding device wherein said compression-moulding device comprises a carousel rotatable around a rotation axis along a further circular path and supporting said mould arrangement, said moulding cavities driving the coupling elements of the transferring arrangement.

72. Apparatus for processing plastic doses, the apparatus comprising:
a first conveying device provided with seat elements arranged for receiving doses of plastics, said seat elements being movable along a first curved path; and
a second conveying device provided with a transferring arrangement arranged for delivering said doses to, and/or removing said doses from, said first conveying device, said transferring arrangement including a plurality of movable handling elements, each said handling element being movable along a second curved path,
wherein the first curved path and the second curved path at least partially overlap one another in a transferring zone where the doses are transferred from the second conveying device to the first conveying device,
wherein said handling elements are arranged for engaging said seat elements in such a way that said handling elements 1) diverge from the second curved path and 2) are maintained mutually coupled via coupling elements with the seat elements along a portion of said first curved path.

73. Apparatus according to claim 72, wherein the curved paths are circular, and the first and second conveying devices are configured to rotate about respective first and second axes.

74. Apparatus according to claim 73, wherein the distance between the axes is greater than the combined radii of the first and second circular paths.

75. Apparatus according to claim 72, wherein the handling elements are configured to 3) resume travel along the second curved path once the handling elements are moved beyond the transferring zone.

76. Apparatus according to claim 72, wherein the handling elements are configured to pivot relative to the second conveying device, and to move radially towards a rotation axis of the second conveying device during initial engagement with the seat elements in the transferring zone.

77. Apparatus according to claim 72, wherein said second conveying device includes a movable element that comprises a carousel device rotatable around a rotation axis along a circular path supporting said transferring arrangement, said transferring arrangement being movable between a maximum extent configuration determined by end stroke elements associated with guiding elements and a minimum extent configuration, closer to the rotation axis of the carousel device.

78. Apparatus according to claim 77, wherein the transferring arrangement comprises a device or arrangement interposed between said transferring arrangement and said carousel device to assure said transferring arrangement is maintained in the maximum extent configuration.

79. Apparatus according to 78, wherein in said minimum extent configuration a force applied by the device on the transferring arrangement is overcome by a force applied by the first conveying device to said transferring arrangement.

80. Apparatus for processing plastic doses, the apparatus comprising:
a first conveying device rotatable about a first axis; and
a second conveying device rotatably about a second axis and provided with a transferring arrangement arranged for delivering said doses to, and/or removing said doses from, said first conveying device,
said second conveying device includes a handling element configured to travel along a path having a first circular portion centered on the second axis and a second circular portion centered on the first axis and that defines a transferring zone where the doses are transferred from the second conveying device to the first conveying device, wherein the handling element is configured to resume travel on the first circular portion once past the transferring zone.

81. Apparatus according to claim 80, wherein said handling elements are configured to be mutually coupled with seat elements of the first conveying device so that the handling elements and seat elements together travel along the second circular portion of the path throughout the transferring zone.

82. Apparatus according to claim 80, wherein the second circular portion extends within the first circular portion.

83. Apparatus according to claim 80, wherein the second circular portion extends across the first circular portion, intersecting the first circular portion at two points defining two transitions between the first and second circular portions.

* * * * *

UNITED STATES PATENT AND TRADEMARK OFFICE
CERTIFICATE OF CORRECTION

PATENT NO. : 8,016,583 B2  
APPLICATION NO. : 12/376624  
DATED : September 13, 2011  
INVENTOR(S) : Zuffa et al.

Page 1 of 1

It is certified that error appears in the above-identified patent and that said Letters Patent is hereby corrected as shown below:

Title Page, please insert;

--(30)    Foreign Application Priority Data

August 7, 2006 (IT).....................MO2006A000256  
April 6, 2007   (IT).....................MO2007A000128--

Signed and Sealed this
Eighth Day of May, 2012

David J. Kappos
*Director of the United States Patent and Trademark Office*